(12) United States Patent
Enomura

(10) Patent No.: US 9,873,103 B2
(45) Date of Patent: Jan. 23, 2018

(54) FLUID PROCESSING APPARATUS AND PROCESSING METHOD

(75) Inventor: Masakazu Enomura, Izumi (JP)

(73) Assignee: M. TECHNIQUE CO., LTD., Izumi-shi, Osaka (JP)

( * ) Notice: Subject to any disclaimer, the term of this patent is extended or adjusted under 35 U.S.C. 154(b) by 1185 days.

(21) Appl. No.: 13/634,809

(22) PCT Filed: Apr. 8, 2011

(86) PCT No.: PCT/JP2011/058946
§ 371 (c)(1),
(2), (4) Date: Sep. 13, 2012

(87) PCT Pub. No.: WO2011/126124
PCT Pub. Date: Oct. 13, 2011

(65) Prior Publication Data
US 2013/0008514 A1  Jan. 10, 2013

(30) Foreign Application Priority Data

Apr. 8, 2010 (JP) .................................. 2010-089903

(51) Int. Cl.
*B01J 19/18* (2006.01)
*B01F 3/08* (2006.01)
*B01F 7/00* (2006.01)

(52) U.S. Cl.
CPC ......... *B01J 19/1887* (2013.01); *B01F 3/0807* (2013.01); *B01F 7/00775* (2013.01);
(Continued)

(58) Field of Classification Search
CPC .............. B01F 7/00758; B01F 7/00775; B01F 7/00791; B01J 19/1887
(Continued)

(56) References Cited

U.S. PATENT DOCUMENTS 5,622,650 A * 4/1997 Rourke ............... B01F 7/00775
241/152.2
2003/0142582 A1* 7/2003 Utracki ............... B01F 7/00833
366/176.2
(Continued)

FOREIGN PATENT DOCUMENTS

JP      2003-159696 A    6/2003
JP      2004-49957 A     2/2004
(Continued)

*Primary Examiner* — Charles Cooley
*Assistant Examiner* — Marc C Howell
(74) *Attorney, Agent, or Firm* — Birch, Stewart, Kolasch & Birch, LLP

(57) ABSTRACT

A device enables the more stable performance of uniform treatment such as reaction by reducing pulsation generated in a fluid introduced between treatment surfaces using a micropump effect. The device treats an object between treatment surfaces. The treatment is performed by introducing a fluid between the treatment surfaces using a micropump effect. The micropump effect generates force in the direction in which the treatment surfaces move away from each other by the rotation of a treatment part and the recessed section formed in the treatment surface to thereby produce the effect of introducing the fluid between the treatment surfaces. The recessed section is formed so as to extend in the circumferential direction and inward/outward direction of the treatment surface, and multiple recessed sections are provided or an additional recessed section ($\alpha$) different from the recessed sections is formed in at least one of the treatment surfaces.

7 Claims, 35 Drawing Sheets

(52) U.S. Cl.
CPC . *B01F 7/00791* (2013.01); *B01J 2219/00094* (2013.01); *B01J 2219/00132* (2013.01); *Y10T 137/0318* (2015.04)

(58) Field of Classification Search
USPC ............... 366/181.4, 302; 422/225, 228
See application file for complete search history.

(56) References Cited

U.S. PATENT DOCUMENTS

| | | | |
|---|---|---|---|
| 2004/0032792 A1 | 2/2004 | Enomura | |
| 2004/0090862 A1* | 5/2004 | Uesugi | B01F 3/0807 366/331 |
| 2004/0096767 A1 | 5/2004 | Tsuji et al. | |
| 2010/0319785 A1* | 12/2010 | Endmura | B01F 7/00758 137/14 |
| 2010/0327236 A1 | 12/2010 | Enomura | |

FOREIGN PATENT DOCUMENTS

| | | | | |
|---|---|---|---|---|
| JP | 2004-318064 A | 11/2004 | | |
| JP | 2006-104448 A | 4/2006 | | |
| JP | 2006-341232 A | 12/2006 | | |
| JP | 4446129 B1 | 4/2010 | | |
| SU | 1299615 A1 * | 3/1987 | ......... | B01F 7/00775 |
| WO | WO 2009/008390 A1 | 1/2009 | | |
| WO | WO 2009/008393 A1 | 1/2009 | | |
| WO | WO 2009/008394 A1 | 1/2009 | | |

* cited by examiner (A)

(B)

(C)

(D)

(A)

(B)

(C)

(A)

(B)

(C)

(A)

R: Fluid
G: Mixing apparatus
T: Tank (B)

R: Fluid
G: Mixing apparatus
T: Tank
Q: Decompression pump (C)

R: Fluid
G: Mixing apparatus
T: Tank
Q: Decompression pump (A)

(B)

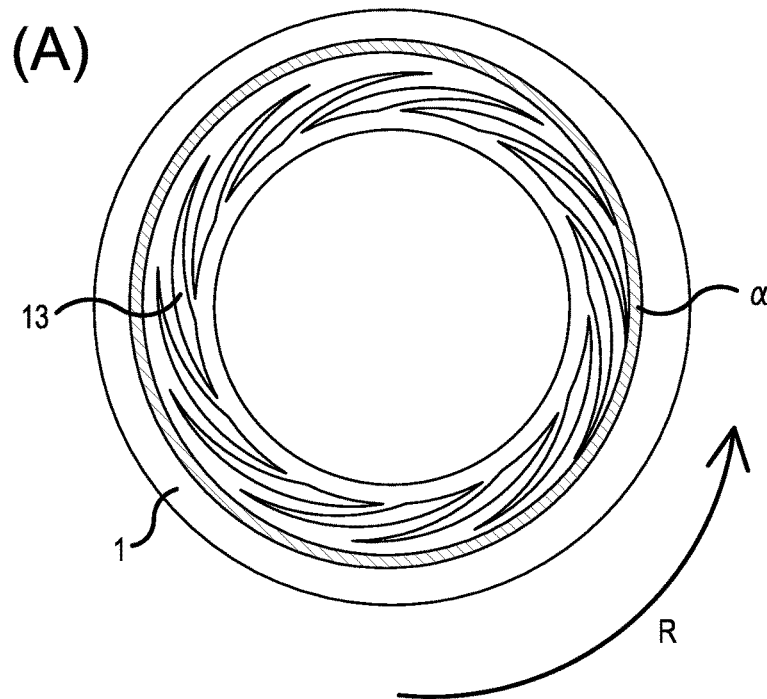
FIG. 30
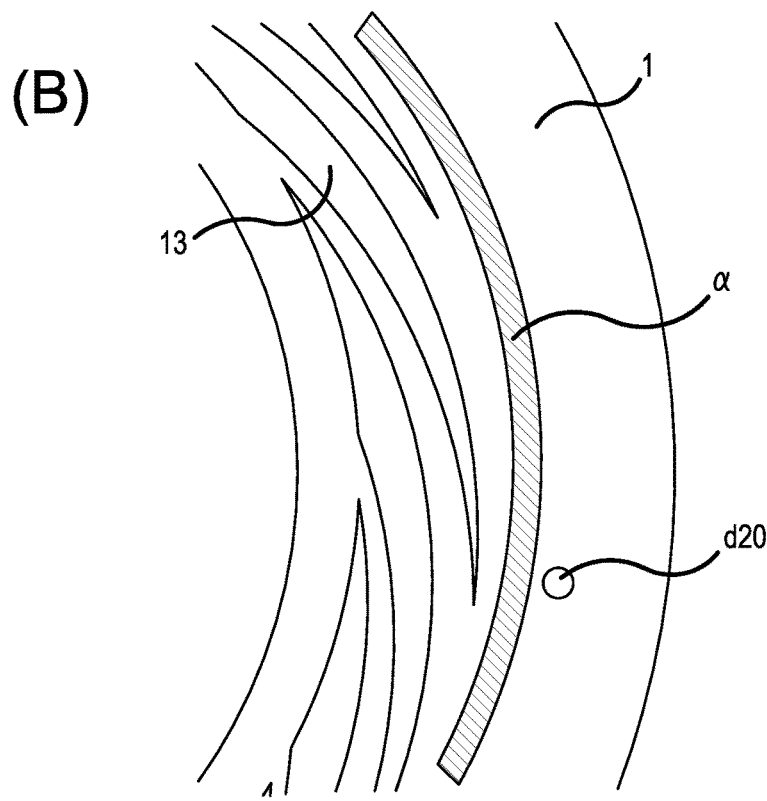

(A)

(B)

(C)

(A)

(B)

FLUID PROCESSING APPARATUS AND PROCESSING METHOD

TECHNICAL FIELD

The present invention relates to a fluid processing apparatus and a processing method wherein a material to be processed is processed between processing surfaces in processing members capable of approaching to and separating from each other, at least one of which rotates relative to the other.

BACKGROUND ART

The applicant of the present invention proposed an apparatus with which at least two fluids are mixed and stirred between processing surfaces capable of approaching to and separating from each other and rotating relative to the other, whereby carrying out, for example, reaction and crystallization (Patent Document 1 and Patent Document 2). An apparatus like this has solved a problem such as clogging of a micro flow path by a reaction product and necessity of large supply pressure as a flow path becomes narrower, which have been problems of a micro reactor or a micro mixer shown in Patent Document 3 or Patent Document 4.

In the apparatus as described in Patent Document 1 and Patent Document 2, a first fluid as the first fluid is introduced between processing surfaces capable of approaching to and separating from and rotating relative to the other and a second fluid as the second fluid is introduced between the processing surfaces from a separate flow path having an opening leading to a space between the processing surfaces, the said flow path being independent of a flow path through which the first fluid is introduced, whereby the first and second fluids are mixed and stirred between the processing surfaces. By incorporating a material to be reacted into the first fluid or the second fluid or both of them, reaction, crystallization, and so on, are effected between the processing surfaces.

Patent Document 1: JP-A 2004-49957
Patent Document 2: WO2009/8394
Patent Document 3: JP-A 2006-104448
Patent Document 4: JP-A 2003-159696

DISCLOSURE OF THE INVENTION

Problems to be Solved by the Invention

In Patent Document 1 and Patent Document 2, as a method for introducing a first fluid into between processing surfaces, a method is proposed that a first fluid is introduced between processing surfaces by rotating a processing member having the processing surface thereof arranged with a depression from a central side to an outer side or from an outer side to a central side, namely a method that the first fluid is introduced by a micro-pump effect is proposed.

However, dependent on a form or number of the depression, pulsation may occur in a certain case during introduction of the first fluid whereby causing difficulty in operation such as uniform mixing, reaction, and separation between the processing surfaces. Especially, pressure change and flow disturbance near the opening through which the second fluid is introduced into between the processing surfaces sometimes caused an adverse effect to the operation such as mixing, reaction, and separation.

Accordingly, an objection of the present invention is to solve the problems mentioned above by further improving the apparatus described in Patent Document 1 and Patent Document 2 by utilizing the above-mentioned findings thereby enabling to perform a uniform reaction and so forth more stably.

Means for Solving the Problems

To solve the problems mentioned above, a first embodiment of the present invention provides a fluid processing apparatus; wherein in the processing apparatus, a material to be processed is processed between processing surfaces arranged opposite to each other in processing members capable of approaching to and separating from, at least one of which rotates relative to the other, and a fluid to be processed is introduced into between the processing surfaces by using a micro-pump effect due to a depression arranged on at least any one of the processing surfaces whereby effecting the processing of the fluid to be processed by mixing/stirring thereof between the processing surfaces, wherein the micro-pump effect generates a force to move the processing surfaces in the direction of separation therebetween by rotation of the processing members and the depression arranged on the processing surfaces, whereby further generating an introduction effect of the fluid to be processed into between the processing surfaces, wherein a plurality of depressions is arranged in a circumferential direction of the processing surface, the depression is formed such that it is extended in a direction from inside to outside of the processing surface, and the depression is arranged in the number of 0.5 or more per 10 mm in a circumferential direction of the processing surface and total number of the depression is 51 or more.

A second embodiment of the present invention provides a fluid processing apparatus; wherein in the processing apparatus, a material to be processed is processed between processing surfaces arranged opposite to each other in processing members capable of approaching to and separating from, at least one of which rotates relative to the other, and a fluid to be processed is introduced into between the processing surfaces by using a micro-pump effect due to a depression for fluid introduction arranged on at least anyone of the processing surfaces whereby effecting the processing of the fluid to be processed by mixing/stirring thereof between the processing surfaces, wherein the micro-pump effect generates a force to move the processing surfaces in the separation direction therebetween by rotation of the processing members and the depression for fluid introduction arranged on the processing surfaces, whereby further generating an introduction effect of the fluid to be processed into between the processing surfaces, wherein a plurality of depressions for fluid introduction is arranged in a circumferential direction of the processing surface, the depression for fluid introduction is arranged such that it is extended in a direction from inside to outside of the processing surface, and a separate depression which is different from the depression for fluid introduction is arranged on at least any one of the processing surfaces.

Meanwhile, the term "mixing/stirring" used in the above means that at least any one of mixing and stirring is carried out.

A third embodiment of the present invention provides a fluid processing apparatus; wherein in the processing apparatus, a material to be processed is processed between processing surfaces arranged opposite to each other in processing members capable of approaching to and separating from, at least one of which rotates relative to the other, and by using a micro-pump effect due to a depression for fluid introduction arranged on at least any one of the processing surfaces, a first fluid which is the first fluid to be processed among fluids to be processed is introduced into between the processing surfaces, and a second fluid which is the second fluid to be processed among fluids to be processed is introduced into between the processing surfaces through a separate flow path having an opening leading to a space between the processing surfaces, the said flow path being independent of a flow path through which the first fluid is introduced, whereby effecting the processing of the fluids to be processed by mixing/stirring thereof between the processing surfaces, wherein the micro-pump effect generates a force to rotate the processing members and a force to move the processing surfaces in the direction of separation therebetween by the depression for fluid introduction arranged on the processing surface, whereby further generating an introduction effect of the first fluid into between the processing surface, wherein the depression for fluid introduction is a depression for introduction of the first fluid, a plurality of depressions for introduction of the first fluid is arranged in a circumferential direction of the processing surfaces, the depression for introduction of the first fluid is formed such that it is extended in a direction from inside to outside of the processing surface, and a separate depression which is different from the depression for introduction of the first fluid is arranged on at least any one of the processing surfaces between the depression for introduction of the first fluid and the opening leading to between the processing surfaces.

A fourth embodiment of the present invention provides a fluid processing apparatus according to the second embodiment or the third embodiment, wherein the separate depression overlaps with the depression for fluid introduction.

A fifth embodiment of the present invention provides a fluid processing apparatus according to any of the second embodiment to the fourth embodiment, wherein the separate depression has a form of a circular ring.

A sixth embodiment of the present invention provides a fluid processing apparatus according to any of the second embodiment to the fifth embodiment, wherein depth of the separate depression is 50 µm or more.

A seventh embodiment of the present invention provides a fluid processing method; wherein in the processing method, a material to be processed is processed between processing surfaces arranged opposite to each other in processing members capable of approaching to and separating from, at least one of which rotates relative to the other, and a fluid to be processed is introduced into between the processing surfaces by using a micro-pump effect due to a depression arranged on at least any one of the processing surfaces whereby effecting the processing of the fluid to be processed by mixing/stirring between the processing surfaces, wherein the micro-pump effect generates a force to move the processing surfaces in the separation direction therebetween by rotation of the processing members and the depression for fluid introduction arranged on the processing surface, and further generates an introduction effect of the fluid to be processed into between the processing surfaces, wherein a plurality of depressions for fluid introduction is arranged in a circumferential direction of the processing surface, the depression for fluid introduction is formed such that it is extended in a direction from inside to outside of the processing surface, and a separate depression which is different from the depression for fluid introduction is arranged on at least any one of the processing surfaces, wherein a fluid to be processed is passed through a part where the separate depression is arranged.

According to the present invention, in a fluid processing apparatus to process a fluid between processing surfaces in processing members capable of approaching to and separating from, at least one of which rotates relative to the other, effects of the pressure change or the flow disturbance to the fluid between first and second processing surfaces due to pulsation which is generated during the time of introducing the fluid is made small; and as a result, uniform mixing (reaction) can be carried out more stably than ever. Accordingly, a product or microparticles, which are more uniform and homogeneous than ever, can be obtained when fluid processing such as reaction and crystallization is carried out continuously.

FIG. 4(A) is a schematic vertical sectional view showing the concept of the apparatus used for carrying out the present invention, FIG. 4(B) is a schematic vertical sectional view showing the concept of another embodiment of the apparatus, FIG. 4(C) is a schematic vertical sectional view showing the concept of still another embodiment of the apparatus, and FIG. 4(D) is a schematic vertical sectional view showing the concept of still another embodiment of the apparatus.

Figure 4:
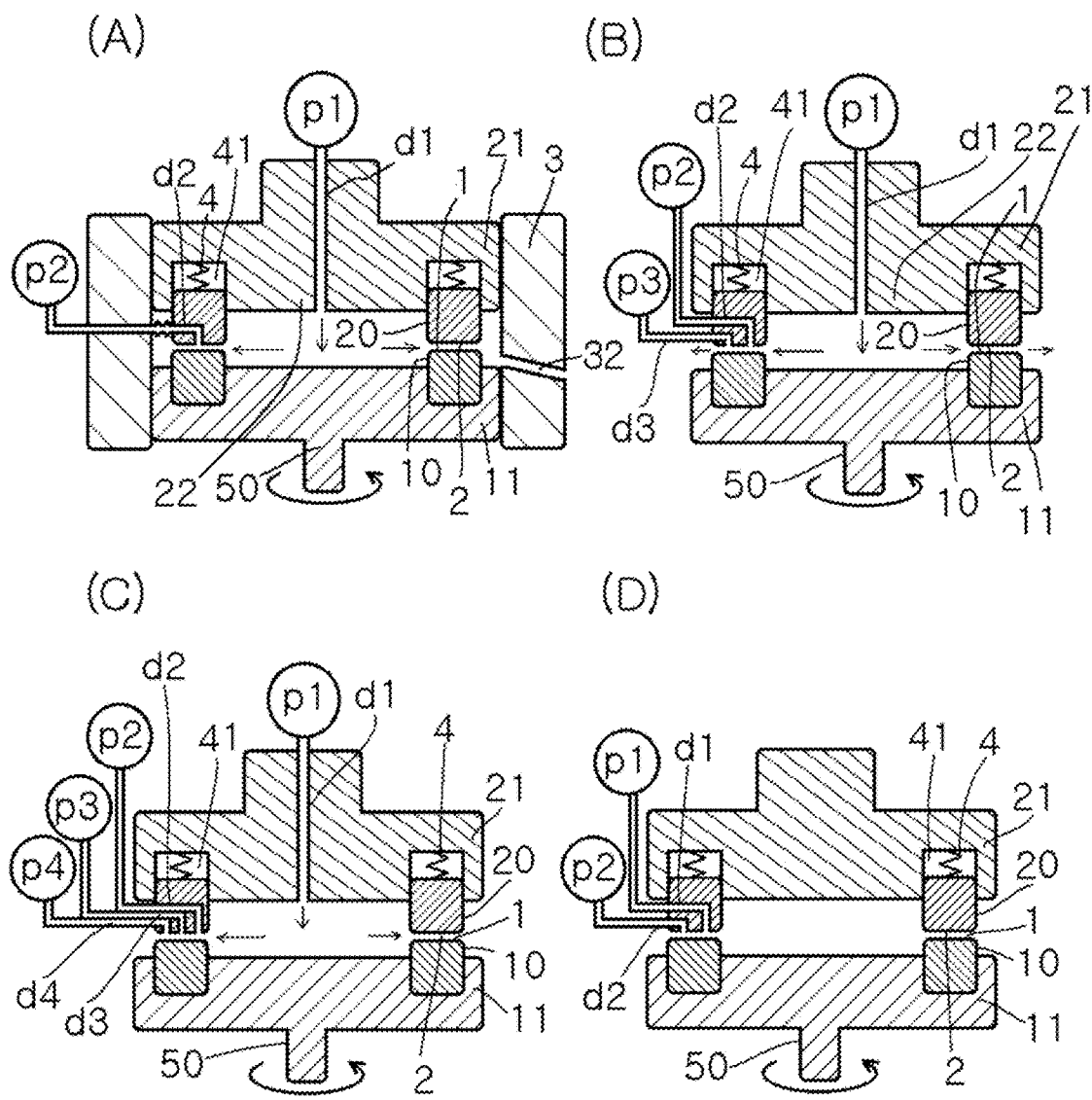
Figure 5:
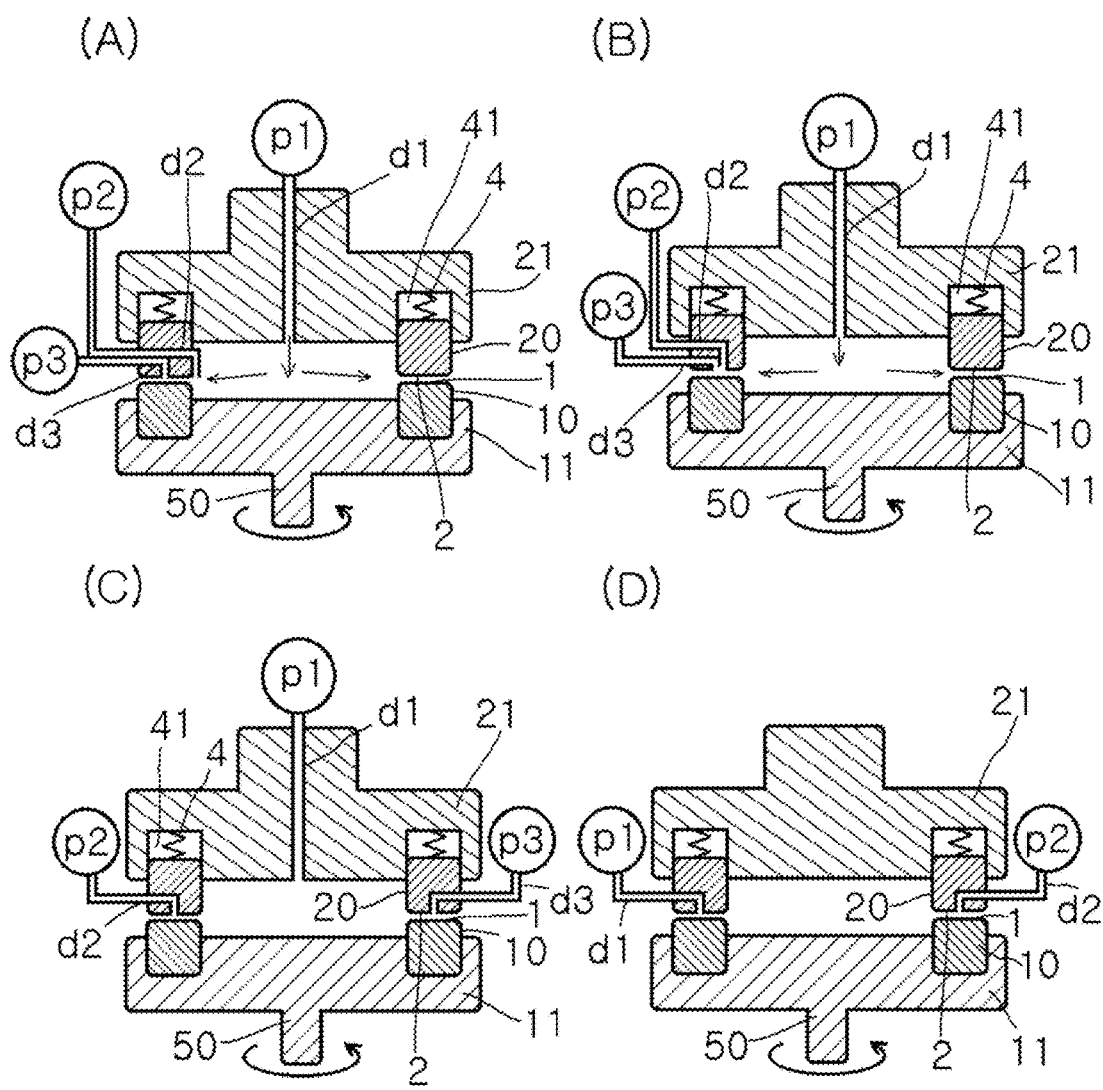

FIG. 5(A) to FIG. 5(D) each show a schematic vertical sectional view showing the concept of still another embodiment of the apparatus shown in FIG. 4.

FIG. 6(A) is a schematic bottom view showing an important part of the apparatus shown in FIG. 5(C), FIG. 6(B) is a schematic bottom view showing an important part of another embodiment of the apparatus, FIG. 6(C) is a schematic bottom view showing an important part of still another embodiment of the apparatus, FIG. 6(D) is a schematic bottom view showing the concept of still another embodiment of the apparatus, FIG. 6(E) is a schematic bottom view showing the concept of still another embodiment of the apparatus, and FIG. 6(F) is a schematic bottom view showing the concept of still another embodiment of the apparatus.

FIG. 7(A) to FIG. 7(D) each show a schematic vertical sectional view showing the concept of still another embodiment of the apparatus shown in FIG. 4.

FIG. 8(A) to FIG. 8(D) each show a schematic vertical sectional view showing the concept of still another embodiment of the apparatus shown in FIG. 4.

FIG. 9(A) to FIG. 9(D) each show a schematic vertical sectional view showing the concept of still another embodiment of the apparatus shown in FIG. 4.

FIG. 10(A) to FIG. 10(D) each show a schematic vertical sectional view showing the concept of still another embodiment of the apparatus shown in FIG. 4.

FIG. 11(A) to FIG. 11(D) each show a schematic vertical sectional view showing the concept of still another embodiment of the apparatus shown in FIG. 4.

Figure 12:
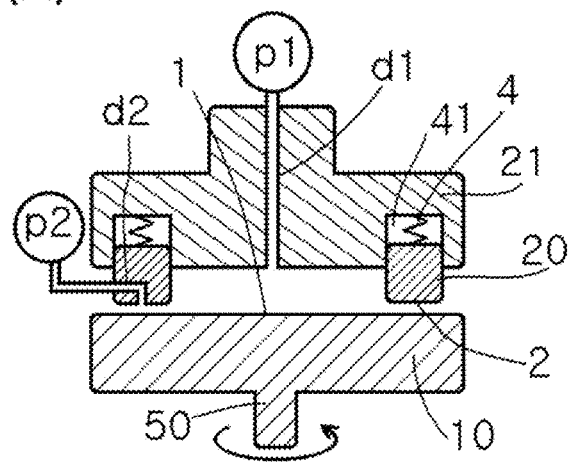
Figure 12:
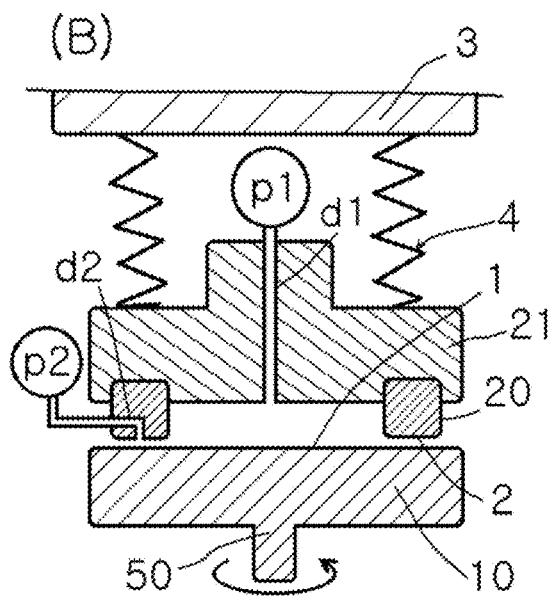
Figure 12:
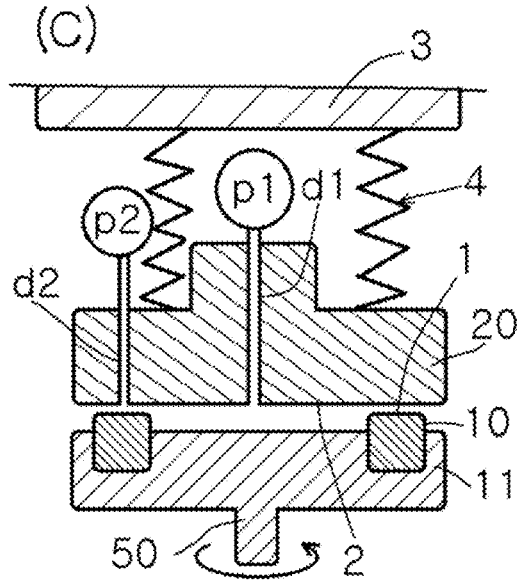
Figure 13:
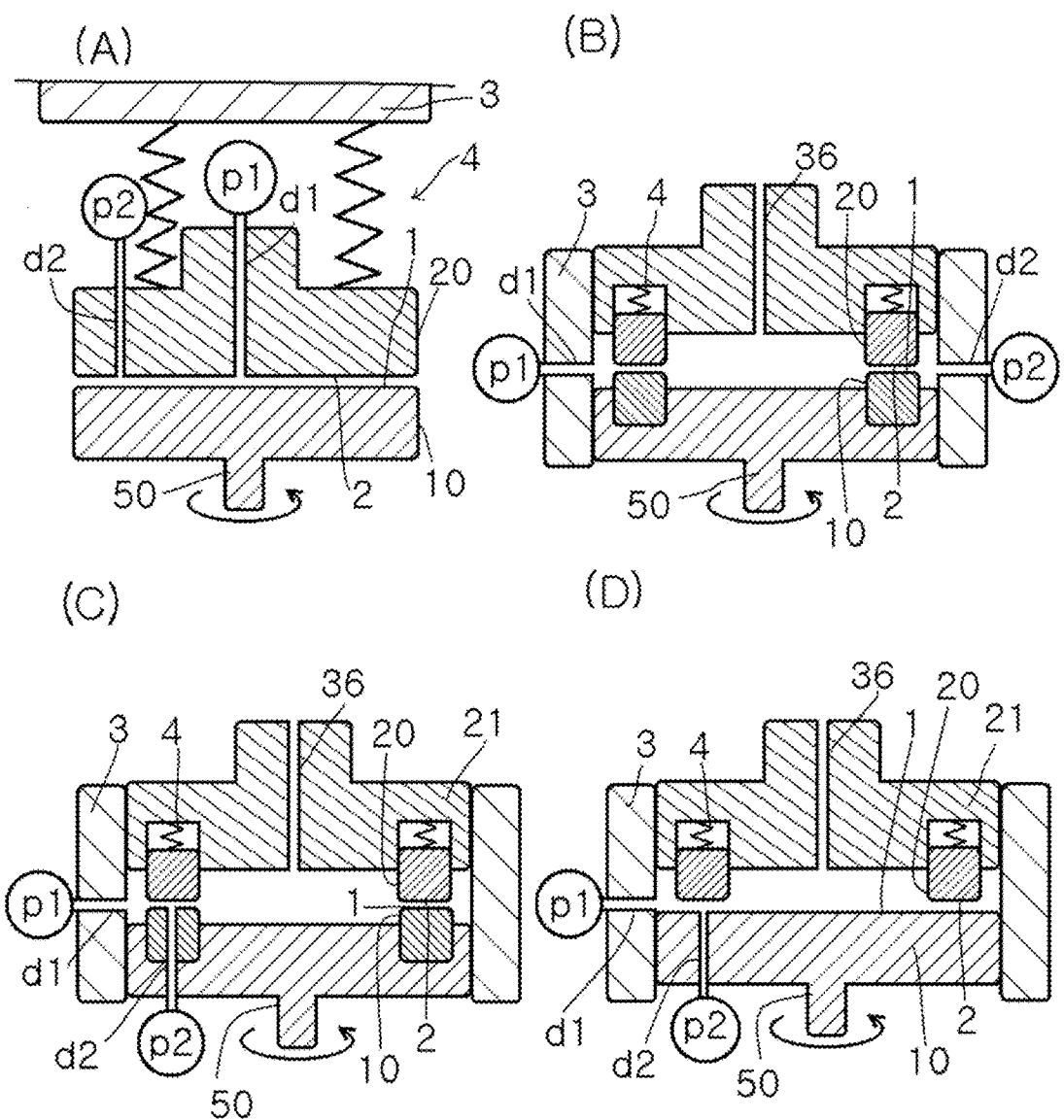

FIG. 12(A) to FIG. 12(C) each show a schematic vertical sectional view showing the concept of still another embodiment of the apparatus shown in FIG. 4.

FIG. 13(A) to FIG. 13(D) each show a schematic vertical sectional view showing the concept of still another embodiment of the apparatus shown in FIG. 4.

FIG. 14(A) and FIG. 14(B) each show a schematic vertical sectional view showing the concept of still another embodiment of the apparatus shown in FIG. 4, and FIG. 14(C) is a schematic bottom view showing an important part of the apparatus shown in FIG. 4(A).

Figure 15:
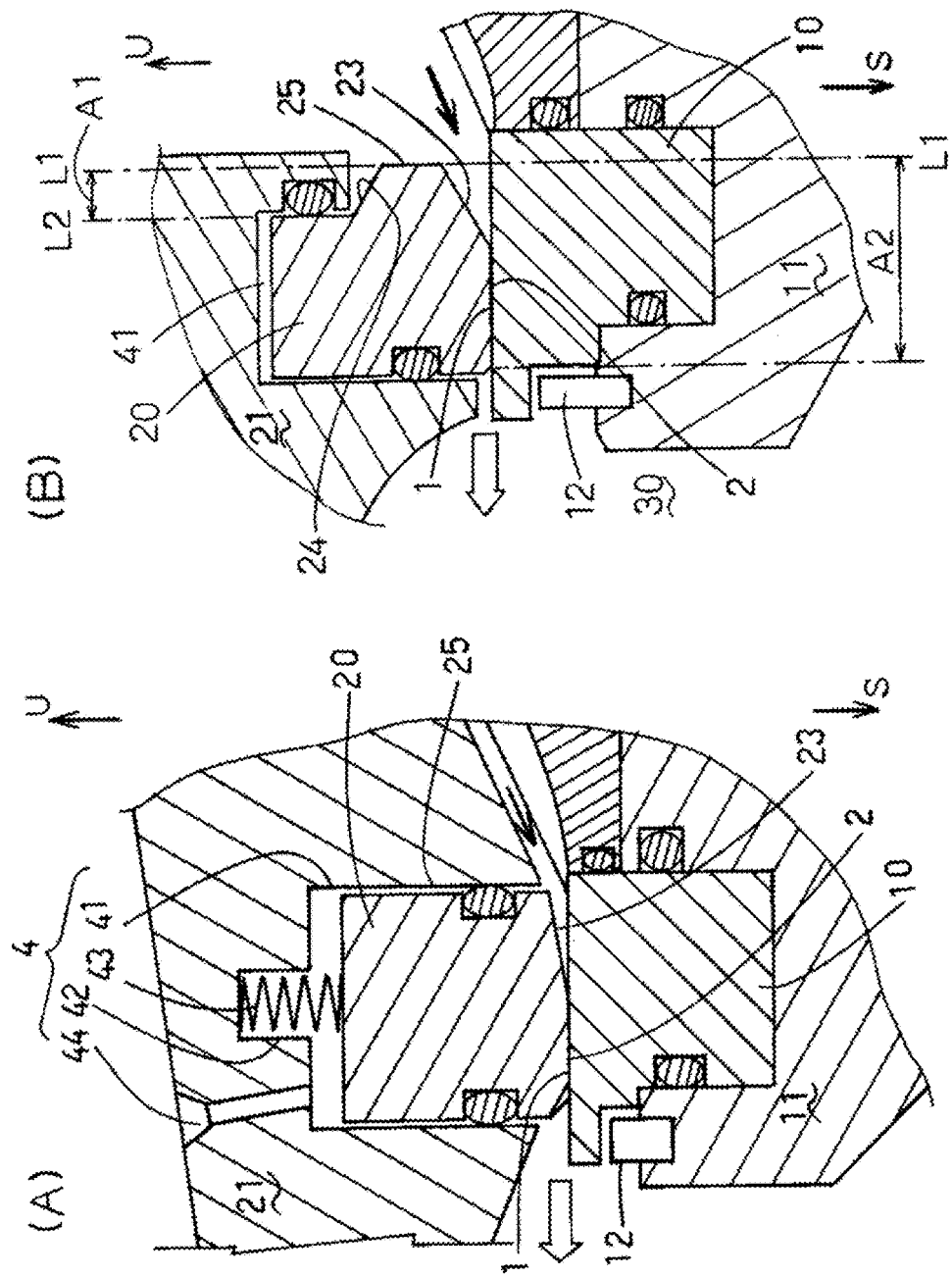

FIG. 15(A) is a schematic vertical sectional view showing an important part of another embodiment of a pressure-receiving surface in the apparatus shown in FIG. 4(A), and FIG. 15(B) is a schematic vertical sectional view showing an important part of still another embodiment of the apparatus.

Figure 16:
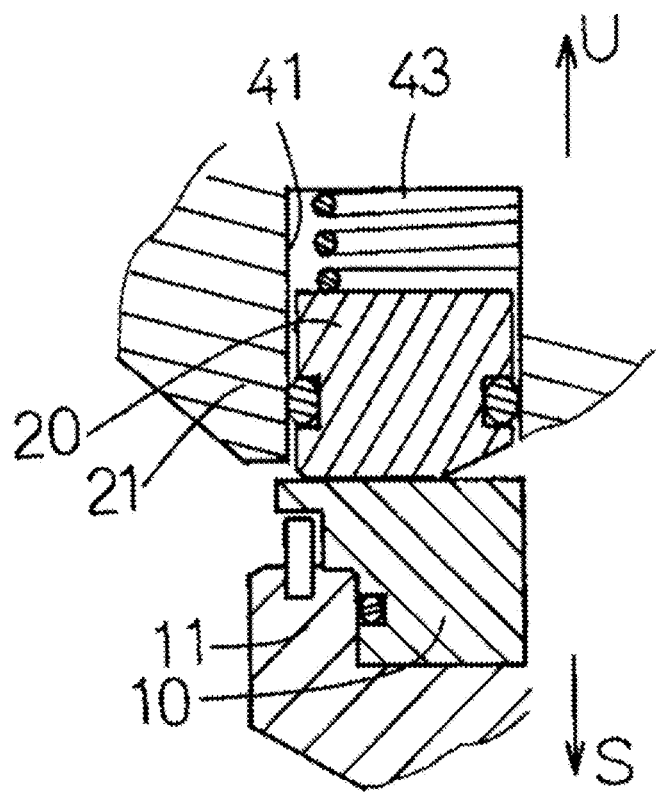

FIG. 16 is a schematic vertical sectional view showing an important part of another embodiment of a surface-approaching pressure imparting mechanism in the apparatus shown in FIG. 15(A).

Figure 17:
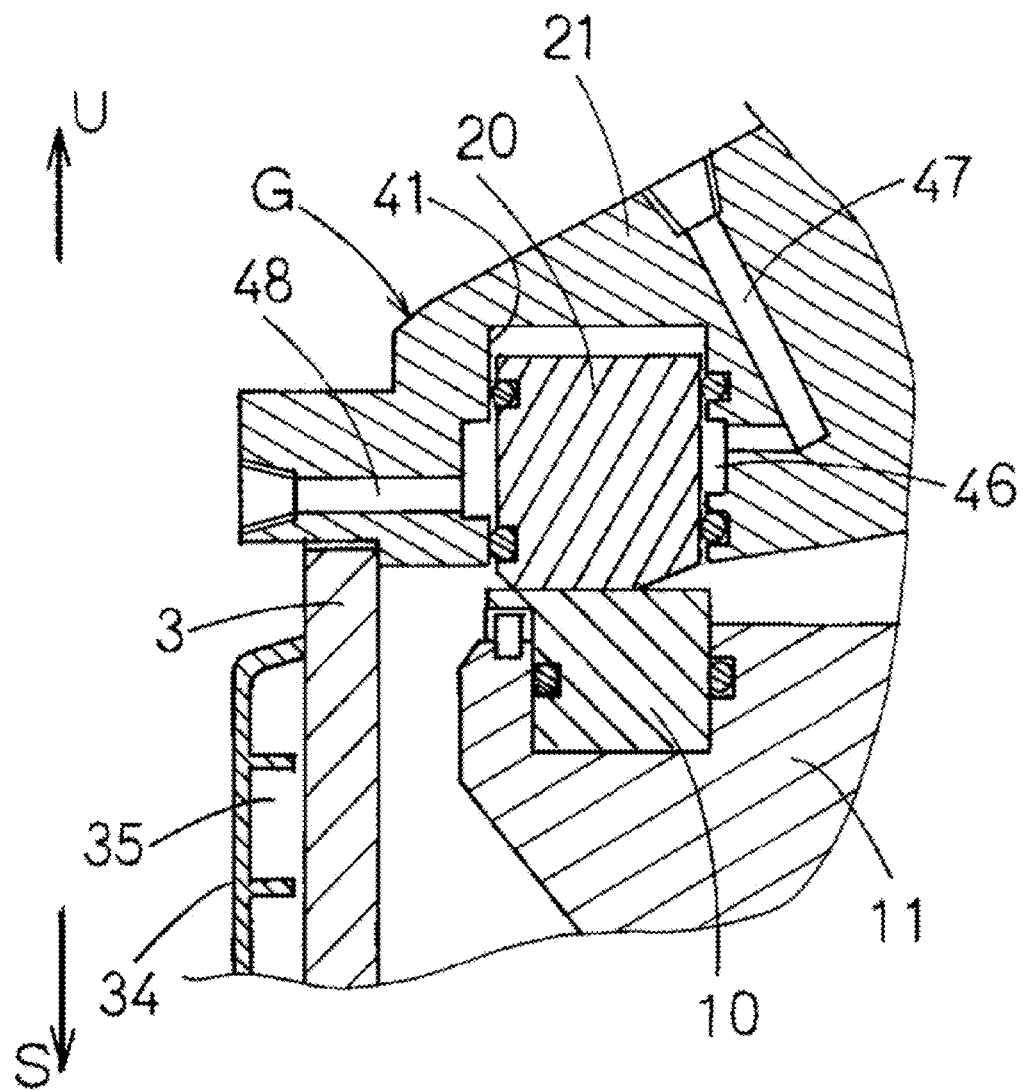

FIG. 17 is a schematic vertical sectional view showing an important part of another embodiment of the apparatus shown in FIG. 15(A), which is provided with a temperature-regulating jacket.

Figure 18:
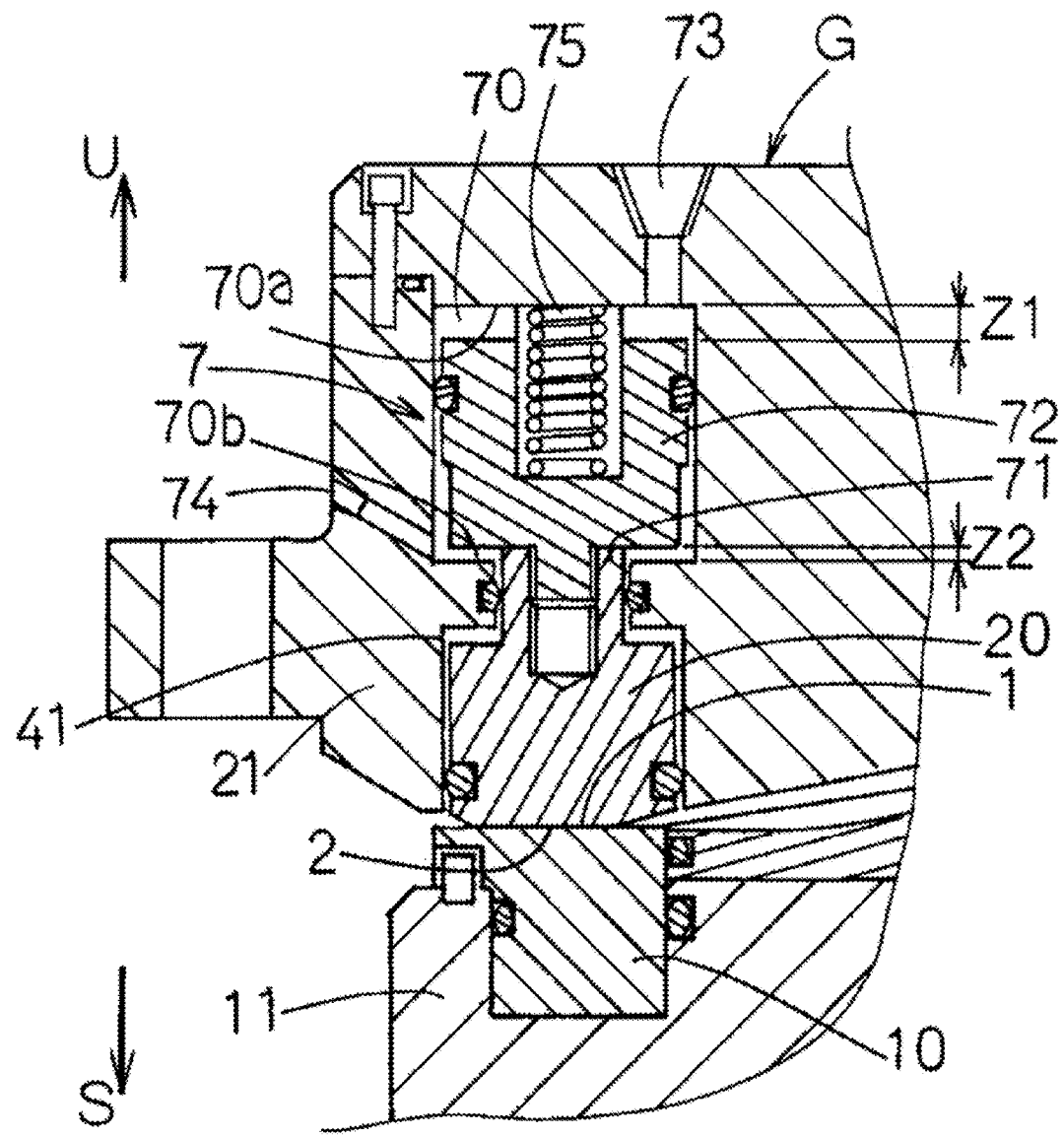

FIG. 18 is a schematic vertical sectional view showing an important part of still another embodiment of the surface-approaching pressure imparting mechanism in the apparatus shown in FIG. 15(A).

Figure 19:
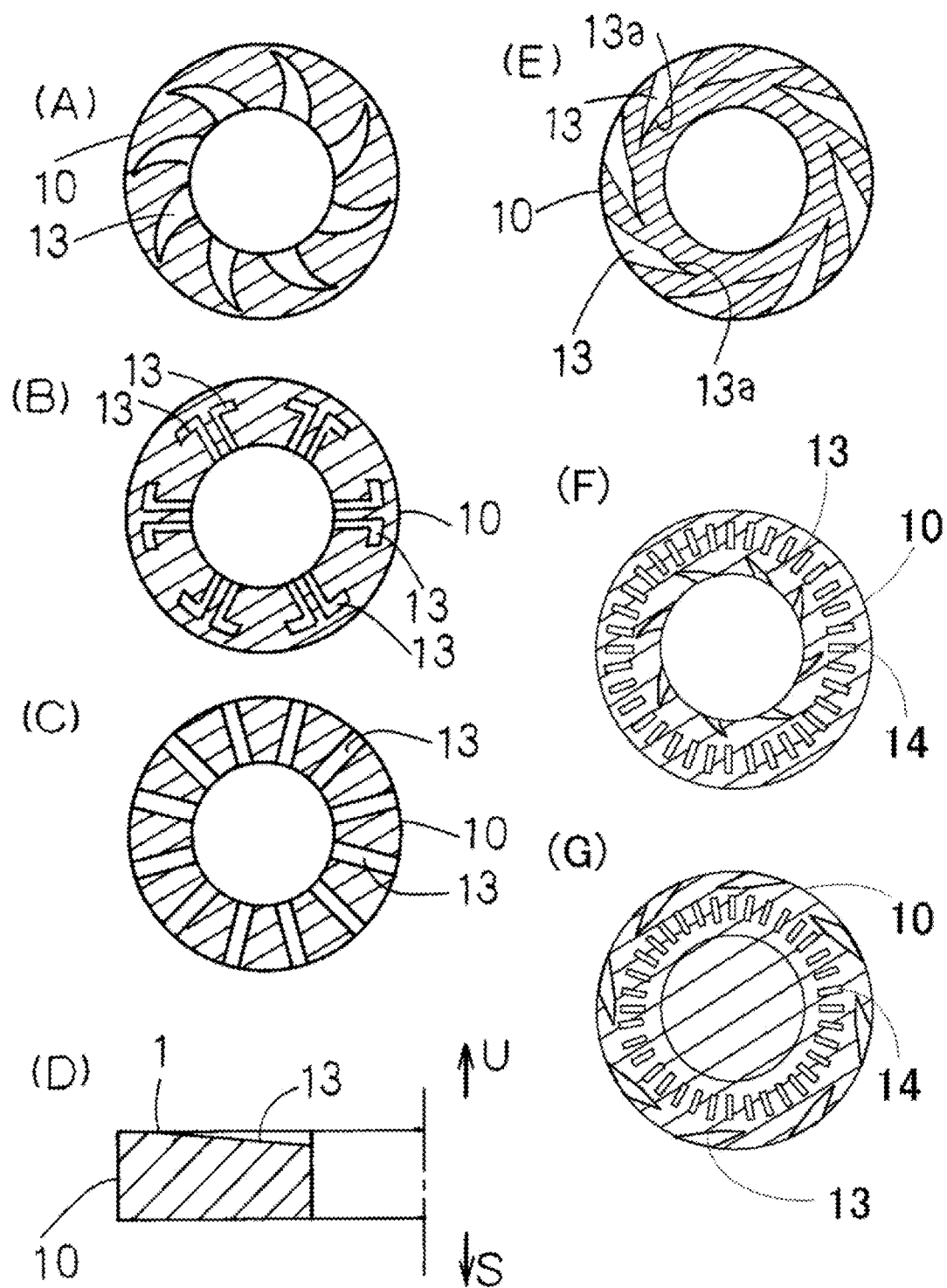

FIG. 19(A) is a schematic transverse sectional view showing an important part of still another embodiment of the apparatus shown in FIG. 15(A), FIG. 19(B), FIG. 19(C), and FIG. 19(E) to FIG. 19(G) are schematic transverse sectional views each showing an important part of still another embodiment of the apparatus, and FIG. 19(D) is a partially cut schematic vertical sectional view showing an important part of still another embodiment of the apparatus.

Figure 20:
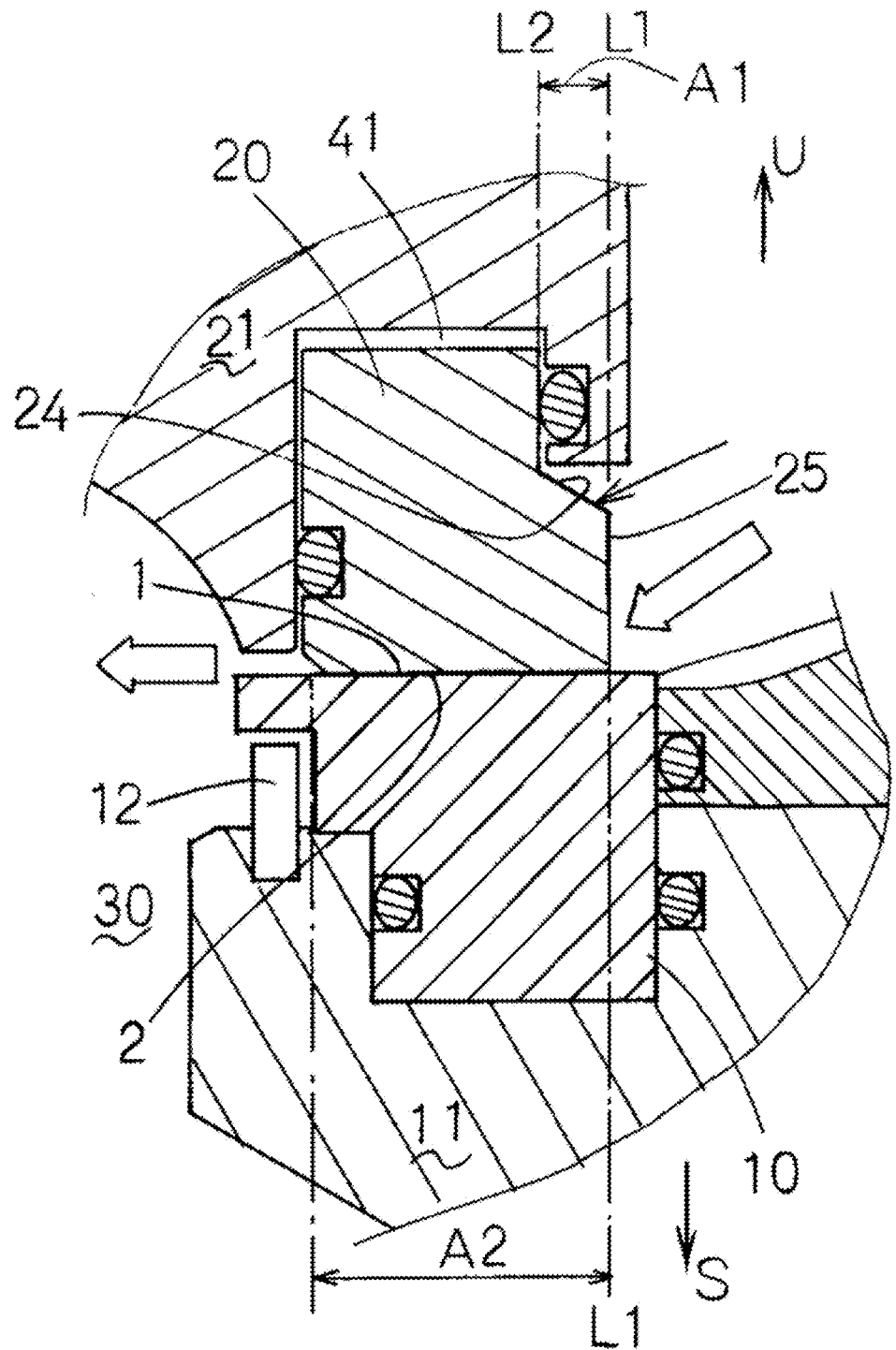

FIG. 20 is a schematic vertical sectional view showing an important part of still another embodiment of the apparatus shown in FIG. 15(A).

FIG. 21(A) is a schematic vertical sectional view showing the concept of still another embodiment of the apparatus used for carrying out the present invention, and FIG. 21(B) is a partially cut explanatory view showing an important part of the apparatus.

Figure 21:
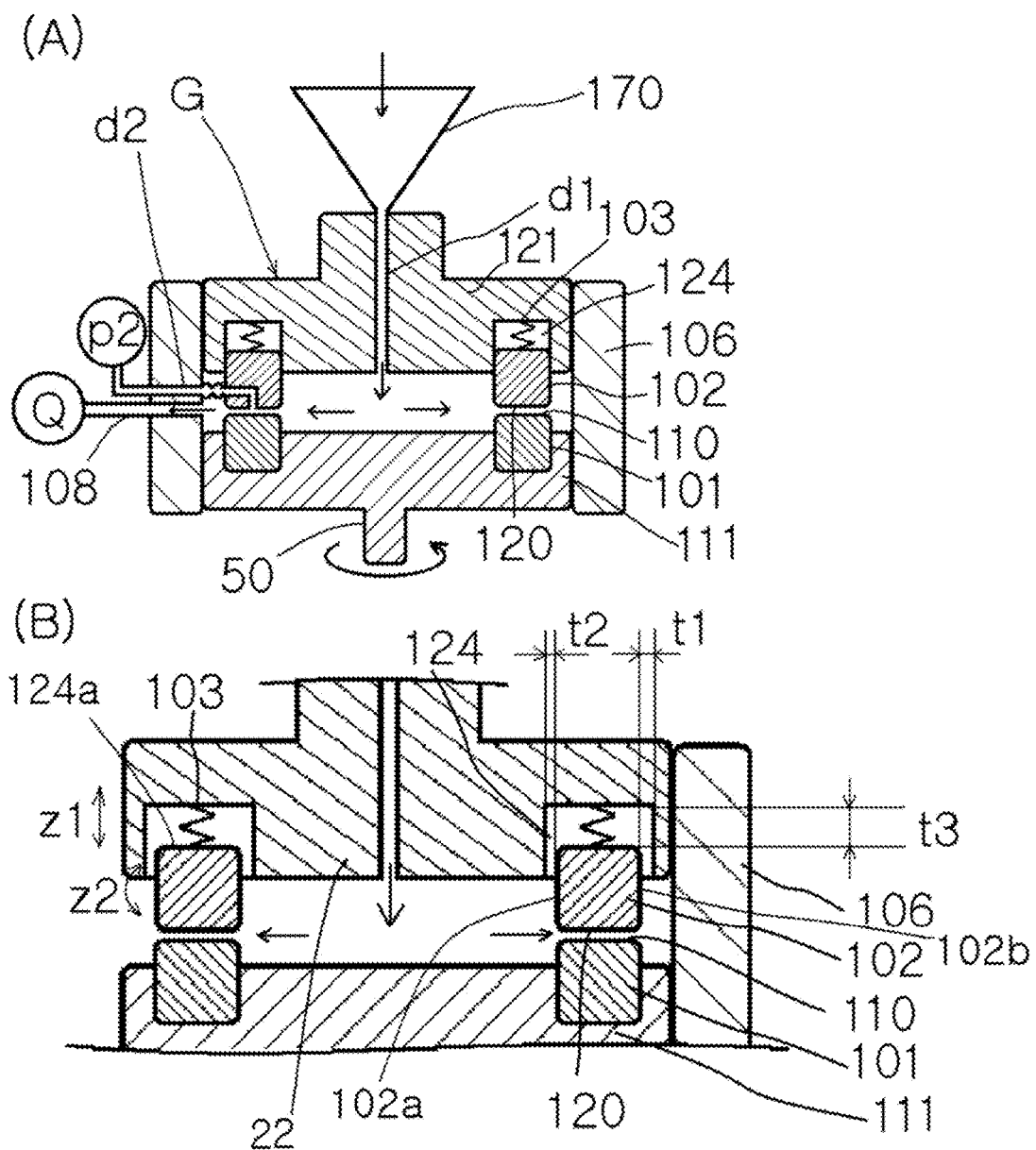

FIG. 22(A) is a plane view of a first processing member in the apparatus shown in FIG. 21, and FIG. 22(B) is a vertical sectional view showing an important part thereof.

FIG. 23(A) is a schematic vertical sectional view showing an important part of first and second processing members in the apparatus shown in FIG. 21, and FIG. 23(B) is a schematic vertical sectional view showing an important part of the first and second processing members with a minute space.

FIG. 24(A) is a plane view of another embodiment of the first processing member, and FIG. 24(B) is a schematic vertical sectional view showing an important part thereof.

FIG. 25(A) is a plane view of still another embodiment of the first processing member, and FIG. 25(B) is a schematic vertical sectional view showing an important part thereof.

FIG. 26(A) is a plane view of still another embodiment of the first processing member, and FIG. 26(B) is a plane view of still another embodiment of the first processing member.

Figure 27:
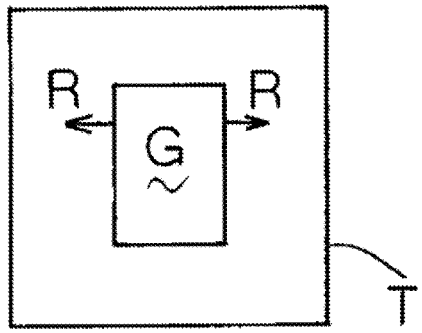
Figure 27:
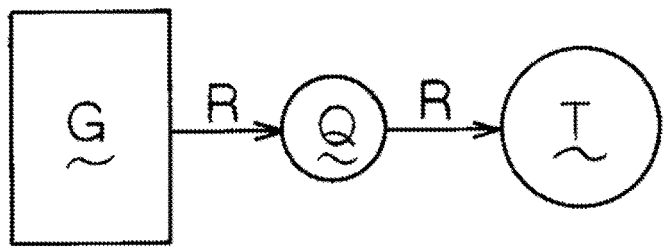
Figure 27:
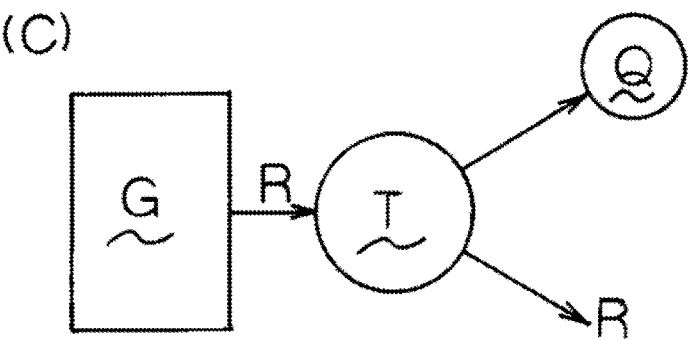

FIG. 27(A), FIG. 27(B), and FIG. 27(C) are diagrams showing embodiments other than those described above with respect to the method of separating a processed material after processing.

FIG. 28(A) and FIG. 28(B) are each an enlarged sectional view of an important part for explaining an inclined surface (a pressure-receiving surface) arranged in the processing member.

Figure 29:
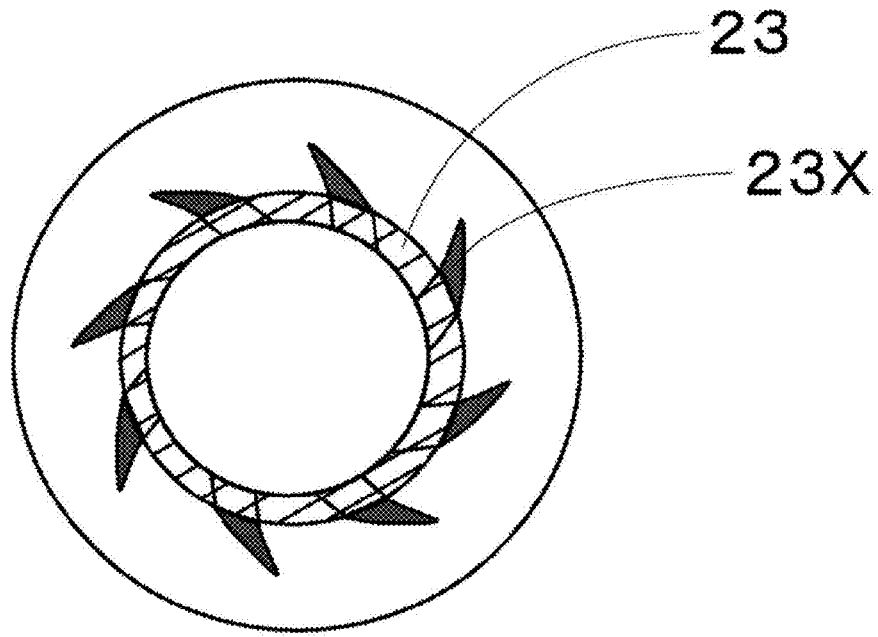
Figure 29:
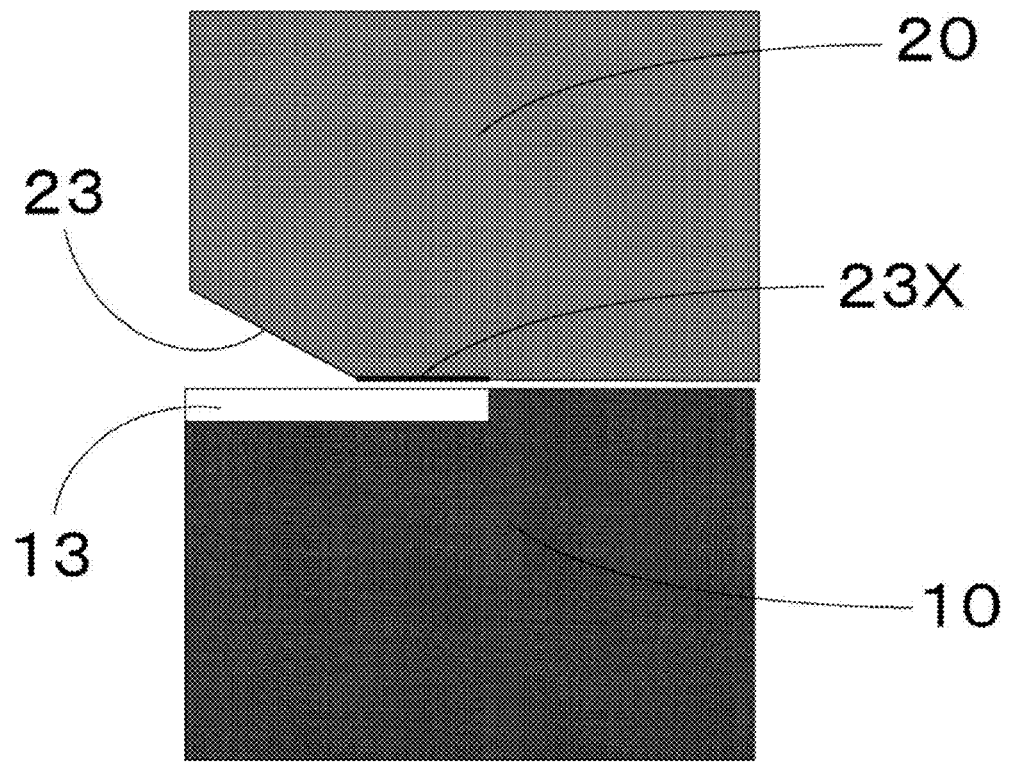

FIG. 29 is a drawing for explaining a pressure-receiving surface arranged in the processing member, and FIG. 29(A) is a bottom view of the second processing member, and FIG. 29(B) is an enlarged sectional view of an important part.

FIG. 30(A) is a schematic plane view of the first processing surface arranged with a separate depression, and FIG. 30(B) is an enlarged view of the important part of FIG. 30(A).

Figure 31:
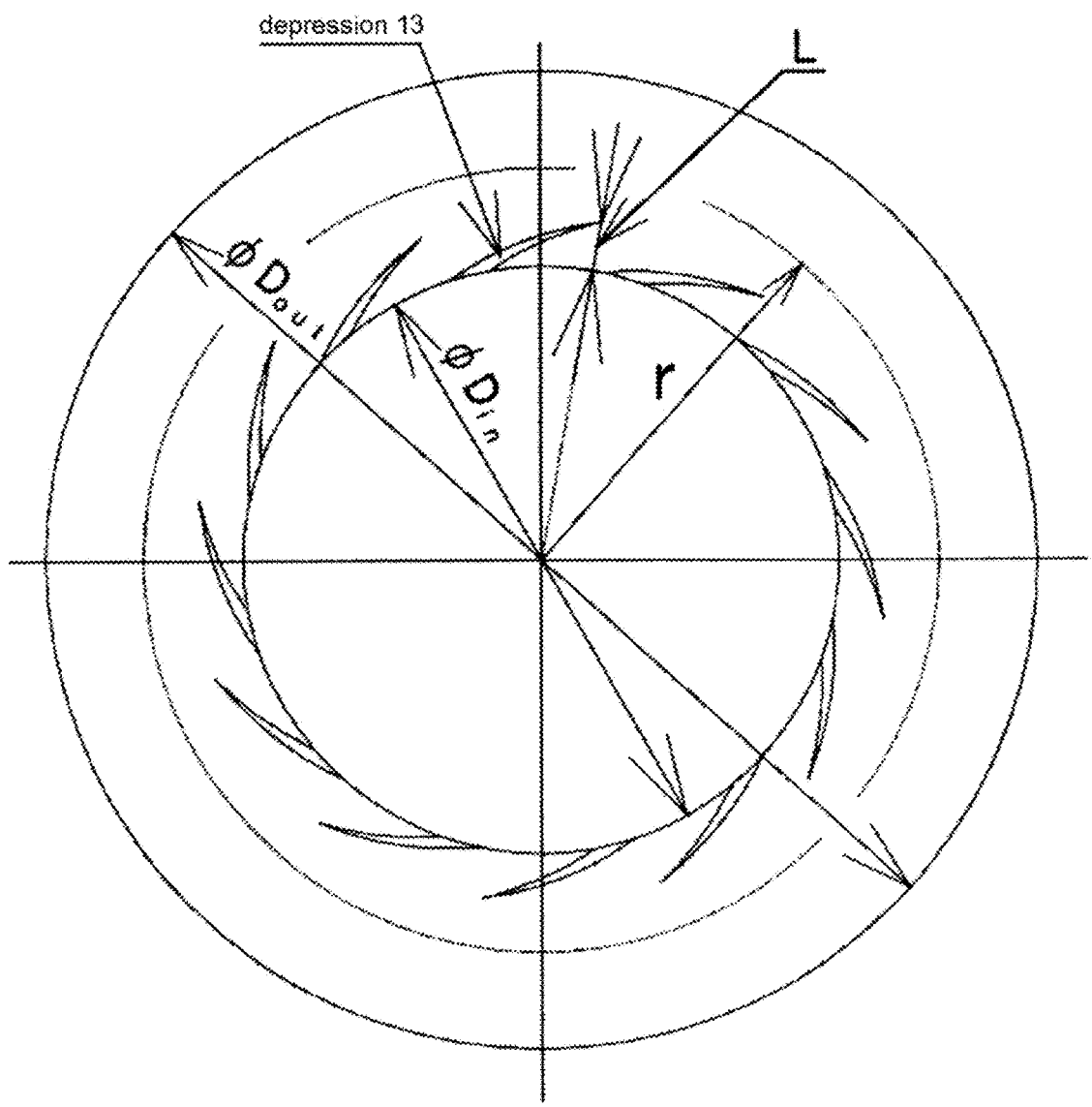
Figure 32:
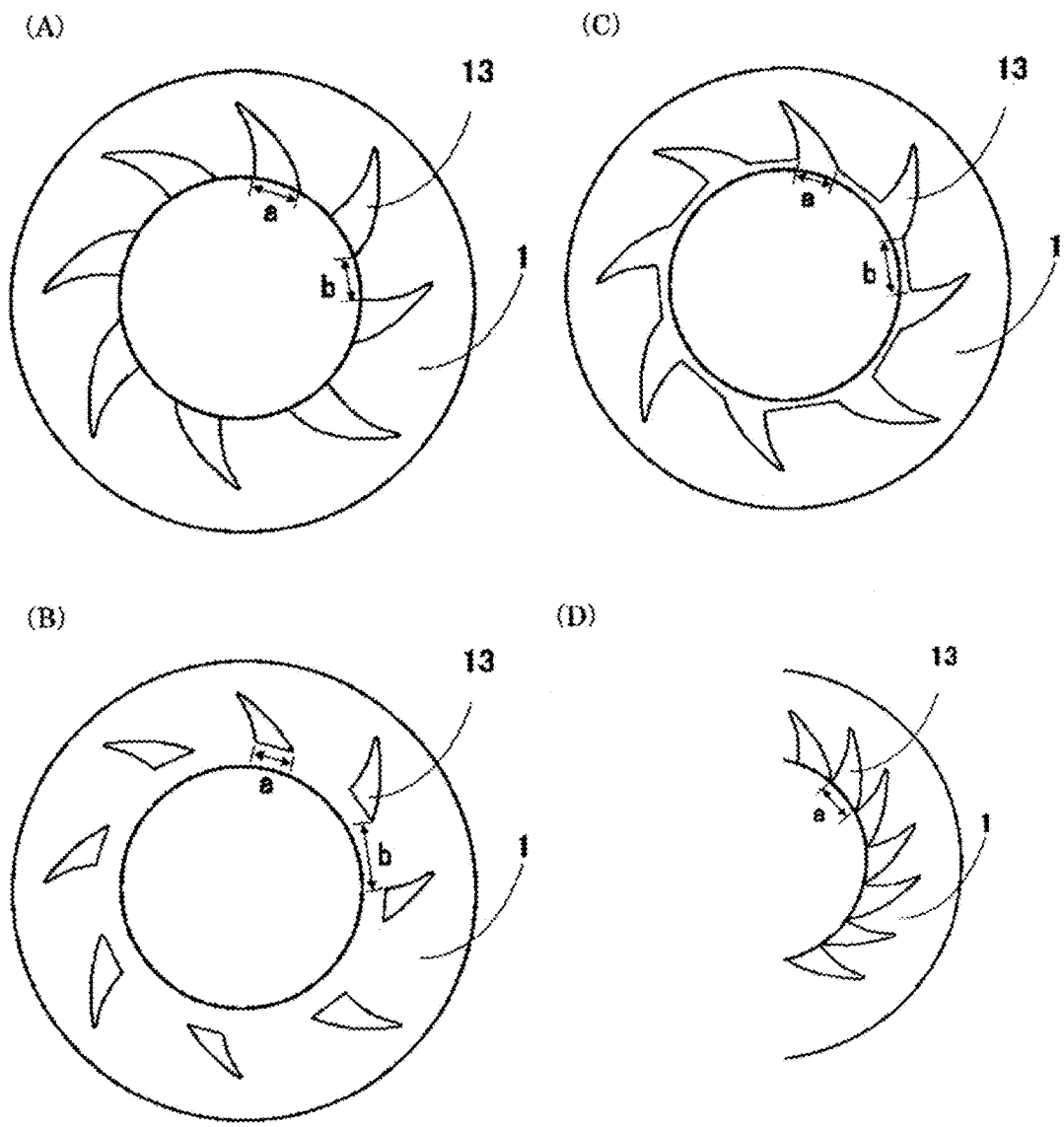

FIG. 31 is a drawing to explain respective sizes of the first processing surface used in numerical simulation.

FIG. 32(A) to FIG. 32(D) are drawings to explain one embodiment of the depression.

FIG. 33(A) to FIG. 33(C) show pressure distributions between processing surfaces by the numerical simulation.

FIG. 34(A) and FIG. 34(B) show pressure distributions between processing surfaces by the numerical simulation.

Figure 35:
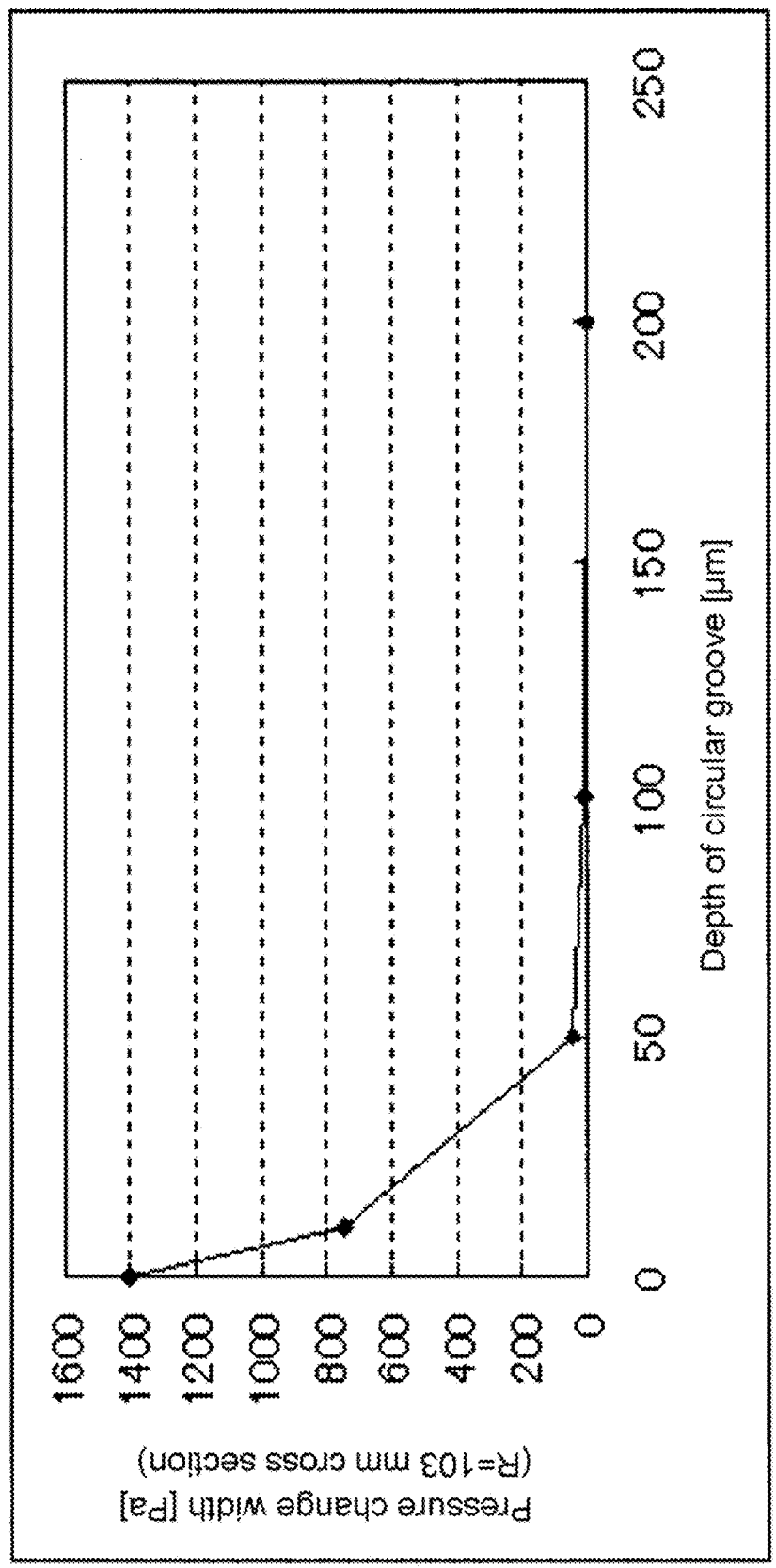

FIG. 35 is a graph showing effect of depth of the pulsation-reducing depression having a circular ring form to the pressure change of the fluid between processing surfaces.

Figure 1:
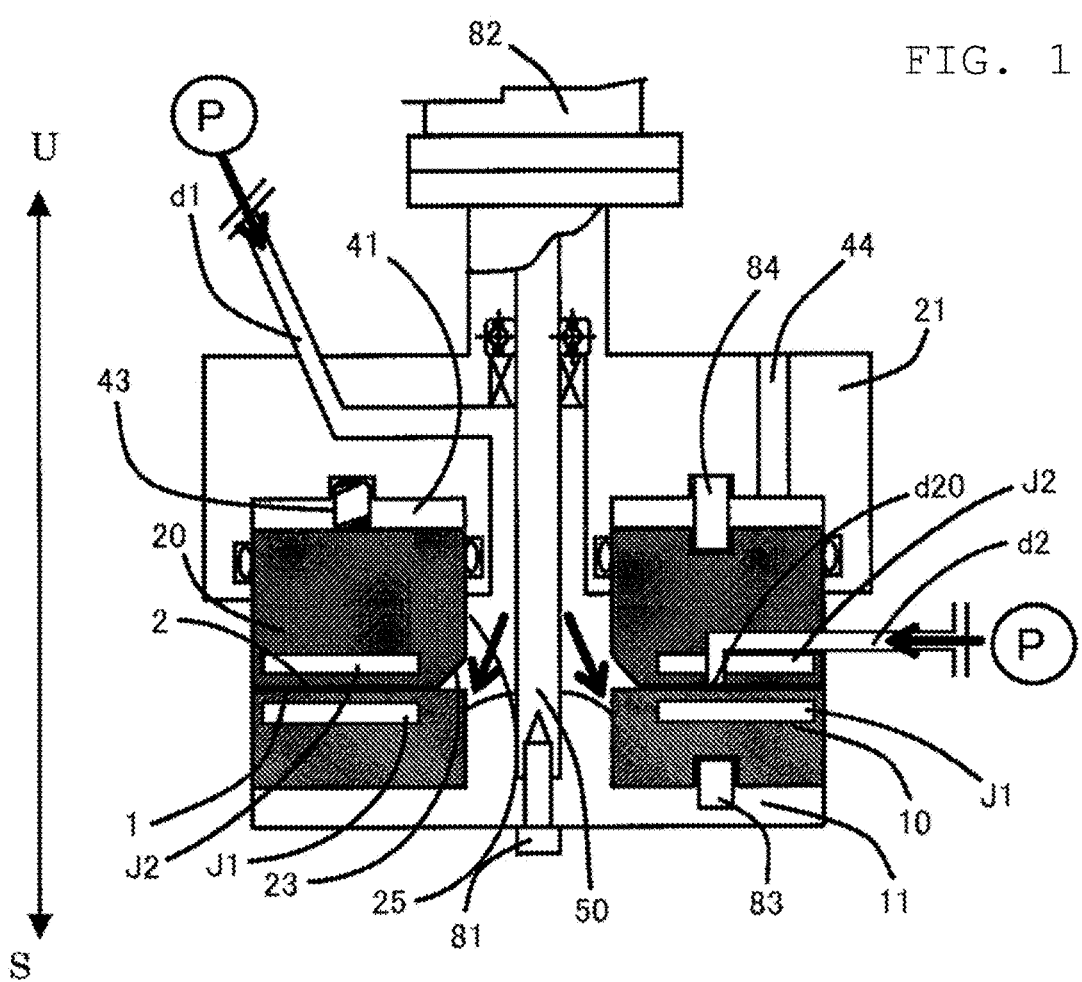
FIG. 1 is a schematic vertical sectional view showing outline of the apparatus of the present invention.

Hereinafter, preferable embodiments of the present invention will be described with reference to the drawings. FIG. 1 is a schematic sectional view of a fluid processing apparatus wherein reactants are reacted between processing surfaces, at least one of which rotates relative to the other, and which are capable of approaching to and separating from each other. FIG. 2(A) is a schematic plane view of the first processing surface in the apparatus shown in FIG. 1, and FIG. 2(B) is an enlarged view of an important part of the processing surface in the apparatus shown in FIG. 1. FIG. 3(A) is a sectional view of the second introduction path, and FIG. 3(B) is an enlarged view of an important part for explaining the second introduction path.

In FIG. 1, arrows U and S show upward and downward directions respectively.

In FIG. 2(A) and FIG. 3(B), arrow R shows the direction of rotation.

In FIG. 3(B), arrow C shows the direction of centrifugal force (radial direction).

This apparatus uses at least two fluids as fluids to be processed, at least one of which contains at least one kind of material to be processed, and the fluids to be processed join together in the space between the processing surfaces arranged to be opposite so as to be able to approach to and separate from each other, at least one of which rotates relative to the other, thereby forming a thin film fluid, and the materials to be processed are processed in the thin film fluid. In more detail, this is an apparatus wherein a first fluid which is the first fluid to be processed among fluids to be processed is introduced into between the processing surfaces, and a second fluid which is the second fluid to be processed among fluids to be processed is introduced into between the processing surfaces through a separate flow path having an opening leading to a space between the processing surfaces, the said flow path being independent of a flow path through which the first fluid is introduced, whereby processing thereof is effected by mixing/stirring of the first fluid and the second fluid between the processing surfaces. Meanwhile, the term "processing" mentioned above includes not only an embodiment in which a material to be processed is reacted but also an embodiment in which only mixing/stirring is effected without accompanying a reaction. The term "reaction" mentioned above corresponds to various reactions including deposition and crystallization. As mentioned above, this apparatus can process not only a plurality of fluids to be processed but also a single fluid to be processed.

As shown in FIG. 1, this apparatus includes a first holder 11, a second holder 21 arranged over the first holder 11, a fluid pressure imparting mechanism P and a surface-approaching pressure imparting mechanism. The surface-approaching pressure imparting mechanism is comprised of a spring 43 and an air introduction part 44.

The first holder 11 is provided with a first processing member 10 and a rotary shaft 50 (referred to hereinafter as shaft 50). The first processing member 10 is a circular body called a maintaining ring and provided with a mirror-polished first processing surface 1. The rotary shaft 50 is fixed to the center of the first holder 11 with a fixing device 81 such as a bolt and is connected at its rear end to a rotation drive device 82 (rotation drive mechanism) (referred to hereinafter rotation drive mechanism as rotation drive member or drive member), and the drive power of the rotation drive device 82 is transmitted to the first holder 11 thereby rotating the first holder 11. The first processing member 10 is integrated with the first holder 11 and rotated.

A receiving part capable of receiving the first processing member 10 is arranged on the upper part of the first holder 11, wherein the first processing member 10 has been fixed to the first holder 11 by insertion to the receiving part. The first processing member 10 has been fixed with a rotation-preventing pin 83 so as not to be rotated relative to the first holder 11. However, a method such as fitting by burning may be used for fixing in place of the rotation-preventing pin 83 in order to prevent rotation.

The first processing surface 1 is exposed from the first holder 11 and faced with the second holder 21. The material for the first processing member 10 and the first processing surface 1 includes ceramics, sintered metal, abrasion-resistant steel, sapphire, other hardened metals, and rigid materials subjected to lining, coating or plating.

The second holder 21 is provided with a second processing member 20, a first introduction part d1 for introducing a fluid from the inside of the processing member, a spring 43 as a surface-approaching pressure imparting mechanism, and an air introduction part 44.

The second processing member 20 is a circular member called a compression ring and includes a second processing surface 2 subjected to mirror polishing and a pressure-receiving surface 23 (referred to hereinafter as separation regulating surface 23) which is located inside the second processing surface 2 and adjacent to the second processing surface 2. Meanwhile, in the present invention, the pressure-receiving surface 23 is not essential; and thus, the present invention can be effected without having the pressure-receiving surface 23 arranged. As shown in the drawings, the separation regulating surface 23 is an inclined surface. The method of the mirror polishing to which the second processing surface 2 was subjected is the same as that to the first processing surface 1. The material for the second processing member 20 may be the same as one for the first processing member 10. The separation regulating surface 23 is adjacent to the inner periphery 25 of the circular second processing member 20.

A ring-accepting part 41 is formed in the bottom (lower part) of the second holder 21, and the second processing member 20 together with an O-ring is accepted in the ring-accepting part 41. The second processing member 20 is accepted with a rotation preventive 84 so as not to be rotated relative to the second holder 21. The second processing surface 2 is exposed from the second holder 21. In this state, the second processing surface 2 is faced with the first processing surface 1 of the first processing member 10.

The ring-accepting part 41 arranged in the second holder 21 is a depression for mainly accepting that side of the second processing member 20 which is opposite to the processing surface 2 and is a groove formed in a circular form when viewed in a plane.

The ring-accepting part 41 is formed in a larger size than the second processing member 20 and accepts the second processing member 20 with sufficient clearance between itself and the second processing member 20.

By this clearance, the second processing member 20 is accepted in the ring-accepting part 41 such that it can be displaced not only in the axial direction of the accepting part 41 but also in a direction perpendicular to the axial direction. The second processing member 20 is accepted in the ring-accepting part 41 such that the central line (axial direction) of the second processing member 20 can be displaced so as not to be parallel to the axial direction of the ring-accepting part 41.

The spring 43 is arranged as a processing member-biasing part in at least the ring-accepting part 41 of the second holder 21. The spring 43 biases the second processing member 20 toward the first processing member 10. As another bias method, air pressure such as one in the air introduction part 44 or another pressurization means for applying fluid pressure may be used to bias the second processing member 20 held by the second holder 21 in the direction of approaching the second processing member 20 to the first processing member 10. In addition, other forces such as a magnetic force and a gravitational force may be used as other bias methods.

The surface-approaching pressure imparting mechanism such as the spring 43 or the air introduction part 44 biases each position (each position in the processing surface) in the circumferential direction of the second processing member 20 evenly toward the first processing member 10.

The first introduction part d1 is arranged on the center of the second holder 21, and the fluid to be processed which is pressure-fed from the first introduction part d1 to the outer periphery of the processing member is first introduced into the space surrounded with the second processing member 20 held by the second holder 21, the first processing member 10, and the first holder 11 that holds the first processing member 10. Then, the feeding pressure (supply pressure) of the fluid to be processed by the fluid pressure imparting mechanism P is applied to the pressure-receiving surface 23 arranged in the second processing member 20, in the direction of separating the second processing member 20 from the first processing member 10 against the bias of the processing member biasing part.

For simplifying the description of other components, only the pressure-receiving surface 23 is described, and as shown in FIG. 29(A) and FIG. 29(B), properly speaking, together with the pressure-receiving surface 23, a part 23X not provided with the pressure-receiving surface 23, out of the projected area in the axial direction relative to the second processing member 20 in a groove-like depression 13 described later, serves as a pressure-receiving surface and receives the feeding pressure (supply pressure) of the fluid to be processed by the fluid pressure imparting mechanism P.

In the present invention, as shown in FIG. 2(A), the effect (micro-pump effect) of introduction of the fluid to be processed into between the processing surfaces, the effect being obtained by rotation of the first processing surface 1 which is provided with the groove-like depression 13, is used. The micro-pump effect is an effect that the fluid to be processed which received pressure from the inner periphery by rotation of the first processing surface 1 advances with a speed toward the front end of the depression 13 in the circumferential direction thereby generating a dynamic pressure which finally becomes the pressure to the direction of separating the processing surfaces whereby simultaneously introducing the fluid to be processed into between the processing surfaces. Further, even if there is no rotation, the pressure applied to the fluid to be processed in the depression 13 arranged on the first processing surface 1 finally acts on the second processing surface 2 as the pressure-receiving surface which acts for separation.

Figure 2:
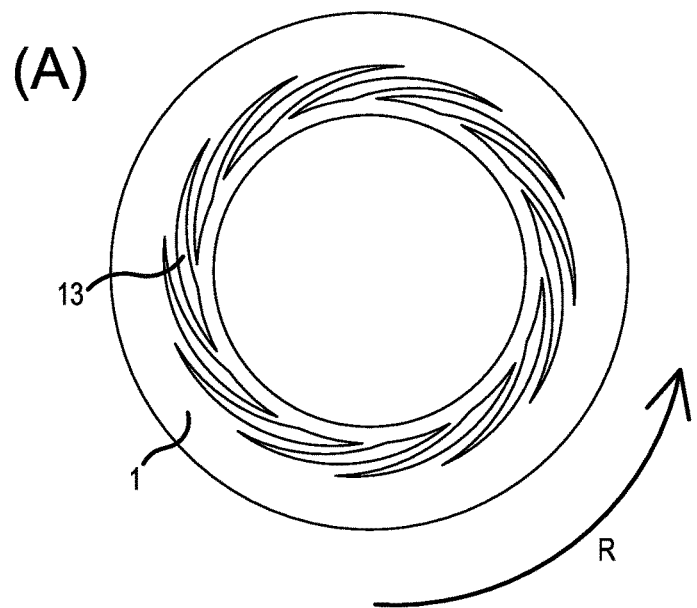
FIG. 2(A) is a schematic plane view of the first processing surface in the apparatus shown in FIG. 1.
FIG. 2(B) is an enlarged view showing an important part of the first processing surface in the apparatus shown in FIG. 1.
Figure 2:
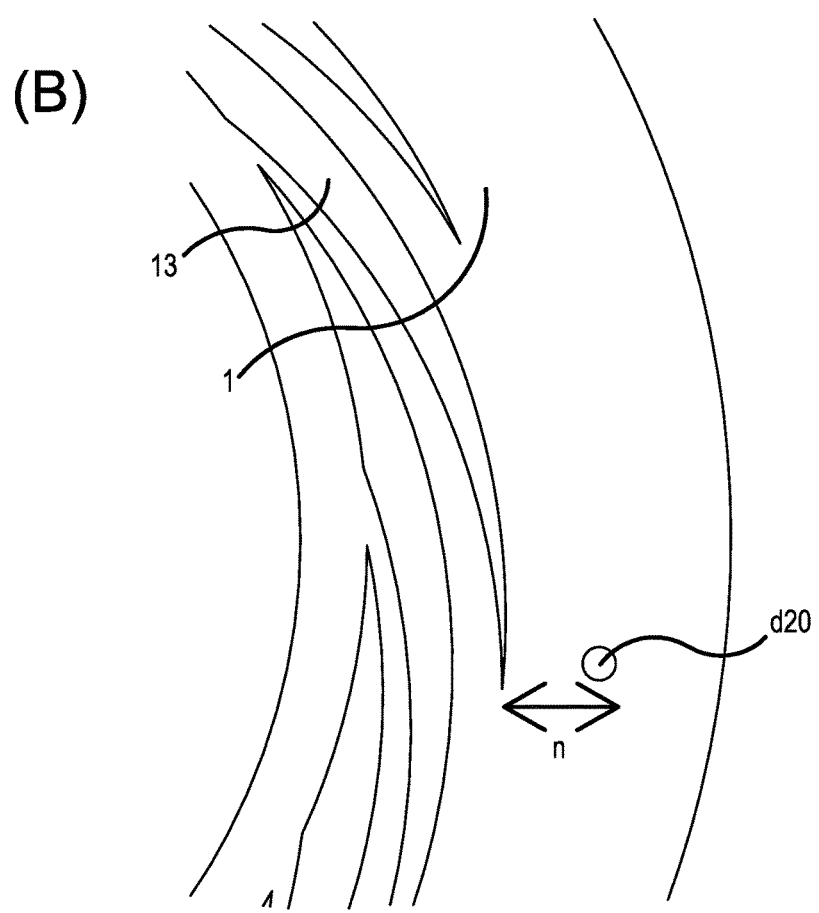
Figure 3:
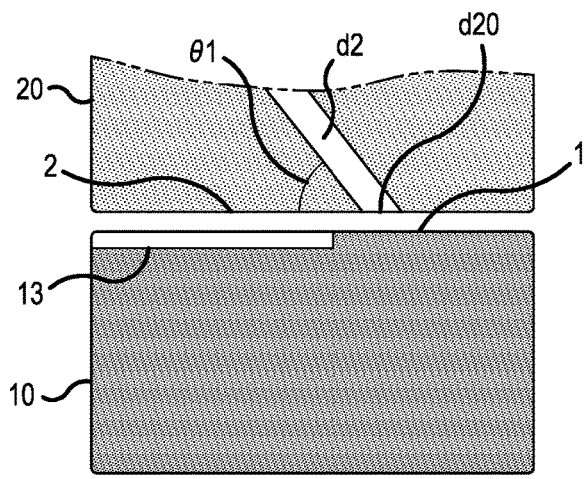
FIG. 3(A) is a sectional view of the second introduction path.
FIG. 3(B) is an enlarged view showing an important part of the processing surface for explaining the second introduction path.
Figure 3:
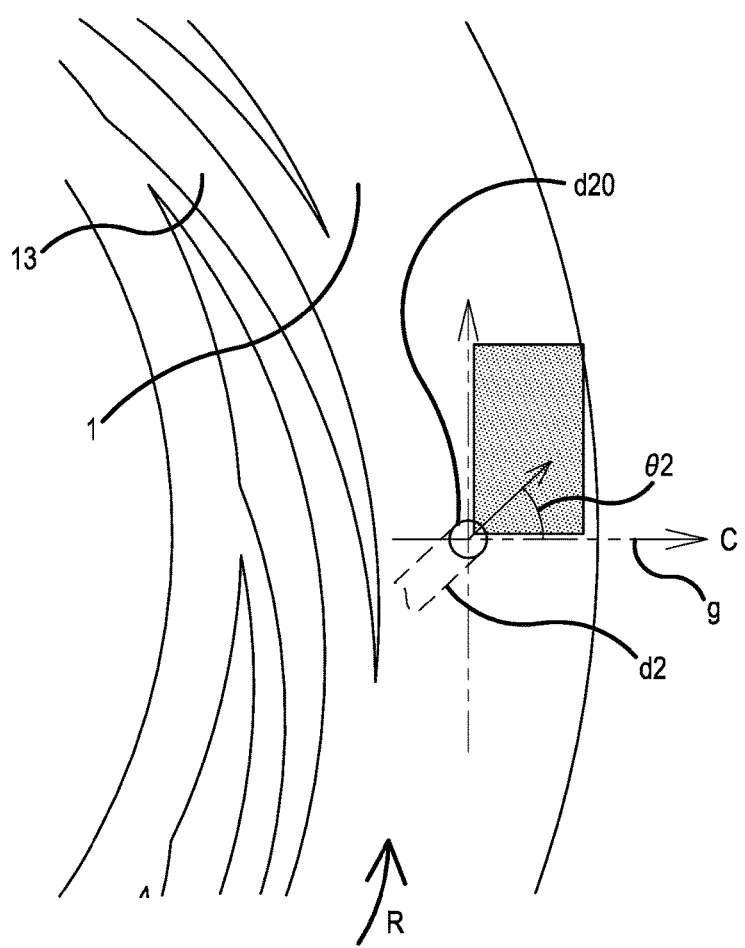

As to the groove-like depression 13, as shown in FIG. 2, a plurality of the depressions 13 is arranged in the circumferential direction of the first processing surface 1 of the first processing member 10 and each groove-like depression 13 is formed so as to be extended in the direction from a center side to an outer side of the first processing member 10, namely in the direction towards inside and outside of the processing surface 1. A form of this depression 13 in its plane view may be curved or spirally extended on the first processing surface 1 as shown in FIG. 2(B) and FIG. 19(A); or may be extended straightly in the outer direction, or bent at a right angle and the like or jogged, as shown in FIG. 19(B) to (C); or may be continuous, or intermittent, or branched. This depression 13 may be formed on at least any one of the first processing surface 1 and the second processing surface 2; and thus, it may be formed on the second processing surface 2, or on both the first and second processing surfaces 1 and 2. Accordingly, it can be said that the groove-like depression 13 is the depression 13 which is for introduction of the fluid to be processed into between the processing surfaces 1 and 2. Meanwhile, the present invention may be effected by arranging only the depression 13 without arranging the pressure-receiving surface 23, or may be effected by arranging both the depression 13 and the pressure-receiving surface 23 in the same apparatus. In this case, in the depression 13 arranged in the first processing surface 1, a part where the slanted pressure-receiving surface 23 contacts the first processing surface 1 becomes an inlet port of the fluid to be processed. In other words, as shown in FIGS. 29(A) and (B), in the projection view of the depression 13 versus the second processing member 20 in the axis direction, the most inner circumferential side of the part 23X, which is not arranged with the pressure-receiving surface 23, becomes the inlet port of the fluid to be processed. The effect (micro-pump effect) of introduction of the fluid to be processed is determined by width and depth of the depression 13 in this part and the distance between the depressions 13.

Due to the micro-pump effect generated by rotation of the first processing member 10 and the depression 13 arranged on the first processing surface 1, the fluid to be processed can be introduced continuously while securing minute and uniform thickness of a thin film fluid formed between the processing surfaces 1 and 2. However, each of the depressions 13 generates pressure; and thus, pulsation occurs simultaneously when the fluid to be processed is introduced by using the micro-pump effect. By this pulsation, pressure change or flow disturbance is caused in the fluid between the processing surfaces 1 and 2. As a result, there has been sometimes a difficulty to carry out operations (processing) such as mixing, reaction, and precipitation of at least two kinds of fluids to be processed between the respective processing surfaces 1 and 2 uniformly and always under the same condition. Especially, the first fluid and the second fluid, which are introduced from the first introduction part d1 into the space between the processing surfaces 1 and 2, are mixed at the position outside the radius of the opening d20 which is arranged in the processing surface of this apparatus to introduce the second fluid; and thus, because the opening d20 is located very near to the depression 13, to reduce the pressure change or flow disturbance near to it is very important to carry out uniform mixing stably.

Accordingly, to analyze the effect of number of the depression 13 arranged on the first processing surface 1 to the pressure change of the fluid between respective processing surfaces 1 and 2, numerical simulation of the effect of number of the depression 13 arranged on the first processing surface 1 to the pressure change of the fluid to be processed between the processing surfaces 1 and 2 caused by the micro-pump was carried out by a fluid analysis. In FIG. 31, size conditions and names of the first processing surface 1 used in the numerical simulation are shown. In this numerical calculation, outer diameter ($\varphi$Dout) of the rotating first processing surface 1 is assumed 300 mm. As to the depression 13 arranged on the processing surface 1, inner diameter ($\varphi$Din) of the part at which the pressure-receiving surface 23 contacts the first processing surface 1 is assumed 180 mm; and number of the depression 13 for calculation is assumed for three cases of 48, 60, and 72. Meanwhile, the part at which the pressure-receiving surface 23 contacts the first processing surface 1 is located as mentioned before, or in other words, as shown in FIGS. 29(A) and (B), it is the most inner circumferential side of the part 23X not arranged with the pressure-receiving surface 23 in the projection view of the depression 13 versus the second processing member 20 in the axis direction. Further, as shown in FIG. 32(A) to (D), width of the depression 13 is assumed "a" and the distance between the depressions 13 is assumed "b" at the part where the pressure-receiving surface 23 contacts. Conditions for calculation are shown below.

Outer diameter of the first and second processing surfaces: $\varphi$Dout=300 mm Inner diameter of the part at which the pressure-receiving surface 23 contacts the first processing surface: $\varphi$Din=180 mm Length of the depression 13 in the radial direction: L=10 mm Depth of the groove of depression 13: d=8 $\mu$m Space between the first and second processing surfaces: h=10

Rotation speed of the first processing surface: omega=550 rpm

Fluid in the space: water (density $\rho$=998.2 kg/m$^3$, and viscosity $\mu$=0.001003 kg/(m·s))

Calculation results of the pressure change at the radius of r=103 mm, which is outside of the depression 13 in the radial direction, is shown in Table 1. Pressure distributions between the processing surfaces 1 and 2 are shown in FIG. 33 (48 for A, 60 for B, and 72 for C).

TABLE 1

| Calculation model | Groove width ratio a/(a + b) | Groove width a (mm) | Groove distance b (mm) | Pressure change range at radius of r = 103 mm cross section (PaG) | Pressure change width at radius of r = 103 mm cross section (Pa) |
|---|---|---|---|---|---|
| No. 1: Number of depression 13: 48 Without depression α | 0.200972 | 2.367646 | 9.413326 | 43300-44700 | 1400 |
| No. 2: Number of depression 13: 60 Without depression α | 0.251215 | | 7.057132 | 52225-52975 | 750 |
| No. 3: Number of depression 13: 72 Without depression α | 0.301458 | | 5.486336 | 60275-60700 | 425 |

Figure 33:
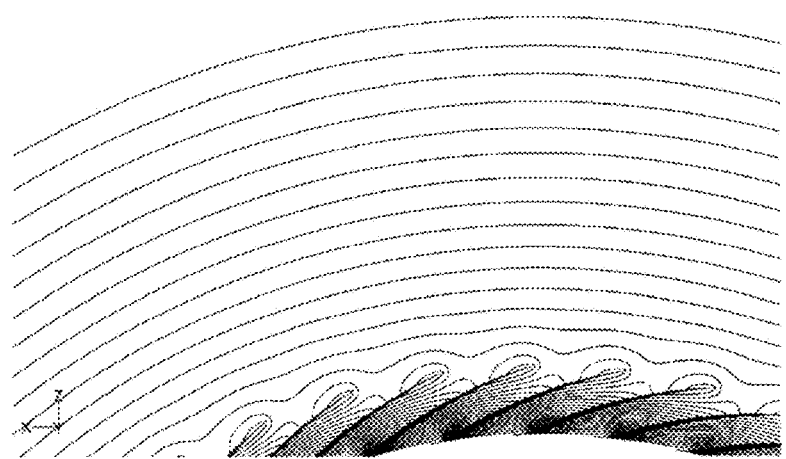
Figure 33:
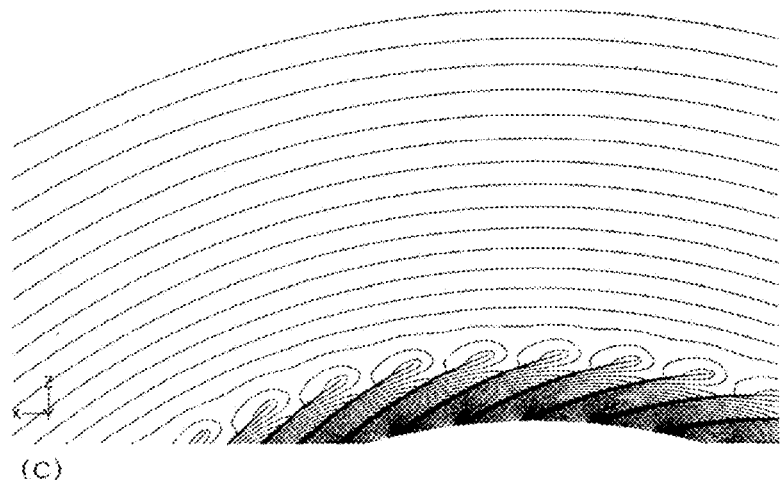
Figure 33:
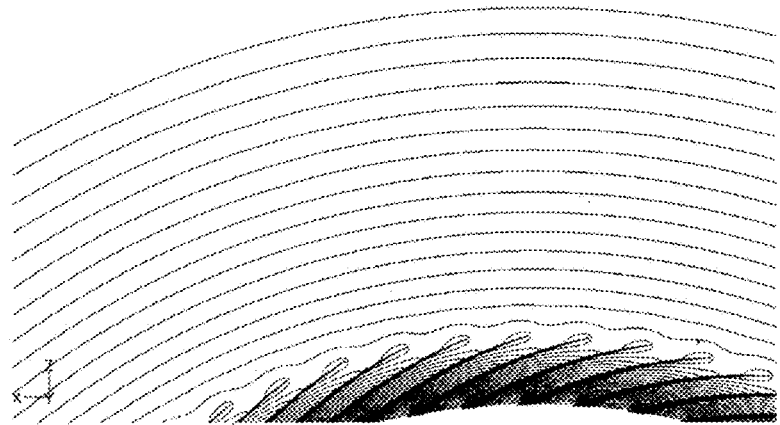

As shown in the pressure distributions between the processing surfaces 1 and 2 of FIG. 33, it can be seen that, as number of the depression 13 increases from 48 to 60, and to 72, pressure change in the front end part of the depression 13 and in the space between the depressions 13 becomes smaller.

As a result, as shown in Table 1, it can be seen that, as number of the depression 13 increases, dynamic pressure (pressure change range) generated from the depression 13 increases, while the pressure change width becomes smaller. In Patent Document 2, it is mentioned that suitable number of the depression 13 is 3 to 50; but from the viewpoint of decreasing the pressure change caused by the depression 13, increased number of the depression 13 is more effective. Accordingly, number of the depression 13 is preferably 0.5 or more per 10 mm in a circumferential direction, or more preferably 0.8 or more. When an outer diameter of the respective processing surfaces 1 and 2 is made larger for up-scaling of this apparatus, a diameter of the part at which the pressure-receiving surface 23 contacts the first processing surface 1 becomes larger too; and thus, from the view point of reducing the pressure change generated from the depression 13, it is preferable that number of the depression 13 be increased along with increase of the diameter of the respective processing surfaces 1 and 2.

Effects of pulsation to the pressure change may be further reduced by setting depth of the depression 13 preferably in the range of 1 μm to 50 μm, or more preferably 3 μm to 20 μm, by making the form thereof curved, extended spirally, or bent at a right angle, and in addition, by making depth of the depression 13 gradually shallower from inside to outside in the radial direction.

As mentioned above, by optimizing number, width, distance of the depressions 13 arranged on at least any one of the processing surfaces 1 and 2, pulsation generated in the fluid to be processed at the time of introducing the fluid to be processed into between the processing surfaces 1 and 2 by using the micro-pump effect can be made smaller, so that effects of the pressure change and the flow disturbance between the processing surfaces 1 and 2 to processing of the fluid can be reduced.

Then, as means to reduce an effect of pulsation in the fluid to be processed caused by the micro-pump effect of the depression 13 and an effect of the pressure change and the flow disturbance between the processing surfaces 1 and 2 caused by this pulsation, this inventor of the present invention found that to arrange a separate depression (hereinafter this depression is called pulsation-reducing depression), which is different from the depression 13 for introduction of the first fluid, on at least any one of the processing surfaces 1 and 2 was effective. With this means, an effect of the pressure change caused by pulsation can be reduced effectively.

Specifically, as shown in FIGS. 30(A) and (B), the pulsation-reducing depression α having a circular ring form in the front view to the processing surface is arranged outside of the depression 13 in the radial direction and inside of the opening d20 in the radial direction. Similar to the depression 13, the pulsation-reducing depression α is a groove arranged on the processing surface. The pulsation-reducing depression α has effects to reduce pulsation caused by the micro-pump effect in the fluid to be processed and to reduce an effect of the pressure change and the flow disturbance caused by the pulsation to processing of the fluid. Especially by arranging the pulsation-reducing depression α in the location between the depression 13 and the opening d20, an effect of the pressure change and the flow disturbance to the thin fluid outside the opening d20 in the radial direction, namely in the region H of FIG. 14(C), can be reduced dramatically.

In this configuration, the opening d20 is the nearest opening formed on the processing surface in the radial direction from the center of the processing members except for the depression 13, the pulsation-reducing depression, and the first flow path.

Here, the effect of arranging on the first processing surface 1 the separate depression α having a circular ring form (pulsation-reducing depression), which is different from the depression 13, to the pressure change of the fluid to be processed between the processing surfaces 1 and 2 caused by the depression 13, i.e., the effect of the pulsation-reducing depression α to the pressure change of the fluid to be processed between the processing surfaces 1 and 2 was numerically simulated by fluid analysis. The numerical calculation was done with the assumption of 48 for the number of the depression 13, 1 mm for the width of the pulsation-reducing depression α having a circular ring form, and 10 μm for the depth thereof. As to the location of the pulsation-reducing depression α, the calculation was made on each of the following cases, i.e., the case of the pulsation-reducing depression α being arranged between the depression 13 and the opening d20 and the case of the pulsation-reducing depression α being arranged so as to overlap on the outermost circumferential front end of the depression 13. As to the other conditions, the same as those used in the foregoing numerical simulation were used.

Figure 34:
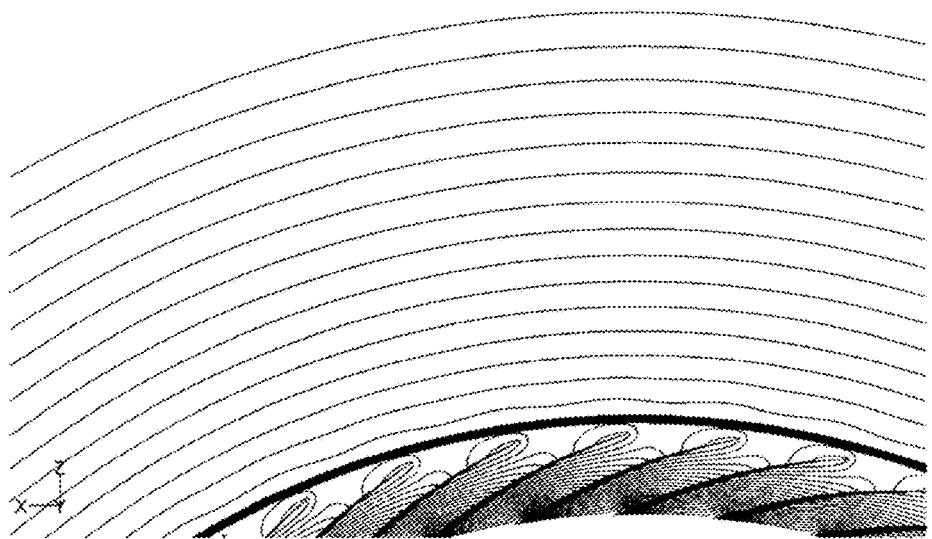
Figure 34:
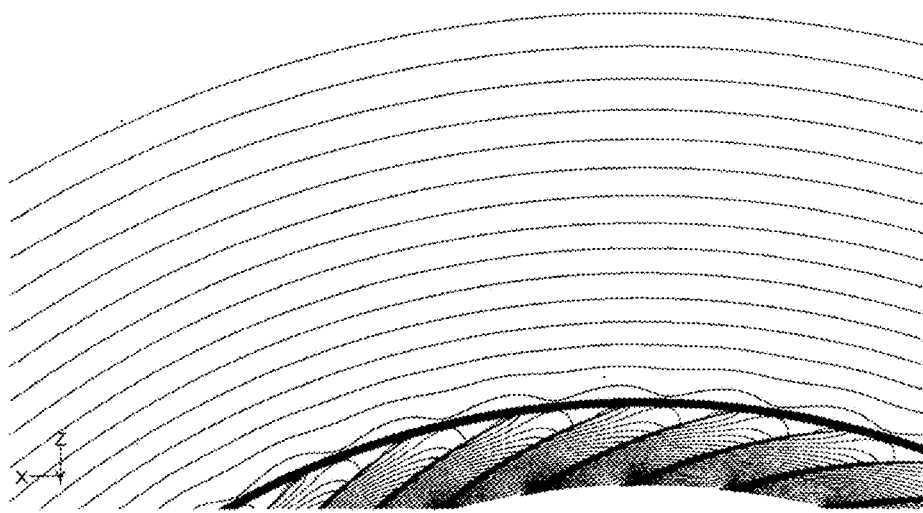

Calculation results of the pressure change at the radius of r=103 mm, which is outside of the depression 13 in the radial direction, is shown in Table 2. Pressure distributions between the processing surfaces 1 and 2 are shown in FIG. 34(A: the pulsation-reducing depression α is arranged between the depression 13 and the opening d20 while not overlapped on the depression 13, and B: the pulsation-reducing depression α overlaps on the outermost circumferential front end of the depression 13).

seen. In both cases of (A) the pulsation-reducing depression α not overlapped on the depression 13 and (B) the pulsation-reducing depression α overlapped on the outermost circumferential front end of the depression 13, it can be seen that propagation of the pressure change caused by the depression 13 from the pulsation-reducing depression α to outside thereof in the radial direction is difficult.

Further, as shown in Table 2, it can be seen that, by arranging the pulsation-reducing depression α (calculation model No. 4), the pressure change at the radius of r=103 mm is attenuated. In addition, in the calculation model No. 8, in which the pulsation-reducing depression α is overlapped on the outermost circumferential front end of the depression 13, the same effect as before with regard to the attenuation of the pressure change at the radius of r=103 mm is obtained.

Further, in the numerical simulation, an effect of change of the groove depth of the pulsation-reducing depression α (10 μm, 50 μm, 100 μm, and 200 μm) to the pressure change of the fluid to be processed between the processing surfaces 1 and 2 was analyzed. The calculation was made in the case of arranging the pulsation-reducing depression α at the location between the depression 13 and the opening d20.

TABLE 2

| Calculation model | Groove width ratio a/(a + b) | Groove width a (mm) | Groove distance b (mm) | Pressure change range at radius of r = 103 mm cross section (PaG) | Pressure change width at radius of r = 103 mm cross section (Pa) |
|---|---|---|---|---|---|
| No. 1: Number of depression 13 (depth of 8 μm): 48 Without depression α | 0.200972 | 2.367646 | 9.413326 | 43300-44700 | 1400 |
| No. 4: Number of depression 13 (depth of 8 μm): 48 With depression α (depth of 10 μm, width of 1 mm, not overlapped with depression 13) | | | | 44475-45225 | 750 |
| No. 8: Number of depression 13 (depth of 8 μm): 48 With depression α (depth of 10 μm, width of 1 mm, overlapped with depression 13) | | | | 44325-45075 | 750 |

As can be seen in the pressure distributions in FIG. 33(A) and FIG. 34, it is shown that, by arranging the pulsation-reducing depression α, the pressure change caused by the depression 13 is attenuated by the pulsation-reducing depression α; and in addition, the way how the pressure change is not propagated from the pulsation-reducing depression α to outside thereof in the radial direction can be Calculation results of the pressure change at the radius of r=103 mm, which is outside of the depression 13 in the radial direction, is shown in Table 3 and FIG. 35. It can be seen that the pressure change is significantly attenuated when depth of the pulsation-reducing depression α is 50 μm or more; and the attenuation effect is almost constant when the depth thereof is 100 μm or more.

TABLE 3

| Calculation model | Groove width ratio a/(a + b) | Groove width a (mm) | Groove distance b (mm) | Pressure change range at radius of r = 103 mm cross section (PaG) | Pressure change width at radius of r = 103 mm cross section(Pa) |
|---|---|---|---|---|---|
| No. 1: Number of depression 13 (depth of 8 μm): 48 Without depression α | 0.200972 | 2.367646 | 9.413326 | 43300-44700 | 1400 |
| No. 4: Number of depression 13 (depth of 8 μm): 48 With depression α (depth of 10 μm, width of 1 mm, not overlapped with depression 13) | | | | 44475-45225 | 750 |
| No. 5: Number of depression 13 (depth of 8 μm): 48 With depression α (depth of 50 μm, not overlapped with depression 13) | | | | 44932-44977 | 45 |
| No. 6: Number of depression 13 (depth of 8 μm): 48 With depression α (depth of 100 μm, width of 1 mm, not overlapped with depression 13) | | | | 44946-44953.5 | 7.5 |
| No. 7: Number of depression 13 (depth of 8 μm): 48 With depression α (depth of 200 μm, width of 1 mm, not overlapped with depression 13) | | | | 44935-44937 | 2 |

A form of the pulsation-reducing depression α is not particularly restricted; but from results of the foregoing numerical simulation, a form of a circular ring as shown in FIG. 30 is preferable. Number of the pulsation-reducing depression α is not particularly restricted; but in the case that a plurality thereof is arranged, it is preferable that they be arranged on a concentric circle. Further, the pulsation-reducing depression α may be arranged on at least any one of the first and second processing surfaces 1 and 2, or both of the first and second processing surfaces 1 and 2. In addition, the pulsation-reducing depression α may be arranged in the location so as to be overlapped or not to be overlapped on the depression 13. Further, depth of the pulsation-reducing depression α is not particularly restricted; but to reduce effect of the pulsation and the pressure change and flow disturbance caused therefrom, the depth thereof is preferably 20 μm to 1 mm, more preferably 50 to 500 μm, or most preferably 100 μm to 250 μm. Width of the pulsation-reducing depression α is not particularly restricted; but to reduce effect of the pulsation and the pressure change and flow disturbance caused therefrom, the width thereof is preferably 0.5 mm to 5 mm, or more preferably 1 mm to 3 mm. The pulsation-reducing depression α may be formed in the form of a circular ring; and it may be formed continuously as shown in FIG. 30, or intermittently.

By the betterment as mentioned above, fluid processing such as mixing, reaction, separation, and crystallization between the processing surfaces 1 and 2 can be carried out more uniformly (homogeneously), effectively, and rapidly than ever.

Hereinafter, a fluid processing apparatus suitable for carrying out the present invention, including the parts described above and other parts, will be described.

As shown in FIG. 4(A), this apparatus includes opposing first and second processing members 10 and 20, at least one of which rotates to the other. The opposing surfaces of both the processing members 10 and 20 serve as processing surfaces 1 and 2 to process a fluid to be processed therebetween. The first processing member 10 includes a first processing surface 1, and the second processing member 20 includes a second processing surface 2.

Both the processing surfaces 1 and 2 are connected to a flow path of the fluid to constitute a part of the flow path of the fluid.

Specifically, this apparatus constitutes flow paths of at least two fluids to be processed and joins the flow paths together.

That is, this apparatus is connected to a flow path of a first fluid to form a part of the flow path of the first fluid and simultaneously forms a part of a flow path of a second fluid other than the first fluid. This apparatus joins both the flow paths together thereby mixing and when the mixing is accompanied by reaction, reacting both the fluids between the processing surfaces 1 and 2. In the embodiment shown in FIG. 4(A), each of the flow paths is hermetically closed and made liquid-tight (when the processed fluid is a liquid) or air-tight (when the processed fluid is a gas). Meanwhile, the mixing mentioned above may be effected under the condition of a laminar flow or a turbulent flow.

Specifically, this apparatus as shown in FIG. 4(A) includes the first processing member 10, the second processing member 20, a first holder 11 for holding the first processing member 10, a second holder 21 for holding the second processing member 20, a surface-approaching pressure imparting mechanism 4, a rotation drive member, a first introduction part d1, a second introduction part d2, a fluid pressure imparting mechanism p1, a second fluid supply part p2, and a case 3.

An illustration of the rotation drive member is omitted.

At least one of the first processing member 10 and the second processing member 20 is able to approach to and separate from each other, and the processing surfaces 1 and 2 are able to approach to and separate from each other.

In this embodiment, the second processing member 20 approaches to and separates from the first processing member 10. On the contrary, the first processing member 10 may approach to and separate from the second processing member 20, or both the processing members 10 and 20 may approach to and separate from each other.

The second processing member 20 is disposed over the first processing member 10, and the lower surface of the second processing member 20 serves as the second processing surface 2, and the upper surface of the first processing member 10 serves as the first processing surface 1.

As shown in FIG. 4(A), the first processing member 10 and the second processing member 20 in this embodiment are circular bodies, that is, rings. Hereinafter, the first processing member 10 is referred to as a first ring 10, and the second processing member 20 as a second ring 20.

Both the rings 10 and 20 in this embodiment are metallic members having, at one end, a mirror-polished surface, respectively, and their mirror-polished surfaces are referred to as the first processing surface 1 and the second processing surface 2, respectively. That is, the upper surface of the first ring 10 is mirror-polished as the first processing surface 1, and the lower surface of the second ring 20 is mirror-polished as the second processing surface 2.

At least one of the holders can rotate relative to the other holder by the rotation drive member. In FIG. 4(A), numerical 50 indicates a rotary shaft of the rotation drive member. The rotation drive member may use an electric motor. By the rotation drive member, the processing surface of one ring can rotate relative to the processing surface of the other ring.

In this embodiment, the first holder 11 receives drive power on the rotary shaft 50 from the rotation drive member and rotates relative to the second holder 21, whereby the first ring 10 integrated with the first holder 10 rotates relative to the second ring 20. Inside the first ring 10, the rotary shaft 50 is disposed in the first holder 11 so as to be concentric, in a plane, with the center of the circular first ring 10.

The first ring 10 rotates centering on the shaft center of the first ring 10. The shaft center (not shown) is a virtual line referring to the central line of the first ring 10.

In this embodiment as described above, the first holder 11 holds the first ring 10 such that the first processing surface 1 of the first ring 10 is directed upward, and the second holder 21 holds the second ring 20 such that the second processing surface 2 of the second ring 20 is directed downward.

Specifically, the first and second holders 11 and 21 include a ring-accepting depression part, respectively. In this embodiment, the first ring 10 is fitted in the ring-accepting part of the first holder 11, and the first ring 10 is fixed in the ring-accepting part so as not to rise from, and set in, the ring-accepting part of the first holder 11.

That is, the first processing surface 1 is exposed from the first holder 11 and faces the second holder 21.

Examples of the material for the first ring 10 include metal, ceramics, sintered metal, abrasion-resistant steel, sapphire, metal subjected to hardening treatment, and rigid materials subjected to lining, coating or plating. The first processing member 10 is preferably formed of a lightweight material for rotation. A material for the second ring 20 may be the same as that for the first ring 10.

The ring-accepting part 41 arranged in the second holder 21 accepts the processing surface 2 of the second ring 20 such that the processing surface can rise and set.

The ring-accepting part 41 of the second holder 21 is a concave portion for mainly accepting that side of the second ring 20 opposite to the processing surface 2, and this concave portion is a groove which has been formed into a circle when viewed in a plane.

The ring-accepting part 41 is formed to be larger in size than the second ring 20 so as to accept the second ring 20 with sufficient clearance between itself and the second ring 20.

By this clearance, the second ring 20 in the ring-accepting part 41 can be displaced not only in the axial direction of the circular ring-accepting part 41 but also in a direction perpendicular to the axial direction. In other words, the second ring 20 can, by this clearance, be displaced relative to the ring-accepting part 41 to make the central line of the second ring 20 unparallel to the axial direction of the ring-accepting part 41.

Hereinafter, that portion of the second holder 21 which is surrounded by the second ring 20 is referred to as a central portion 22.

In other words, the second ring 20 is displaceably accepted within the ring-accepting part 41 not only in the thrust direction of the ring-accepting part 41, that is, in the direction in which the ring 20 rises from and sets in the part 41, but also in the decentering direction of the ring 20 from the center of the ring-accepting part 41. Further, the second ring 20 is accepted in the ring-accepting part 41 such that the second ring 20 can be displaced (i.e. run-out) to vary the width between itself upon rising or setting and the ring-accepting part 41, at each position in the circumferential direction of the second ring 20.

The second ring 20, while maintaining the degree of its move in the above three directions, that is, the axial direction, decentering direction and run-out direction of the second ring 20 relative to the ring-accepting part 41, is held on the second holder 21 so as not to follow the rotation of the first ring 10. For this purpose, suitable unevenness (not shown) for regulating rotation in the circumferential direction of the ring-accepting part 41 may be arranged both in the ring-accepting part 41 and in the second ring 20. However, the unevenness should not deteriorate displacement in the degree of its move in the three directions.

The surface-approaching pressure imparting mechanism 4 supplies the processing members with force exerted in the direction of approaching the first processing surface 1 and the second processing surface 2 each other. In this embodiment, the surface-approaching pressure imparting mechanism 4 is disposed in the second holder 21 and biases the second ring 20 toward the first ring 10.

The surface-approaching pressure imparting mechanism 4 uniformly biases each position in the circumferential direction of the second ring 20, that is, each position of the second processing surface 2, toward the first ring 10. A specific structure of the surface-approaching pressure imparting mechanism 4 will be described later.

As shown in FIG. 4(A), the case 3 is arranged outside the outer circumferential surfaces of both the rings 10 and 20, and accepts a product formed between the processing surfaces 1 and 2 and discharged to the outside of both the rings 10 and 20. As shown in FIG. 4(A), the case 3 is a liquid-tight container for accepting the first holder 11 and the second holder 21. However, the second holder 21 may be that which as a part of the case, 3 is integrally formed with the case 3.

As described above, the second holder 21, whether formed as a part of the case 3 or formed separately from the case 3, is not movable so as to influence the distance between both the rings 10 and 20, that is, the distance between the processing surfaces 1 and 2. In other words, the second holder 21 does not influence the distance between the processing surfaces 1 and 2.

The case 3 is provided with an outlet 32 for discharging a product to the outside of the case 3.

The first introduction part d1 supplies a first fluid to the space between the processing surfaces 1 and 2.

The fluid pressure imparting mechanism p1 is connected directly or indirectly to the first introduction part d1 to impart fluid pressure to the first processed fluid. A compressor or a pump can be used in the fluid pressure imparting mechanism p1.

In this embodiment, the first introduction part d1 is a fluid path arranged inside the central part 22 of the second holder 21, and one end of the first introduction part d1 is open at the central position of a circle, when viewed in a plane, of the second ring 20 on the second holder 21. The other end of the first introduction part d1 is connected to the fluid pressure imparting mechanism p1 outside the second holder 21, that is, outside the case 3.

The second introduction part d2 supplies a second fluid to be mixed with the first fluid to the space between the processing surfaces 1 and 2. In this embodiment, the second introduction part is a fluid path arranged inside the second ring 20, and one end of the second introduction part is open at the side of the second processing surface 2, and a second fluid supply part p2 is connected to the other end.

A compressor or a pump can be used in the second fluid supply part p2.

The first processed fluid pressurized with the fluid pressure imparting mechanism p1 is introduced from the first introduction part d1 to the inside of the space between the rings 10 and 20 and will pass through the space between the first processing surface 1 and the second processing surface 2 to the outside of the rings 10 and 20.

At this time, the second ring 20 receiving the supply pressure of the first fluid stands against the bias of the surface-approaching pressure imparting mechanism 4, thereby receding from the first ring 10 and making a minute space between the processing surfaces. The space between both the processing surfaces 1 and 2 by approach and separation of the surfaces 1 and 2 will be described in detail later.

A second fluid is supplied from the second introduction part d2 to the space between the processing surfaces 1 and 2, flows into the first fluid, and is subjected to a mixing (reaction) promoted by rotation of the processing surface. Then, a product formed by the mixing (reaction) of both the fluids is discharged from the space between the processing surfaces 1 and 2 to the outside of the rings 10 and 20. The reaction product discharged to the outside of both the rings 10 and 20 is discharged finally through the outlet 32 of the case 3 to the outside of the case 3. (self-discharge)

The mixing (reaction) of the processed fluid are effected between the first processing surface 1 and the second processing surface 2 by rotation, relative to the second processing member 20, of the first processing member 10 with the drive member 5.

Between the first and second processing surfaces 1 and 2, a region downstream from an opening m2 of the second introduction part d2 serves as a reaction chamber where the first and second processed fluids are reacted with each other. Specifically, as shown in FIG. 14(C) illustrating a bottom face of the second ring 20 between both the processing surfaces 1 and 2, a region H shown by oblique lines, outside the second opening m2 of the second introduction part in the radial direction r1 of the second ring 20, serves as the processing chamber. Accordingly, this processing chamber is located downstream from the openings m1 and m2 of the first introduction part d1 and the second introduction part d2 between the processing surfaces 1 and 2.

The first fluid introduced from the first opening m1 through a space inside the ring into the space between the processing surfaces 1 and 2, and the second fluid introduced from the second opening m2 into the space between the processing surfaces 1 and 2, are mixed with each other in the region H serving as the processing chamber, and if the mixing is accompanied by reaction, both the processed fluids are reacted with each other. The fluid will, upon receiving supply pressure from the fluid pressure imparting mechanism p1, move through the minute space between the processing surfaces 1 and 2 to the outside of the rings, but because of rotation of the first ring 10, the fluid mixed in the region H does not move linearly from the inside to the outside of the rings in the radial direction, but moves from the inside to the outside of the ring spirally around the rotary shaft of the ring when the processing surfaces are viewed in a plane. In the region H where the fluids are thus mixed (reacted), the fluids can move spirally from inside to outside to secure a zone necessary for sufficient mixing (reaction) in the minute space between the processing surfaces 1 and 2, thereby promoting their uniform reaction.

The product formed by the mixing (reaction) becomes a uniform product in the minute space between the first processing surface 1 and the second processing surface 2 and appears as microparticles particularly in the case of crystallization or separation.

By the balance among at least the supply pressure applied by the fluid pressure imparting mechanism p1, the bias of the surface-approaching pressure imparting mechanism 4, and the centrifugal force resulting from rotation of the ring, the distance between the processing surfaces 1 and 2 can be balanced to attain a preferable minute space, and further the processed fluid receiving the supply pressure applied by the fluid pressure imparting mechanism p1 and the centrifugal force by rotation of the ring moves spirally in the minute space between the processing surfaces 1 and 2, so that their mixing (reaction) is promoted.

The mixing (reaction) is forcedly effected by the supply pressure applied by the fluid pressure imparting mechanism p1 and the rotation of the ring. That is, the mixing (reaction) occurs forcedly and uniformly between the processing surfaces 1 and 2 arranged opposite to each other so as to be able to approach to and separate from each other, at least one of which rotates relative to the other.

Accordingly, the crystallization and separation of the product formed can be regulated by relatively easily controllable methods such as regulation of supply pressure applied by the fluid pressure imparting mechanism p1 and regulation of the rotating speed of the ring, that is, the number of revolutions of the ring.

As described above, this fluid processing apparatus is excellent in that the space between the processing surfaces 1 and 2, which can exert influence on the size of a product, and the distance in which the processed fluid moves in the reaction region H, which can exert influence on production of a uniform product, can be regulated by the supply pressure and the centrifugal force.

The processing gives not only deposit of the product but also liquids. When the product is fine mass such as microparticles, it may be a deposit in the fluid after processing or may be in a dispersion state in which a dispersion phase is present in a continuous phase.

The rotary shaft 50 is not limited to the vertically arranged one and may be arranged in the horizontal direction or arranged at a slant. This is because during processing, the reaction occurs in such a minute space between the processing surfaces 1 and 2 that the influence of gravity can be substantially eliminated.

In FIG. 4(A), the first introduction part d1 extends vertically and coincides with the shaft center of the second ring 20 in the second holder 21. However, the first introduction part d1 is not limited to the one having a center coinciding with the shaft center of the second ring 20 and may be arranged in other positions in the central portion 22 of the second holder 21 as long as the first fluid can be supplied into the space surrounded by the rings 10 and 20, and the first introduction part d1 may extend obliquely as well as vertically.

A more preferable embodiment of the apparatus is shown in FIG. 15(A). As shown in this figure, the second processing member 20 has the second processing surface 2 and a pressure-receiving surface 23 which is positioned inside, and situated next to, the second processing surface 2. Hereinafter, the pressure-receiving surface 23 is also referred to as a separation-regulating surface 23. As shown in the figure, the separation-regulating surface 23 is an inclined surface.

As described above, the ring-accepting part 41 is formed in the bottom (i.e. a lower part) of the second holder 21, and the second processing member 20 is accepted in the ring-accepting part 41. The second processing member 20 is held by the second holder 21 so as not to be rotated with a baffle (not shown). The second processing surface 2 is exposed from the second holder 21.

In this embodiment, a material to be processed is introduced inside the first processing member 10 and the second processing member 20 between the processing surfaces 1 and 2, and the processed material is discharged to the outside of the first processing member 10 and the second processing member 20.

The surface-approaching pressure imparting mechanism 4 presses by pressure the second processing surface 2 against the first processing surface 1 to make them contacted with or close to each other, and generates a film fluid of predetermined thickness by the balance between the surface-approaching pressure and the force, e.g. fluid pressure, of separating the processing surfaces 1 and 2 from each other. In other words, the distance between the processing surfaces 1 and 2 is kept in a predetermined minute space by the balance between the forces.

Specifically, the surface-approaching pressure imparting mechanism 4 in this embodiment is comprised of the ring-accepting part 41, a spring-accepting part 42 arranged in the depth of the ring-accepting part 41, that is, in the deepest part of the ring-accepting part 41, a spring 43, and an air introduction part 44.

However, the surface-approaching pressure imparting mechanism 4 may be the one including at least one member selected from the ring-accepting part 41, the spring-accepting part 42, the spring 43, and the air introduction part 44.

The ring-accepting part 41 has the second processing member 20 fit into it with play to enable the second processing member 20 to be displaced vertically deeply or shallowly, that is, vertically in the ring-accepting part 41.

One end of the spring 43 is abutted against the depth of the spring-accepting part 42, and the other end of the spring 43 is abutted against the front (i.e., the upper part) of the second processing member 20 in the ring-accepting part 41. In FIG. 1, only one spring 43 is shown, but a plurality of springs 43 are preferably used to press various parts of the second processing member 20. This is because as the number of springs 43 increases, pressing pressure can be given more uniformly to the second processing member 20. Accordingly, several to a few dozen springs 43 comprising a multi-spring type preferably attach to the second holder 21.

In this embodiment, air can be introduced through the air introduction part 44 into the ring-accepting part 41. By such introduction of air, air pressure together with pressure by the spring 43 can be given as pressing pressure from the space, as a pressurizing chamber, between the ring-accepting part 41 and the second processing member 20 to the second processing member 20. Accordingly, adjusting the pressure of air introduced through the air introduction part 44 can regulate the surface-approaching pressure of the second processing surface 2 toward the first processing surface 1 during operation. A mechanism of generating pressing pressure with another fluid pressure such as oil pressure can be utilized in place of the air introduction part 44 utilizing air pressure.

The surface-approaching pressure imparting mechanism 4 not only supplies and regulates a part of the pressing pressure, that is, the surface-approaching pressure, but also serves as a displacement regulating mechanism and a buffer mechanism.

Specifically, the surface-approaching pressure imparting mechanism 4 as a displacement regulating mechanism can maintain initial pressing pressure by regulating air pressure against the change in the axial direction caused by elongation or abrasion at the start of or in the operation. As described above, the surface-approaching pressure imparting mechanism 4 uses a floating mechanism of maintaining the second processing member 20 so as to be displaced, thereby also functioning as a buffer mechanism for microvibration or rotation alignment.

Now, the state of the thus constituted processing apparatus during use is described with reference to FIG. 4(A).

At the outset, a first processed fluid is pressurized with the fluid pressure imparting mechanism p1 and introduced through the first introduction part d1 into the internal space of the sealed case. On the other hand, the first processing member 10 is rotated with the rotation of the rotary shaft 50 by the rotation drive member. The first processing surface 1 and the second processing surface 2 are thereby rotated relatively with a minute space kept therebetween.

The first processed fluid is formed into a film fluid between the processing surfaces 1 and 2 with a minute space kept therebetween, and a second processed fluid which is introduced through the second introduction part d2 flows into the film fluid between the processing surfaces 1 and 2 to comprise a part of the film fluid. By this, the first and second processed fluids are mixed (reacted) with each other, and a uniform mixing (reaction) is promoted to form a product. When it is accompanied with a reaction, a uniform mixing (uniform reaction when the mixing is accompanied by reaction) of both the fluids being reacted with each other is promoted to form a reaction product. When the reaction is accompanied by separation, relatively uniform and fine particles can be formed. Even when the reaction is not accompanied by separation, a uniform mixing (uniform reaction when the mixing is accompanied by reaction) can be realized. The separated product may be further finely pulverized by shearing between the first processing surface 1 and the second processing surface 2 with the rotation of the first processing surface 1. The first processing surface 1 and the second processing surface 2 are regulated to form a minute space of 1 μm to 1 mm, particularly 1 μm to 10 μm, thereby realizing a uniform mixing (when the mixing accompanied by reaction, uniform reaction) and enabling formation of superfine particles of several nm in diameter.

The product is discharged from the processing surfaces 1 and 2 through an outlet 32 of the case 3 to the outside of the case. The discharged product is atomized in a vacuum or depressurized atmosphere with a well-known decompression device and converted into liquid in the atmosphere to hit each other, then what trickled down in the liquid is able to be collected as degassed liquid.

In this embodiment, the fluid processing apparatus is provided with a case, but may be carried out without a case. For example, a decompression tank for degassing, that is, a vacuum tank, is arranged, and the fluid processing apparatus may be arranged in this tank. In this case, the outlet mentioned above is naturally not arranged in the fluid processing apparatus.

As described above, the first processing surface 1 and the second processing surface 2 can be regulated to form a minute space in the order of μm which cannot be formed by arranging mechanical clearance. Now, this mechanism is described.

The first processing surface 1 and the second processing surface 2 are capable of approaching to and separating from each other, and simultaneously rotate relative to each other. In this example, the first processing surface 1 rotates, and the second processing surface 2 approaches to or separates from the first processing surface with a structure capable of moving in the axial direction (floating structure).

In this example, therefore, the position of the second processing surface 2 in the axial direction is arranged accurately in the order of μm by the balance between forces, that is, the balance between the surface-approaching pressure and the separating pressure, thereby establishing a minute space between the processing surfaces 1 and 2.

As shown in FIG. 15(A), the surface-approaching pressure includes the pressure by air pressure (positive pressure) from the air introduction part 44 by the surface-approaching pressure imparting mechanism 4, the pressing pressure with the spring 43, and the like.

The embodiments shown in FIG. 15 to FIG. 18, and FIG. 20 are shown by omitting the second introduction part d2 to simplify the drawings. In this respect, these drawings may be assumed to show sections at a position not provided with the second introduction part d2. In the figures, U and S show upward and downward directions respectively.

On the other hand, the separating force include the fluid pressure acting on the pressure-receiving surface at the separating side, that is, on the second processing surface 2 and the separation regulating surface 23, the centrifugal force resulting from rotation of the first processing member 10, and the negative pressure when negative pressure is applied to the air introduction part 44.

When the apparatus is washed, the negative pressure applied to the air introduction part 44 can be increased to significantly separate the processing surfaces 1 and 2 from each other, thereby facilitating washing.

By the balance among these forces, the second processing surface 2 while being remote by a predetermined minute space from the first processing surface 1 is stabilized, thereby realizing establishment with accuracy in the order of μm.

The separating force is described in more detail.

With respect to fluid pressure, the second processing member 20 in a closed flow path receives feeding pressure of a processed fluid, that is, fluid pressure, from the fluid pressure imparting mechanism p1. In this case, the surfaces opposite to the first processing surface in the flow path, that is, the second processing surface 2 and the separation regulating surface 23, act as pressure-receiving surfaces at the separating side, and the fluid pressure is applied to the pressure-receiving surfaces to generate a separating force due to the fluid pressure.

With respect to centrifugal force, the first processing member 10 is rotated at high speed, centrifugal force is applied to the fluid, and a part of this centrifugal force acts as separating force in the direction in which the processing surfaces 1 and 2 are separated from each other.

When negative pressure is applied from the air introduction part 44 to the second processing member 20, the negative pressure acts as separating force.

In the foregoing description of the present invention, the force of separating the first and second processing surfaces 1 and 2 from each other has been described as a separating force, and the above-mentioned force is not excluded from the separating force.

By forming a balanced state of the separating force and the surface-approaching pressure applied by the surface-approaching pressure imparting mechanism 4 via the processed fluid between the processing surfaces 1 and 2 in the flow path of the closed processed fluid, a uniform mixing (uniform reaction when the mixing is accompanied by reaction) is realized between the processing surfaces 1 and 2, and simultaneously a film fluid suitable for crystallization and separation of microscopic reaction products is formed as described above. In this manner, this apparatus can form a forced film fluid between the processing surfaces 1 and 2 via which a minute space not achievable with a conventional mechanical apparatus can be kept between the processing surfaces 1 and 2, and microparticles can be formed highly accurately as the reaction product.

In other words, the thickness of the film fluid between the processing surfaces 1 and 2 is regulated as desired by regulating the separating force and surface-approaching pressure, thereby realizing a necessary uniform mixing (uniform reaction when the mixing is accompanied by reaction) to form and process microscopic products. Accordingly, when the thickness of the film fluid is to be decreased, the surface-approaching pressure or separating force may be regulated such that the surface-approaching pressure is made relatively higher than the separating force. When the thickness of the film fluid is to be increased, the separating force or surface-approaching pressure may be regulated such that the separating force is made relatively higher than the surface-approaching pressure.

When the surface-approaching pressure is increased, air pressure, that is, positive pressure is applied from the air introduction part 44 by the surface-approaching pressure imparting mechanism 4, or the spring 43 is changed to the one having higher pressing pressure, or the number of the springs may be increased.

When the separating force is to be increased, the feeding pressure of the fluid pressure imparting mechanism p1 is increased, or the area of the second processing surface 2 or the separation regulating surface 23 is increased, or in addition, the rotation of the first processing member 10 is regulated to increase centrifugal force or reduce pressure from the air introduction part 44. Alternatively, negative pressure may be applied. The spring 43 shown is a pressing spring that generates pressing pressure in an extending direction, but may be a pulling spring that generates a force in a compressing direction to constitute a part or the whole of the surface-approaching pressure imparting mechanism 4.

When the separating force is to be decreased, the feeding pressure of the fluid pressure imparting mechanism p1 is reduced, or the area of the second processing surface 2 or the separation regulating surface 23 is reduced, or in addition, the rotation of the first processing member 10 is regulated to decrease centrifugal force or increase pressure from the air introduction part 44. Alternatively, negative pressure may be reduced.

Further, properties of a processed fluid, such as viscosity, can be added as a factor for increasing or decreasing the surface-approaching pressure and separating force, and regulation of such properties of a processed fluid can be performed as regulation of the above factor.

In the separating force, the fluid pressure exerted on the pressure-receiving surface at the separating side, that is, the second processing surface 2 and the separation regulating surface 23 is understood as a force constituting an opening force in mechanical seal.

In the mechanical seal, the second processing member 20 corresponds to a compression ring, and when fluid pressure is applied to the second processing member 20, the force of separating the second processing member 20 from the first processing member 10 is regarded as opening force.

More specifically, when the pressure-receiving surfaces at a separating side, that is, the second processing surface 2 and the separation regulating surface 23 only are arranged in the second processing member 20 as shown in the first embodiment, all feeding pressure constitutes the opening force. When a pressure-receiving surface is also arranged at the backside of the second processing member 20, specifically in the case of FIG. 15(B) and FIG. 20 described later, the difference between the feeding pressure acting as a separating force and the feeding pressure acting as surface-approaching pressure is the opening force.

Now, other embodiments of the second processing member 20 are described with reference to FIG. 15(B).

As shown in FIG. 15(B), an approach regulating surface 24 facing upward, that is, at the other side of the second processing surface 2, is disposed at the inner periphery of the second processing member 20 exposed from the ring-accepting part 41.

That is, the surface-approaching pressure imparting mechanism 4 in this embodiment is comprised of a ring-accepting part 41, an air introduction part 44, and the approach regulating surface 24. However, the surface-approaching pressure imparting mechanism 4 may be one including at least one member selected from the ring-accepting part 41, the spring-accepting part 42, the spring 43, the air introduction part 44, and the approach regulating surface 24.

The approach regulating surface 24 receives predetermined pressure applied to a processed fluid to generate a force of approaching the second processing surface 2 to the first processing surface 1, thereby functioning in feeding surface-approaching pressure as a part of the surface-approaching pressure imparting mechanism 4. On the other hand, the second processing surface 2 and the separation regulating surface 23 receive predetermined pressure applied to a processed fluid to generate a force of separating the second processing surface 2 from the first processing surface 1, thereby functioning in supplying a part of the separating force.

The approach regulating surface 24, the second processing surface 2 and the separation regulating surface 23 are pressure-receiving surfaces receiving supply pressure of the processed fluid, and depending on its direction, exhibits different actions, that is, generation of the surface-approaching pressure and generation of a separating force.

The ratio (area ratio A1/A2) of a projected area A1 of the approach regulating surface 24 projected on a virtual plane perpendicular to the direction of approaching and separating the processing surfaces, that is, in the direction of rising and setting of the second ring 20, to a total area A2 of the projected area of the second processing surface 2 and the separation regulating surface 23 of the second processing member 20 projected on the virtual plane is called balance ratio K which is important for regulation of the opening force.

Both the top of the approach regulating surface 24 and the top of the separation regulating surface 23 are defined by the inner periphery 25 of the circular second processing part 20, that is, by top line L1. Accordingly, the balance ratio is regulated for deciding the place where base line L2 of the approach regulating surface 24 is to be placed.

That is, in this embodiment, when the feeding pressure of the processed fluid is utilized as opening force, the total projected area of the second processing surface 2 and the separation regulating surface 23 is made larger than the projected area of the approach regulating surface 24, thereby generating an opening force in accordance with the area ratio.

The opening force can be regulated by the pressure of the processed fluid, that is, the fluid pressure, by changing the balance line, that is, by changing the area A1 of the approach regulating surface 24.

Sliding surface actual surface pressure P, that is, the fluid pressure out of the surface-approaching pressure, is calculated according to the following equation:

$$P = P1 \times (K-k) + Ps$$

wherein P1 represents the pressure of a processed fluid, that is, fluid pressure; K represents the balance ratio; k represents an opening force coefficient; and Ps represents a spring and back pressure.

By regulating this balance line to regulate the sliding surface actual surface pressure P, the space between the processing surfaces 1 and 2 is formed as a desired minute space, thereby forming a film fluid of a processed fluid to make the product minute and effecting uniform mixing (reaction) processing.

Usually, as the thickness of a film fluid between the processing surfaces 1 and 2 is decreased, the product can be made finer. On the other hand, as the thickness of the film fluid is increased, processing becomes rough and the throughput per unit time is increased. By regulating the sliding surface actual surface pressure P on the sliding surface, the space between the processing surfaces 1 and 2 can be regulated to realize the desired uniform mixing (uniform reaction when the mixing is accompanied by reaction) and to obtain the minute product. Hereinafter, the sliding surface actual surface pressure P is referred to as surface pressure P.

From this relation, it is concluded that when the product is to be made coarse, the balance ratio may be decreased, the surface pressure P may be decreased, the space may be increased and the thickness may be increased. On the other hand, when the product is to be made finer, the balance ratio may be increased, the surface pressure P may be increased, the space may be decreased and the thickness may be decreased.

As a part of the surface-approaching pressure imparting mechanism 4, the approach regulating surface 24 is formed, and at the position of the balance line, the surface-approaching pressure may be regulated, that is, the space between the processing surfaces may be regulated.

As described above, the space is regulated in consideration of the pressing pressure of the spring 43 and the air pressure of the air introduction part 44. Regulation of the fluid pressure, that is, the feeding pressure of the processed fluid, and regulation of the rotation of the first processing member 10 for regulating centrifugal force, that is, the rotation of the first holder 11, are also important factors to regulate the space.

As described above, this apparatus is constituted such that for the second processing member 20 and the first processing member 10 that rotates relative to the second processing member 20, a predetermined film fluid is formed between the processing surfaces by pressure balance among the supply pressure of the processed fluid, the rotation centrifugal force, and the surface-approaching pressure. At least one of the rings is formed in a floating structure by which alignment such as run-out is absorbed to eliminate the risk of abrasion and the like.

The embodiment shown in FIG. 4(A) also applies to the embodiment in FIG. 15(B) except that the regulating surfaces 23 and 24 are arranged.

The embodiment shown in FIG. 15(B) can be carried out without arranging the separation regulating surface 23 on the separating side, as shown in FIG. 20.

When the approach regulating surface 24 is arranged as shown in the embodiment shown in FIG. 15(B) and FIG. 20, the area A1 of the approach regulating surface 24 is made larger than the area A2, whereby all of the predetermined pressure exerted on the processed fluid functions as surface-approaching pressure, without generating an opening force. This arrangement is also possible, and in this case, both the processing surfaces 1 and 2 can be balanced by increasing other separating force.

With the area ratio described above, the force acting in the direction of separating the second processing surface 2 from the first processing surface 1 is fixed as the resultant force exerted by the fluid.

In this embodiment, as described above, the number of springs 43 is preferably larger in order to impart uniform stress on the sliding surface, that is, the processing surface. However, the spring 43 may be a single coil-type spring as shown in FIG. 16. As shown in the figure, this spring is a single coil spring having a center concentric with the circular second processing member 20.

The space between the second processing member 20 and the second holder 21 is sealed air-tightly with methods well known in the art.

Figure 14:
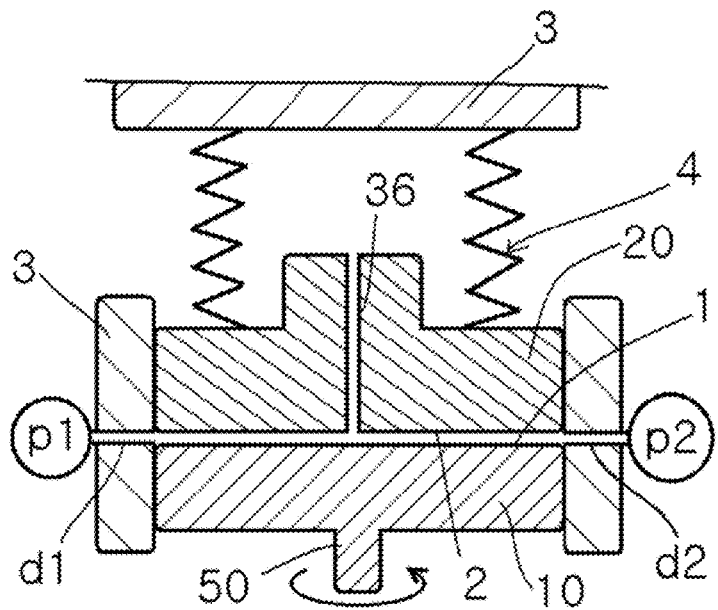
Figure 14:
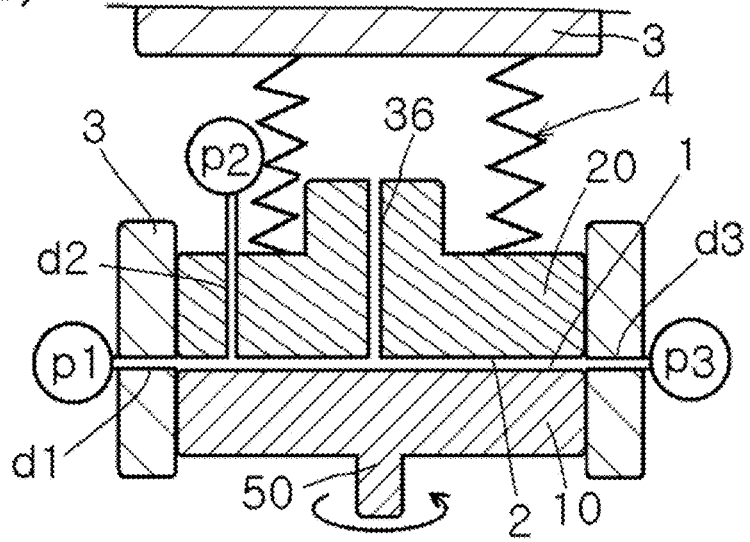
Figure 14:
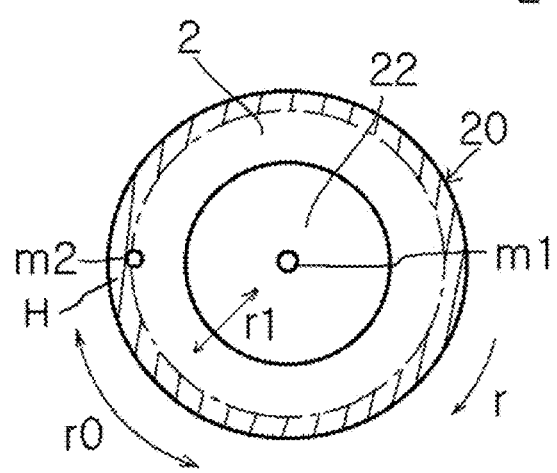

As shown in FIG. 17, the second holder 21 is provided with a temperature regulation jacket 46 capable of regulating the temperature of the second processing member 20 by cooling or heating. Numerical 3 in FIG. 14 is the above-mentioned case, and the case 3 is also provided with a jacket 35 for the same purpose of temperature regulation.

The temperature regulation jacket 46 for the second holder 21 is a water-circulating space formed at a side of the ring-accepting part 41 and communicates with paths 47 and 48 leading to the outside of the second holder 21. One of the paths 47 and 48 introduces a cooling or heating medium into the temperature regulation jacket 46, and the other discharges the medium.

The temperature regulation jacket 35 for the case 3 is a path for passing heating water or cooling water, which is arranged between the outer periphery of the case 3 and a covering part 34 for covering the outer periphery of the case 3.

In this embodiment, the second holder 21 and the case 3 are provided with the temperature regulation jacket, but the first holder 11 can also be provided with such a jacket.

As a part of the surface-approaching pressure imparting mechanism 4, a cylinder mechanism 7 shown in FIG. 18 may be arranged besides the members described above.

The cylinder mechanism 7 includes a cylinder space 70 arranged in the second holder 21, a communicating part 71 that communicates the cylinder space 70 with the ring-accepting part 41, a piston 72 that is accepted in the cylinder space 70 and connected via the communication part 71 to the second processing member 20, a first nozzle 73 that communicates to the upper part of the cylinder space 70, a second nozzle 74 that communicates to the lower part of the cylinder space 70, and a pressing body 75 such as spring between the upper part of the cylinder space 70 and the piston 72.

The piston 72 can slide vertically in the cylinder space 70, and the second processing member 20 can slide vertically with sliding of the piston 72, to change the gap between the first processing surface 1 and the second processing surface 2.

Although not shown in the figure, specifically, a pressure source such as a compressor is connected to the first nozzle 73, and air pressure, that is, positive pressure is applied from the first nozzle 73 to the upper part of the piston 72 in the cylinder space 70, thereby sliding the piston 72 downward, to narrow the gap between the first and second processing surfaces 1 and 2. Although not shown in the figure, a pressure source such as a compressor is connected to the second nozzle 74, and air pressure, that is, positive pressure is applied from the second nozzle 74 to the lower part of the piston 72 in the cylinder space 70, thereby sliding the piston 72 upward, to allow the second processing member 20 to widen the gap between the first and second processing surfaces 1 and 2, that is, to enable it to move in the direction of opening the gap. In this manner, the surface-approaching pressure can be regulated by air pressure with the nozzles 73 and 74.

Even if there is a space between the upper part of the second processing member 20 in the ring-accepting part 41 and the uppermost part of the ring-accepting part 41, the piston 72 is arranged so as to abut against the uppermost part 70a of the cylinder space 70, whereby the uppermost part 70a of the cylinder space 70 defines the upper limit of the width of the gap between the processing surfaces 1 and 2. That is, the piston 72 and the uppermost part 70a of the cylinder space 70 function as a separation preventing part for preventing the separation of the processing surfaces 1 and 2 from each other, in other words, function in regulating the maximum opening of the gap between both the processing surfaces 1 and 2.

Even if the processing surfaces 1 and 2 do not abut on each other, the piston 72 is arranged so as to abut against a lowermost part 70b of the cylinder space 70, whereby the lowermost part 70b of the cylinder space 70 defines the lower limit of the width of the gap between the processing surfaces 1 and 2. That is, the piston 72 and the lowermost part 70b of the cylinder space 70 function as an approach preventing part for preventing the approaching of the processing surfaces 1 and 2 each other, in other words, function in regulating the minimum opening of the gap between both the processing surfaces 1 and 2.

In this manner, the maximum and minimum openings of the gap are regulated, while a distance z1 between the piston 72 and the uppermost part 70a of the cylinder space 70, in other words, a distance z2 between the piston 72 and the lowermost part 70b of the cylinder space 70, is regulated with air pressure by the nozzles 73 and 74.

The nozzles 73 and 74 may be connected to a different pressure source respectively, and further may be connected to a single pressure source alternatively or switched the connections to the sources.

The pressure source may be a source applying positive or negative pressure. When a negative pressure source such as a vacuum is connected to the nozzles 73 and 74, the action described above goes to the contrary.

In place of the other surface-approaching pressure imparting mechanism 4 or as a part of the surface-approaching pressure imparting mechanism 4, such cylinder mechanism 7 is provided to set the pressure of the pressure source connected to the nozzle 73 and 74, and the distances z1 and z2 according to the viscosity and properties of the fluid to be processed in a fashion to bring the thickness value of film fluid of the fluid to a desired level under a shear force to realize a uniform mixing (uniform reaction when the mixing is accompanied by reaction) for forming fine particles. Particularly, such cylinder mechanism 7 can be used to increase the reliability of cleaning and sterilization by forcing the sliding part open and close during cleaning and steam sterilization.

The depression 13 . . . 13 is, for example, as shown in FIG. 19(A) to FIG. 19(C), a groove formed on the first processing surface 1 of the first processing member 10 so as to be extended from a center side to an outside of the first processing member 10, namely extended in a radial direction. In this case, as shown in FIG. 19(A), the depressions 13 . . . 13 can be curved or spirally elongated on the first processing surface 1, and as shown in FIG. 19(B), the individual depressions 13 may be bent at a right angle, or as shown in FIG. 19(C), the depressions 13 . . . 13 may extend straight radially.

As shown in FIG. 19(D), the depressions 13 in FIG. 19(A) to FIG. 19(C) preferably deepen gradually in the direction toward the center of the first processing surface 1. The groove-like depressions 13 may continue in sequence or intermittence.

Formation of such depression 13 may correspond to the micro-pump effect, he increase of delivery of the processed fluid or to the decrease of calorific value, while having effects of cavitation control and fluid bearing.

In the embodiments shown in FIG. 16, the depressions 13 are formed on the first processing surface 1, but may be formed on the second processing surface 2 or may be formed on both the first and second processing surfaces 1 and 2.

When the depressions 13 or tapered sections are arranged unevenly on a part of the processing surface, the influence exerted by the surface roughness of the processing surfaces 1 and 2 on the processed fluid is greater as compared with the case of arranging the depressions 13 evenly on the processing surfaces. In this case, the surface roughness should be reduced, that is, the surface should be fine-textured, as the particle size of the processed fluid are to be decreased. Particularly, regarding the surface roughness of the processing surface, the mirror surface, that is, a surface subjected to mirror polishing is advantageous in realizing uniform mixing (uniform reaction when the mixing is accompanied by reaction) for the purpose of uniform mixing (reaction), and in realizing crystallization and separation of fine monodisperse reaction products for the purpose of obtaining microparticles.

In the embodiments shown in FIG. 16 to FIG. 20, structures other than those particularly shown are the same as in the embodiments shown in FIG. 4(A) or FIG. 14(C).

In the embodiments described above, the case is closed. Alternatively, the first processing member 10 and the second processing member 20 may be closed inside but may be open outside. That is, the flow path is sealed until the processed fluid has passed through the space between the first processing surface 1 and the second processing surface 2, to allow the processed fluid to receive the feeding pressure, but after the passing, the flow path may be opened so that the processed fluid after processing does not receive feeding pressure.

The fluid pressure imparting mechanism p1 preferably uses a compressor as a pressure device described above, but if predetermined pressure can always be applied to the processed fluid, another means may be used. For example, the own weight of the processed fluid can be used to apply certain pressure constantly to the processed fluid.

In summary, the processing apparatus in each embodiment described above is characterized in that predetermined pressure is applied to a fluid to be processed, at least two processing surfaces, that is, a first processing surface 1 and a second processing surface 2 capable of approaching to and separating from each other are connected to a sealed flow path through which the processed fluid receiving the predetermined pressure flows, a surface-approaching pressure of approaching the processing surfaces 1 and 2 each other is applied to rotate the first processing surface 1 and the second processing surface 2 relative to each other, thereby allowing a film fluid used for seal in mechanical seal to be generated out of the processed fluid, and the film fluid is leaked out consciously (without using the film fluid as seal) from between the first processing surface 1 and the second processing surface 2, contrary to mechanical seal, whereby reaction processing is realized between the processed fluid formed into a film between the surfaces 1 and 2, and the product is recovered.

By this epoch-making method, the space between the processing surfaces 1 and 2 can be regulated in the range of 1 μm to 1 mm, particularly 1 μm to 10 μm.

In the embodiment described above, a flow path for a sealed fluid is constituted in the apparatus, and the processed fluid is pressurized with the fluid pressure imparting mechanism p1 arranged at the side of the introduction part (for the first processing fluid) in the fluid processing apparatus.

Alternatively, the flow path for the processed fluid may be opened without pressurization with the fluid pressure imparting mechanism p1.

Figure 22:
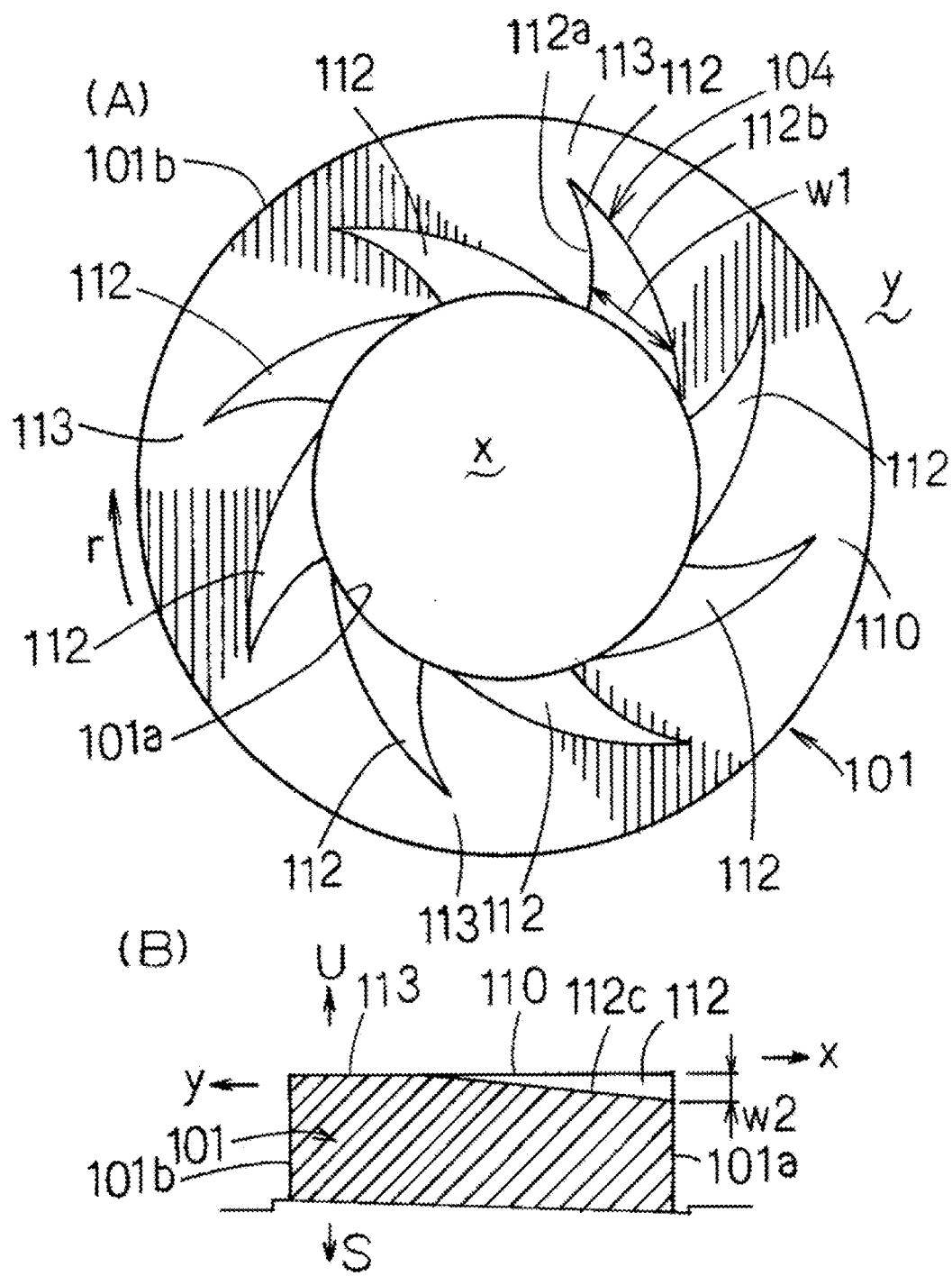
Figure 23:
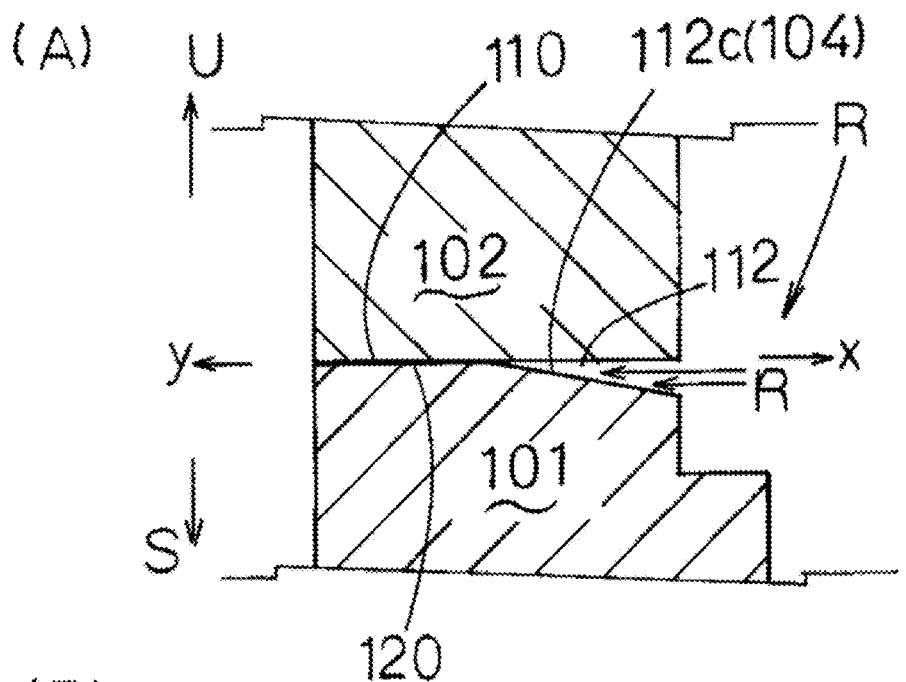
Figure 23:
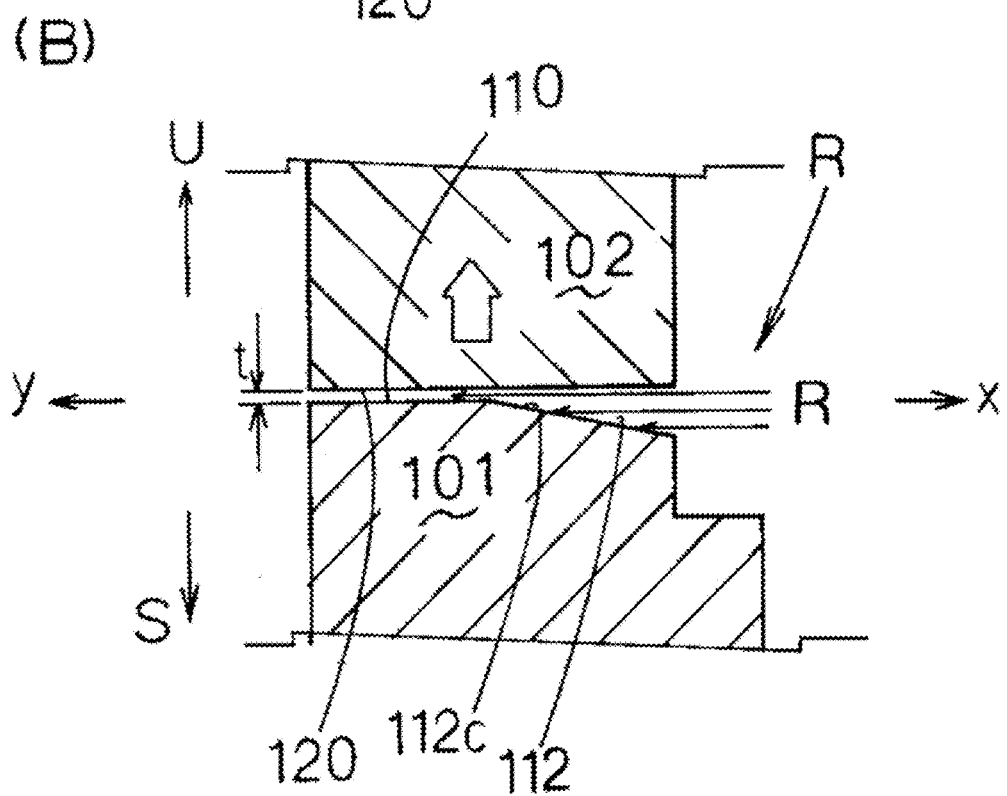

One embodiment of the fluid processing apparatus is shown in FIG. 21 to FIG. 23. The fluid processing apparatus illustrated in this embodiment is an apparatus including a mechanism of removing a liquid from the formed product thereby finally securing objective solids (crystals) only.

FIG. 21(A) is a schematic vertical sectional view of the fluid processing apparatus, and FIG. 21(B) is its partially cut enlarged sectional view. FIG. 22 is a plane view and an important part of a vertical sectional view of the first processing member 101 arranged in the fluid processing apparatus in FIG. 21. FIG. 23 is a partially cut schematic vertical sectional view showing an important part of the first and second processing members 101 and 102 in the processing apparatus.

As described above, the apparatus shown in FIG. 21 to FIG. 23 is the one into which a fluid as the object of processing, that is, a processed fluid, or a fluid carrying the object of processing, is to be introduced at atmospheric pressure.

In FIG. 21(B) and FIG. 23, the second introduction part d2 is omitted for simplicity of the drawing (these drawings can be regarded as showing a section at the position where the second introduction part d2 is not arranged).

As shown in FIG. 21(A), this fluid processing apparatus includes a mixing apparatus G and a decompression pump Q. This mixing apparatus G includes a first processing member 101 as a rotating member, a first holder 111 for holding the processing member 101, a second processing member 102 that is a member fixed to the case, a second holder 121 having the second processing member 102 fixed thereto, a bias mechanism 103, a dynamical pressure generating mechanism 104 (FIG. 22(A)), a drive part which rotates the first processing member 101 with the first holder 111, a housing 106, a first introduction part d1 which supplies (introduces) a first processed fluid, and a discharge part 108 that discharges the fluid to the decompression pump Q. The drive part is not shown.

The first processing member 101 and the second processing member 102 are cylindrical bodies that are hollow in the center. The processing members 101 and 102 are members wherein the bottoms of the processing members 101 and 102 in a cylindrical form are processing surfaces 110 and 120 respectively.

The processing surfaces 110 and 120 have a mirror-polished flat part. In this embodiment, the processing surface 120 of the second processing member 102 is a flat surface subjected as a whole to mirror polishing. The processing surface 110 of the first processing member 101 is a flat surface as a whole like the second processing member 102, but has a plurality of grooves 112 . . . 112 in the flat surface as shown in FIG. 22(A). The grooves 112 . . . 112 while centering on the first processing member 101 in a cylindrical form extend radially toward the outer periphery of the cylinder.

The processing surfaces 110 and 120 of the first and second processing members 101 and 102 are mirror-polished such that the surface roughness Ra comes to be in the range of 0.01 to 1.0 μm. By this mirror polishing, Ra is regulated preferably in the range of 0.03 μm to 0.3

The material for the processing members 101 and 102 is one which is rigid and capable of mirror polishing. The rigidity of the processing members 101 and 102 is preferably at least 1500 or more in terms of Vickers hardness. A material having a low linear expansion coefficient or high thermal conductance is preferably used. This is because when the difference in coefficient of expansion between a part which generates heat upon processing and other parts is high, distortion is generated and securement of suitable clearance is influenced.

As the material for the processing members 101 and 102, it is preferable to use particularly SIC, that is, silicon carbide, SIC having a Vickers hardness of 2000 to 2500, SIC having a Vickers hardness of 3000 to 4000 coated thereon with DLC (diamond-like carbon), WC, that is, tungsten carbide having a Vickers hardness of 1800, WC coated thereon with DLC, and boron ceramics represented by $ZrB_2$, BTC and $B_4C$ having a Vickers hardness of 4000 to 5000.

The housing 106 shown in FIG. 21, the bottom of which is not shown though, is a cylinder with a bottom, and the upper part thereof is covered with the second holder 121. The second holder 121 has the second processing member 102 fixed to the lower surface thereof, and the introduction part d1 is arranged in the upper part thereof. The introduction part d1 is provided with a hopper 170 for introducing a fluid or a processed material from the outside.

Although not shown in the figure, the drive part includes a power source such as a motor and a shaft 50 that rotates by receiving power from the power source.

As shown in FIG. 21(A), the shaft 50 is arranged in the housing 106 and extends vertically. Then, the first holder 111 is arranged on the top of the shaft 50. The first holder 111 is to hold the first processing member 101 and is arranged on the shaft 50 as described above, thereby allowing the processing surface 110 of the first processing member 101 to correspond to the processing surface 120 of the second processing member 102.

The first holder 111 is a cylindrical body, and the first processing member 101 is fixed on the center of the upper surface. The first processing member 101 is fixed so as to be integrated with the first holder 111, and does not change its position relative to the first holder 111.

On the other hand, a receiving depression 124 for receiving the second processing member 102 is formed on the center of the upper surface of the second holder 121.

The receiving depression 124 has a circular cross-section. The second processing member 102 is accepted in the cylindrical receiving depression 124 so as to be concentric with the receiving depression 124.

The structure of the receiving depression 124 is similar to that in the embodiment as shown in FIG. 4(A) (the first processing member 101 corresponds to the first ring 10, the first holder 111 to the first holder 11, the second processing member 102 to the second ring 20, and the second holder 121 to the second holder 21).

Then, the second holder 121 is provided with the bias mechanism 103. The bias mechanism 103 preferably uses an elastic body such as spring. The bias mechanism 103 corresponds to the surface-approaching pressure imparting mechanism 4 in FIG. 4(A) and has the same structure. That is, the bias mechanism 103 presses that side (bottom) of the second processing member 102 which is opposite to the processing surface 120 and biases each position of the second processing member 102 uniformly downward to the first processing member 101.

On the other hand, the inner diameter of the receiving depression 124 is made larger than the outer diameter of the second processing member 102, so that when arranged concentrically as described above, a gap t1 is arranged between outer periphery 102b of the second processing member 102 and inner periphery of the receiving depression 124, as shown in FIG. 21(B).

Similarly, a gap t2 is arranged between inner periphery 102a of the second processing member 102 and outer periphery of the central part 22 of the receiving depression 124, as shown in FIG. 21(B).

The gaps t1 and t2 are those for absorbing vibration and eccentric behavior and are set to be in a size to secure operational dimensions or more and to enable sealing. For example, when the diameter of the first processing member 101 is 100 mm to 400 mm, the gaps t1 and t2 are preferably 0.05 mm to 0.3 mm, respectively.

The first holder 111 is fixed integrally with the shaft 50 and rotated with the shaft 50. The second processing member 102 is not rotated relative to the second holder 121 by a baffle (not shown). However, for securing 0.1 µm to 10 µm clearance necessary for processing, that is, the minute gap t between the processing surfaces 110 and 120 as shown in FIG. 23(B), a gap t3 is arranged between the bottom of the receiving depression 124, that is, the top part, and the surface facing a top part 124a of the second processing member 102, that is, the upper part, as shown in FIG. 21(B). The gap t3 is established in consideration of the clearance and the vibration and elongation of the shaft 50.

As described above, by the provision of the gaps t1 to t3, the first processing member 101, as shown in FIG. 21(B), can move not only in the direction of approaching to and separating from the second processing member 102, but also relative to the slanting direction z2 of the processing surface 110.

That is, in this embodiment, the bias mechanism 103 and the gaps t1 to t3 constitute a floating mechanism, and by this floating mechanism, the center and inclination of at least the second processing member 102 are made variable in the small range of several µm to several mm. The run-out and expansion of the rotary shaft and the surface vibration and vibration of the first processing member 101 are absorbed.

The groove 112 on the processing surface 110 of the first processing member 101 is described in more detail. The rear end of the groove 112 reaches the inner periphery 101a of the first processing member 101, and its top is elongated toward the outside y of the first processing member 101, that is, toward the outer periphery. As shown in FIG. 22(A), the sectional area of the groove 112 is gradually decreased in the direction from the center x of the circular first processing member 101 to the outside y of the first processing member 101, that is, toward the outer periphery.

The distance w1 of the left and right sides 112a and 112b of the groove 112 is decreased in the direction from the center x of the first processing member 101 to the outside y of the first processing member 101, that is, toward the outer periphery. As shown in FIG. 22(B), the depth w2 of the groove 112 is decreased in the direction from the center x of the first processing member 101 to the outside y of the first processing member 101, that is, toward the outer periphery. That is, the bottom 112c of the groove 112 is decreased in depth in the direction from the center x of the first processing member 101 to the outside y of the first processing member 101, that is, toward the outer periphery.

As described above, the groove 112 is gradually decreased both in width and depth toward the outside y, that is, toward the outer periphery, and its sectional area is gradually decreased toward the outside y. Then, the top of the groove 112, that is, the y side, is a dead end. That is, the top of the groove 112, that is, the y side does not reach the outer periphery 101b of the first processing member 101, and an outer flat surface 113 is interposed between the top of the groove 112 and the outer periphery 101b. The outer flat surface 113 is a part of the processing surface 110.

In the embodiment shown in FIG. 22, the left and right sides 112a and 112b and the bottom 112c of the groove 112 constitute a flow path limiting part. This flow path limiting part, the flat part around the groove 112 of the first processing member 101, and the flat part of the second processing member 102 constitute the dynamical pressure generating mechanism 104.

However, only one of the width and depth of the groove 112 may be constituted as described above to decrease the sectional area.

While the first processing member 101 rotates, the dynamical pressure generating mechanism 104 generates a force in the direction of separating the processing members 101 and 102 from each other to secure a desired minute space between the processing members 101 and 102 by a fluid passing through the space between the processing members 101 and 102. By generation of such dynamical pressure, a 0.1 µm to 10 µm minute space can be generated between the processing surfaces 110 and 120. A minute space like that can be regulated and selected depending on the object of processing, but is preferably 1 µm to 6 µm, more preferably 1 µm to 2 µm. This apparatus can realize a uniform mixing (uniform reaction when the mixing is accompanied by reaction) and form fine particles by the minute space, which are not achieved in the prior art.

The grooves 112 . . . 112 may extend straight from the center x to the outside y. In this embodiment, however, as shown in FIG. 22(A), the grooves 112 are curved to extend such that with respect to a rotation direction r of the first processing member 101, the center x of the groove 112 is positioned in front of the outside y of the groove 112.

In this manner, the grooves 112 . . . 112 are curved to extend so that the separation force by the dynamical pressure generating mechanism 104 can be effectively generated.

Then, the working of this apparatus is described.

As shown in FIG. 21(A), a first processed fluid R which has been introduced from a hopper 170 and has passed through the first introduction part d1, passes through the hollow part of the circular second processing member 102, receives the centrifugal force resulting from rotation of the first processing member 101, enters the space between both of the processing members 101 and 102, and uniform mixing (reaction) and, in any case, generation of microparticles are effected and processed between the processing surface 110 of the rotating first processing member 101 and the processing surface 120 of the second processing member 102, then exits from the processing members 101 and 102 and is then discharged from the discharge part 108 to the side of the decompression pump Q (hereinafter, the first processed fluid R is referred to simply as a fluid R, if necessary).

In the foregoing description, the fluid R that has entered the hollow part of the circular second processing member 102 first enters the groove 112 of the rotating first processing member 101 as shown in FIG. 23(A). On the other hand, the processing surfaces 110 and 120 that are mirror-polished flat parts are kept airtight even by passing a gas such as air or nitrogen. Accordingly, even if the centrifugal force by rotation is received, the fluid R cannot enter through the groove 112 into the space between the processing surfaces 110 and 120 that are pushed against each other by the bias mechanism 103. However, the fluid R gradually runs against both the sides 112a and 112b and the bottom 112c of the groove 112 formed as a flow path limiting part to generate dynamical pressure acting in the direction of separating the processing surfaces 110 and 120 from each other. As shown in FIG. 23(B), the fluid R can thereby exude from the groove 112 to the flat surface, to secure a minute gap t, that is, clearance, between the processing surfaces 110 and 120. Then, a uniform mixing (reaction) and, in any case, generation of microparticles are effected and processed between the mirror-polished flat surfaces. The groove 112 has been curved so that the centrifugal force is applied more accurately to the fluid to make generation of dynamical pressure more effectively.

In this manner, the processing apparatus can secure a minute and uniform gap, that is, clearance, between the mirror surfaces, that is, the processing surfaces 110 and 120, by the balance between the dynamical pressure and the bias force by the bias mechanism 103. By the structure described above, the minute gap can be as superfine as 1 µm or less.

By utilizing the floating mechanism, the automatic regulation of alignment between the processing surfaces 110 and 120 becomes possible, and the clearance in each position between the processing surfaces 110 and 120 can be prevented from varying against physical deformation of each part by rotation or generated heat, and the minute gap in each position can be maintained.

In the embodiment described above, the floating mechanism is a mechanism arranged for the second holder 121 only. Alternatively, the floating mechanism can be arranged in the first holder 111 instead of, or together with, the second holder 121.

Figure 24:
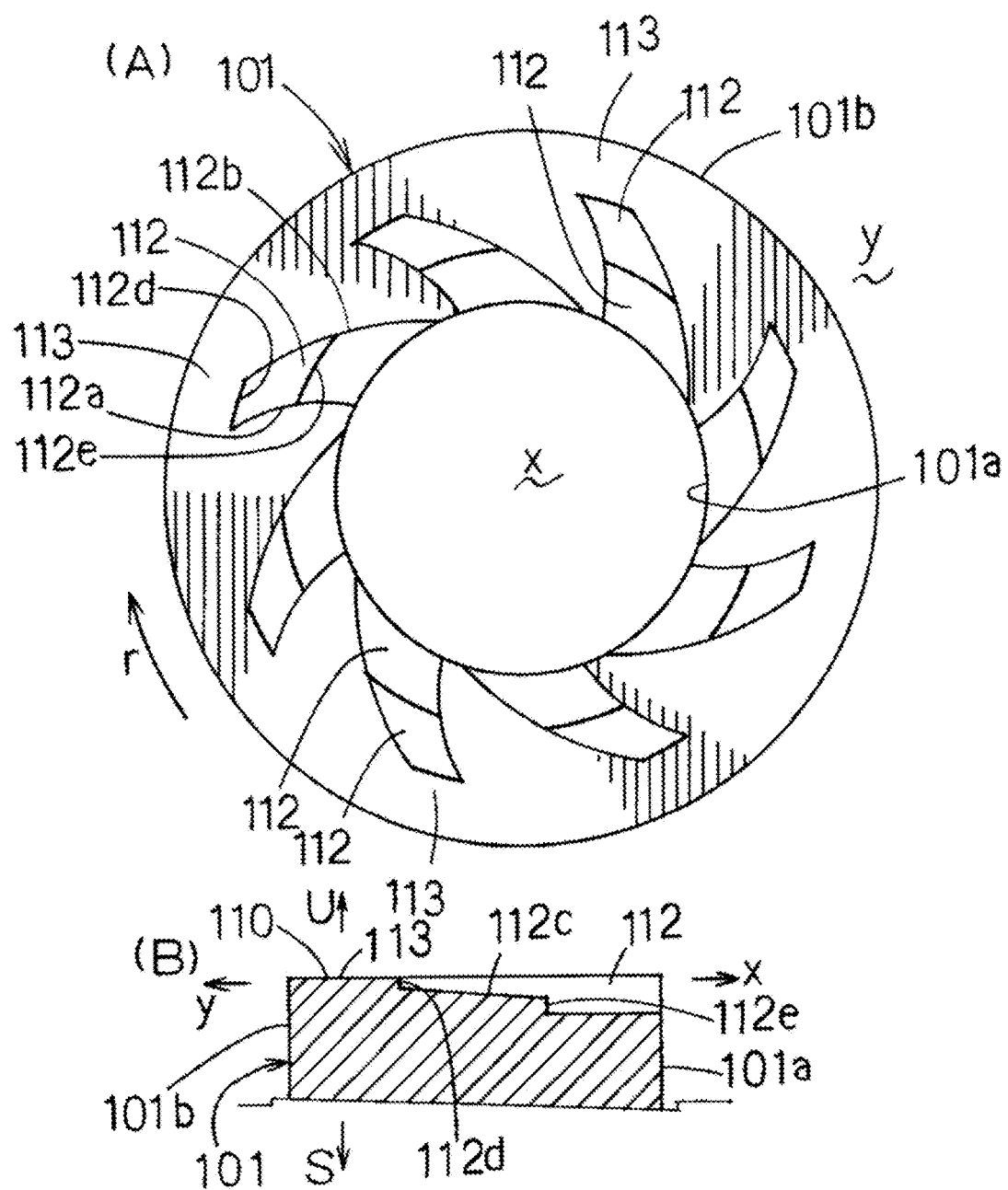
Figure 25:
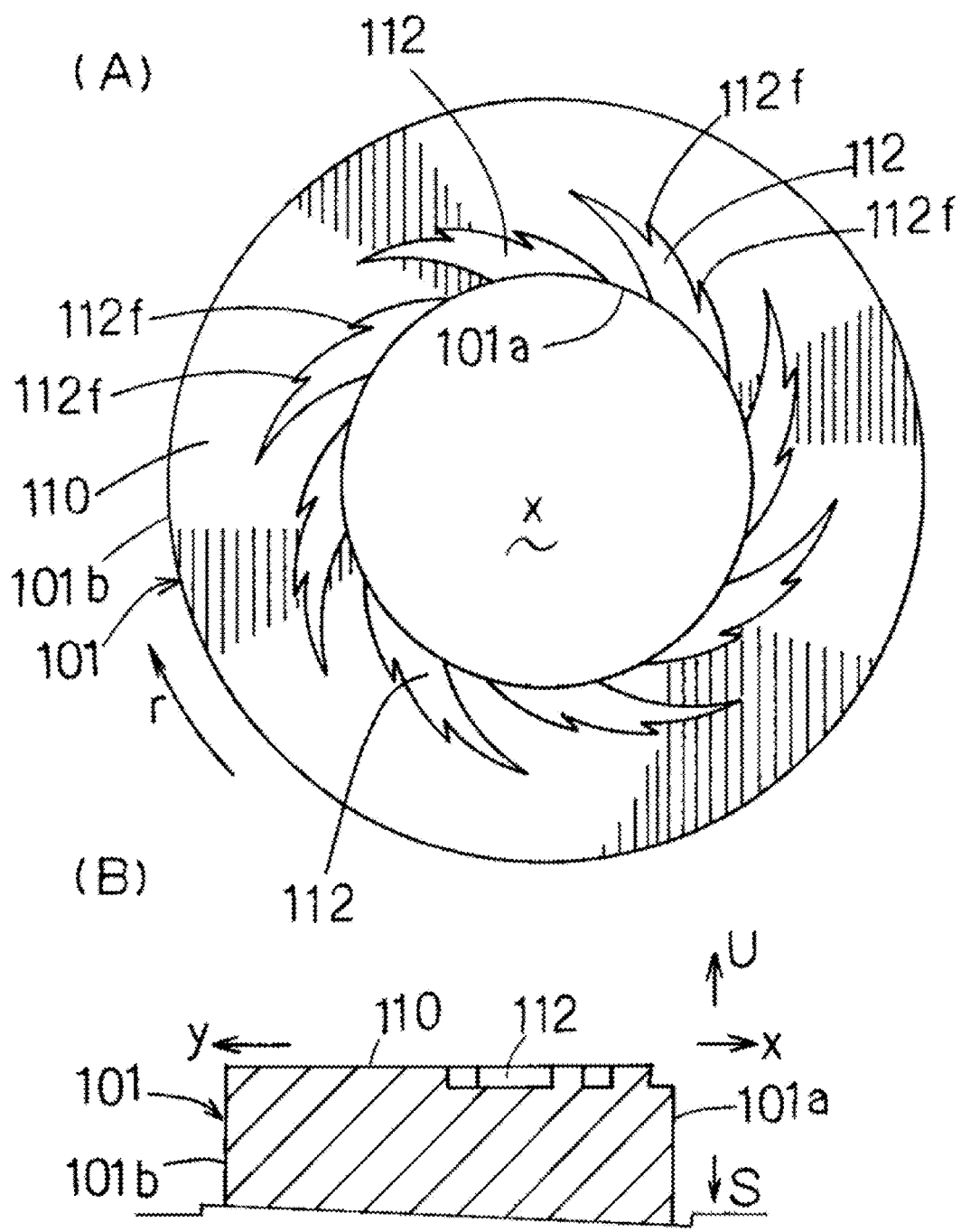
Figure 26:
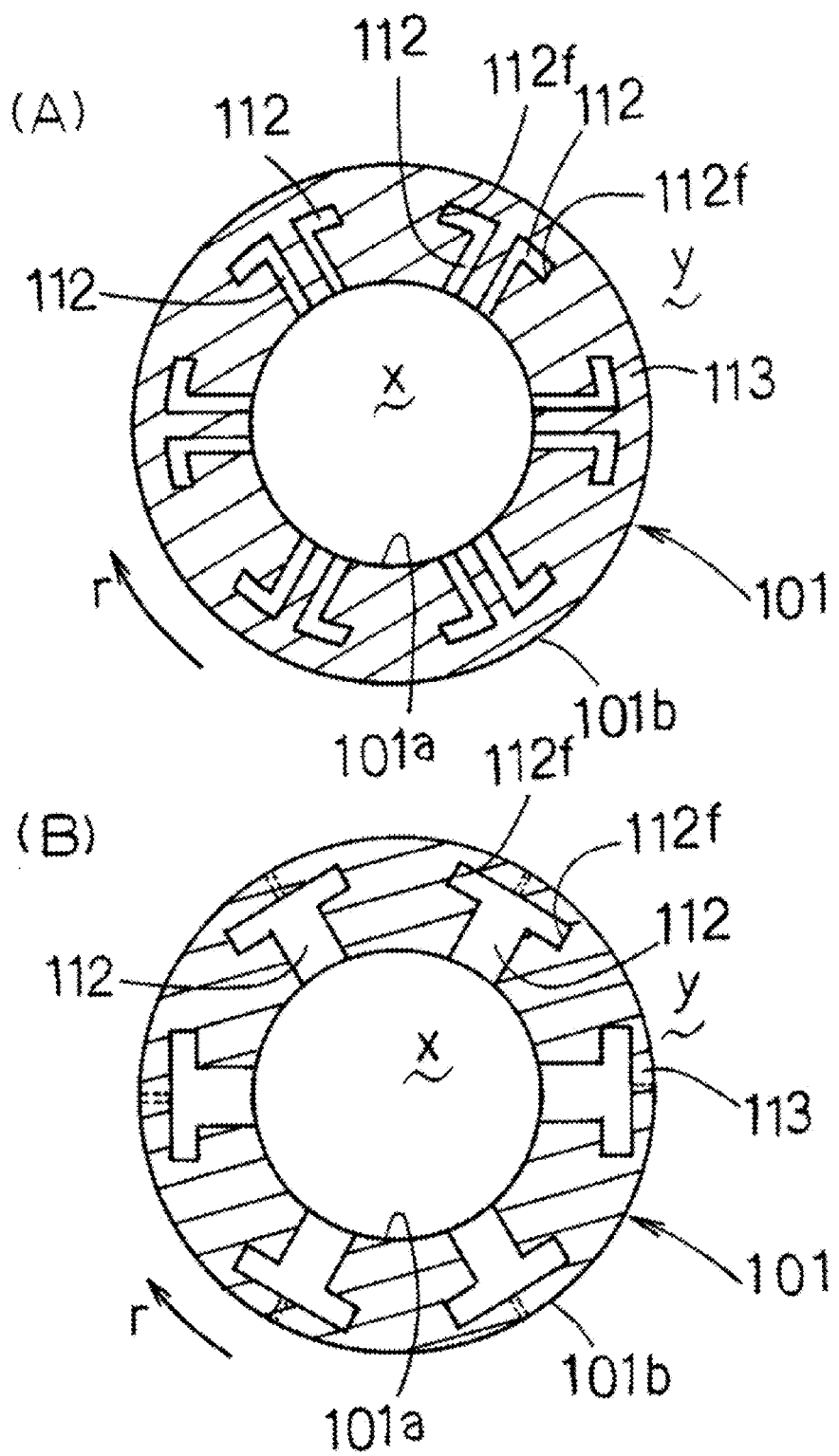

Other embodiments of the groove 112 are shown in FIG. 24 to FIG. 26.

As shown in FIG. 24(A) and FIG. 24(B), the groove 112 can be provided at the top with a flat wall surface 112d as a part of the flow path limiting part. In the embodiment shown in FIG. 14, a step 112e is arranged between the first wall surface 112d and the inner periphery 101a in the bottom 112c, and the step 112e also constitutes a part of the flow path limiting part.

As shown in FIG. 25(A) and FIG. 25(B), the groove 112 includes a plurality of branches 112f . . . 112f, and each branch 112f narrows its width thereby being provided with a flow path limiting part.

With respect to the embodiments in FIG. 17 and FIG. 18, structures other than those particularly shown are similar to those of embodiments as shown in FIG. 4(A), FIG. 14(C), and FIG. 21 to FIG. 23.

In the embodiments described above, at least either the width or depth of the groove 112 is gradually decreased in size in the direction from inside to outside the first processing member 101, thereby constituting a flow path limiting part. Alternatively, as shown in FIG. 26(A) or FIG. 26(B), t the groove 112 can be provided with a termination surface 112f without changing the width and depth of the groove 112, and the termination surface 112f of the groove 112 can serve as a flow path limiting part. As shown the embodiments in FIG. 22, FIG. 24 and FIG. 25, the width and depth of the groove 112 can be changed as described above thereby slanting the bottom and both sides of the groove 112, so that the slanted surfaces serves as a pressure-receiving part toward the fluid to generate dynamical pressure. In the embodiment shown in FIG. 26(A) and FIG. 26(B), on the other hand, the termination surface of the groove 112 serves as a pressure-receiving part toward the fluid to generate dynamical pressure.

In the embodiment shown in FIG. 26(A) and FIG. 26(B), at least one of the width and depth of the groove 112 may also be gradually decreased in size.

The structure of the groove 112 is not limited to the one shown in FIG. 22 and FIG. 24 to FIG. 26 and can be provided with a flow path limiting part having other shapes.

For example, in the embodiments shown in FIG. 22 and FIG. 24 to FIG. 26, the groove 112 does not penetrate to the outer side of the first processing member 101. That is, there is an outer flat surface 113 between the outer periphery of the first processing member 101 and the groove 112. However, the structure of the groove 112 is not limited to such embodiment, and the groove 112 may reach the outer periphery of the first processing member 101 as long as the dynamical pressure can be generated.

For example, in the case of the first processing member 101 shown in FIG. 26(B), as shown in the dotted line, a part having a smaller sectional area than other sites of the groove 112 can be formed on the outer flat surface 113.

The groove 112 may be formed so as to be gradually decreased in size in the direction from inside to outside as described above, and the part (terminal) of the groove 112 that had reached the outer periphery of the first processing member 101 may have the minimum sectional area (not shown). However, the groove 112 preferably does not penetrate to the outer periphery of the first processing member 101 as shown in FIG. 22 and FIG. 24 to FIG. 26, in order to effectively generate dynamical pressure.

Now, the embodiments shown in FIG. 21 to FIG. 26 are summarized.

This fluid processing apparatus is a processing apparatus wherein a rotating member having a flat processing surface and a fixed member having a flat processing surface are opposite to each other so as to be concentric with each other, and while the rotating member is rotated, a material to be reacted is fed through an opening of the fixed member and subjected to a reaction between the opposite flat processing surfaces of both members, wherein the rotating member is provided with a pressurizing mechanism by which pressure is generated to maintain clearance without mechanically regulating clearance and enables 1 µm to 6 µm microscopic clearance not attainable by mechanical regulation of clearance, thereby significantly improving an ability to uniformize the mixing (reaction) and in some cases, an ability to pulverize the formed particles.

That is, this fluid processing apparatus have a rotating member and a fixed member each having a flat processing surface in the outer periphery thereof and has a sealing mechanism in a plane on the flat processing surface, thereby providing a high speed rotation processing apparatus generating hydrostatic force, hydrodynamic force, or aerostatic-aerodynamic force. The force generates a minute space between the sealed surfaces, and provides a reaction processing apparatus with a function of non-contact and mechanically safe and high-level pulvelization and uniformizing of reactions. One factor for forming this minute space is due to the rotation speed of the rotating member, and the other factor is due to a pressure difference between the introduction side and discharge side of a processed material (fluid). When a pressure imparting mechanism is arranged in the introduction side, when a pressure imparting mechanism is not arranged in the introduction side, that is, when the processed material (fluid) is introduced at atmospheric pressure, there is no pressure difference, and thus the sealed surfaces should be separated by only the rotation speed of the rotating member. This is known as hydrodynamic or aerodynamic force.

FIG. 21(A) shows the apparatus wherein a decompression pump Q is connected to the discharge part of the mixing apparatus G, but as described above, the fluid processing apparatus may be arranged in a decompression tank T without arranging the housing 106 and the decomposition pump Q, as shown in FIG. 27(A).

In this case, the tank T is decompressed in a vacuum or in an almost vacuum, whereby the processed product formed in the mixing apparatus G is sprayed in a mist form in the tank T, and the processed material colliding with, and running down along, the inner wall of the tank T can be recovered, or a gas (vapor) separated from the processed material and filled in an upper part of the tank T, unlike the processed material running down along the wall, can be recovered to obtain the objective product after processing.

As shown in FIG. 27(B), when the decompression pump Q is used, an airtight tank T is connected via the decompression pump Q to the processing apparatus G, whereby the processed material after processing can be formed into mist to separate and extract the objective product.

As shown in FIG. 27(C), the decompression pump Q is connected directly to the processing apparatus G, and the decompression pump Q and a discharge part for fluid R, different from the decompression pump Q, are connected to the tank T, whereby the objective product can be separated. In this case, a gasified portion is sucked by the decompression pump Q, while the fluid R (liquid portion) is discharged from the discharge part separately from the gasified portion.

In the embodiments described above, the first and second processed fluids are introduced via the second holders 21 and 121 and the second rings 20 and 102 respectively and mixed and reacted with each other.

Now, other embodiments with respect to introduction of fluids to be processed into the apparatus are described.

As shown in FIG. 4(B), the processing apparatus shown in FIG. 4(A) is provided with a third introduction part d3 to introduce a third fluid to be processed into the space between the processing surfaces 1 and 2, and the third fluid is mixed (reacted) with the first processed fluid as well as the second processed fluid.

By the third introduction part d3, the third fluid to be mixed with the first processed fluid is fed to the space between the processing surfaces 1 and 2. In this embodiment, the third introduction part d3 is a fluid flow path arranged in the second ring 20 and is open at one end to the second processing surface 2 and has a third fluid feed part p3 connected to the other end.

In the third fluid feed part p3, a compressor or another pump can be used.

The opening of the third introduction part d3 in the second processing surface 2 is positioned outside, and more far from, the rotation center of the first processing surface 1 than the opening of the second introduction part d2. That is, in the second processing surface 2, the opening of the third introduction part d3 is located downstream from the opening of the second introduction part d2. A gap is arranged between the opening of the third introduction d3 and the opening of the second introduction part d2 in the radial direction of the second ring 20.

With respect to structures other than the third introduction d3, the apparatus shown in FIG. 4(B) is similar to that in the embodiment as in FIG. 4(A). In FIG. 4(B) and further in FIG. 4(C), FIG. 4(D) and FIG. 5 to FIG. 14 described later, the case 3 is omitted to simplify the drawings. In FIG. 12(B), FIG. 12(C), FIG. 13, FIG. 14(A) and FIG. 14(B), a part of the case 3 is shown.

As shown in FIG. 4(C), the processing apparatus shown in FIG. 4(B) is provided with a fourth introduction part d4 to introduce a fourth fluid to be processed into the space between the processing surfaces 1 and 2, and the fourth fluid is mixed (reacted) with the first processed fluid as well as the second and third processed fluids.

By the fourth introduction part d4, the fourth fluid to be mixed with the first processed fluid is fed to the space between the processing surfaces 1 and 2. In this embodiment, the fourth introduction part d4 is a fluid flow path arranged in the second ring 20, is open at one end to the second processing surface 2, and has a fourth fluid feed part p4 connected to the other end.

In the fourth fluid introduction part p4, a compressor or another pump can be used.

The opening of the fourth introduction part d4 in the second processing surface 2 is positioned outside, and more far from, the rotation center of the first processing surface 1 than the opening of the third introduction part d3. That is, in the second processing surface 2, the opening of the fourth introduction part d4 is located downstream from the opening of the third introduction part d3.

With respect to structures other than the fourth introduction part d4, the apparatus shown in FIG. 4(C) is similar to that in the embodiment as in FIG. 4(B).

Five or more introduction parts further including a fifth introduction part, a sixth introduction part and the like can be arranged to mix and react five or more fluids to be processed with one another (not shown).

As shown in FIG. 4(D), the first introduction part d1 arranged in the second holder 21 in the apparatus in FIG. 4(A) can, similar to the second introduction part d2, be arranged in the second processing surface 2 in place of the second holder 21. In this case, the opening of the first introduction part d1 is located at the upstream side from the second introduction part d2, that is, it is positioned nearer to the rotation center than the second introduction part d2 in the second processing surface 2.

In the apparatus shown in FIG. 4(D), the opening of the second introduction part d2 and the opening of the third introduction part d3 both are arranged in the second processing surface 2 of the second ring 20. However, arrangement of the opening of the introduction part is not limited to such arrangement relative to the processing surface. Particularly as shown in FIG. 5(A), the opening of the second introduction part d2 can be arranged in a position adjacent to the second processing surface 2 in the inner periphery of the second ring 20. In the apparatus shown in FIG. 5(A), the opening of the third introduction part d3 is arranged in the second processing surface 2 similarly to the apparatus shown in FIG. 4(B), but the opening of the second introduction part d2 can be arranged inside the second processing surface 2 and adjacent to the second processing surface 2, whereby the second processed fluid can be immediately introduced onto the processing surfaces.

In this manner, the opening of the first introduction part d1 is arranged in the second holder 21, and the opening of the second introduction part d2 is arranged inside the second processing surface 2 and adjacent to the second processing surface 2 (in this case, arrangement of the third introduction part d3 is not essential), so that particularly in reaction of a plurality of processed fluids, the processed fluid introduced from the first introduction part d1 and the processed fluid introduced from the second introduction part d2 are introduced, without being reacted with each other, into the space between the processing surfaces 1 and 2, and then both the fluids can be reacted first between the processing surfaces 1 and 2. Accordingly, the structure described above is suitable for obtaining a particularly reactive processed fluid.

The term "adjacent" is not limited to the arrangement where the opening of the second introduction part d2 is contacted with the inner side of the second ring 20 as shown in FIG. 5(A). The distance between the second ring 20 and the opening of the second introduction part d2 may be such a degree that a plurality of processed fluids are not completely mixed (reacted) with one another prior to introduction into the space between the processing surfaces 1 and 2. For example, the opening of the second introduction part d2 may be arranged in a position near the second ring 20 of the second holder 21. Alternatively, the opening of the second introduction part d2 may be arranged on the side of the first ring 10 or the first holder 11.

In the apparatus shown in FIG. 4(B), a gap is arranged between the opening of the third introduction part d3 and the opening of the second introduction part d2 in the radial direction of the second ring 20, but as shown in FIG. 5(A), the second and third processed fluids can be introduced into the space between the processing surfaces 1 and 2, without providing such gap, thereby immediately joining both the fluids together. The apparatus shown in FIG. 5(A) can be selected depending on the object of processing.

In the apparatus shown in FIG. 4(D), a gap is also arranged between the opening of the first introduction part d1 and the opening of the second introduction part d2 in the radial direction of the second ring 20, but the first and second processed fluids can be introduced into the space between the processing surfaces 1 and 2, without providing such gap, thereby immediately joining both the fluids together. Such arrangement of the opening can be selected depending on the object of processing (not shown).

Figure 6:
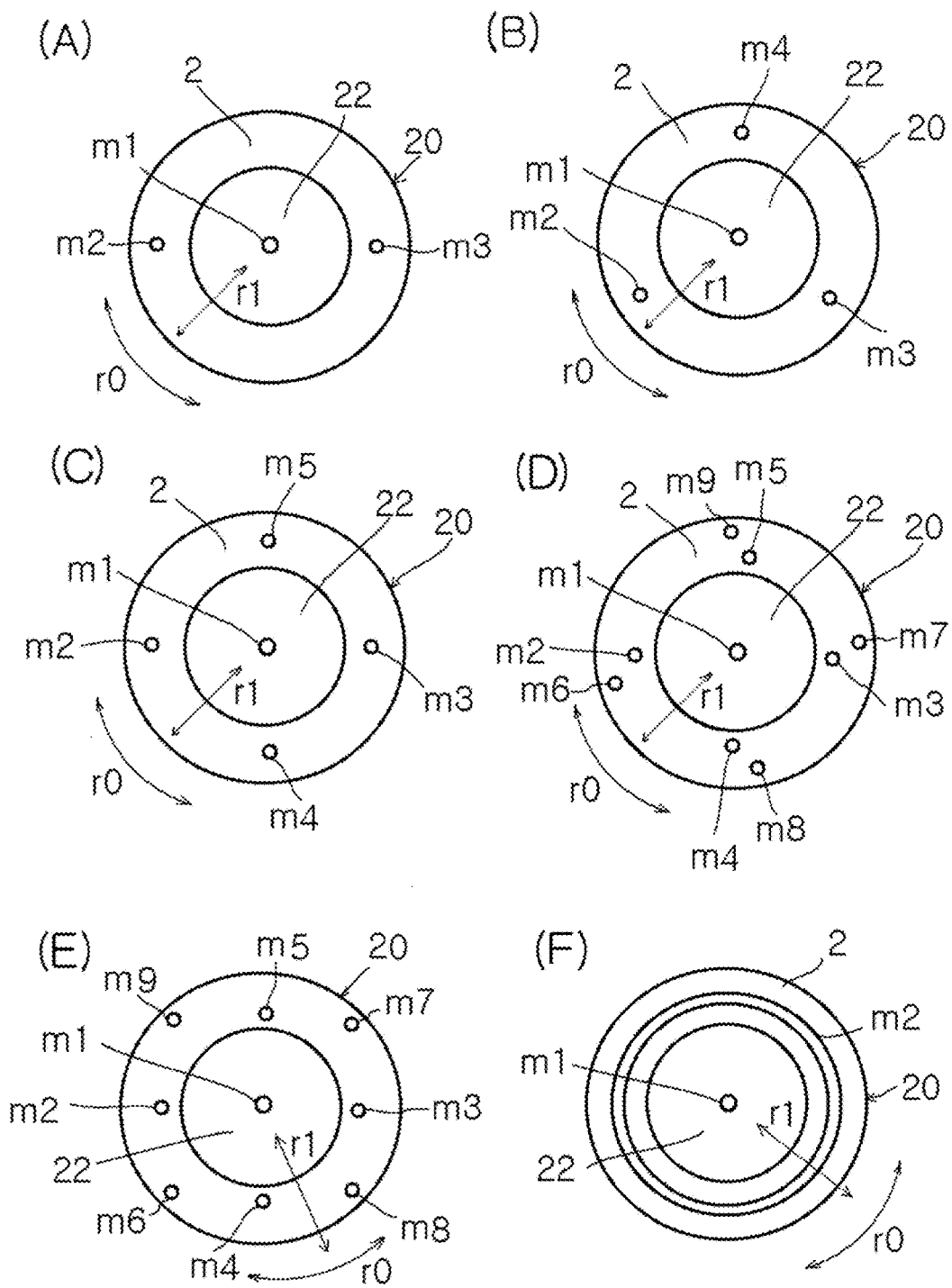

In the embodiment shown in FIG. 4(B) and FIG. 4(C), the opening of the third introduction part d3 is arranged in the second processing surface 2 downstream from the opening of the second introduction part d2, in other words, outside the opening of the second introduction part d2 in the radial direction of the second ring 20. Alternatively, as shown in FIG. 5(C) and FIG. 6(A), the opening of the third introduction part d3 and the opening of the second introduction part d2 can be arranged in the second processing surface 2 in positions different in a circumferential direction r0 of the second ring 20. In FIG. 6, numeral m1 is the opening (first opening) of the first introduction part d1, numeral m2 is the opening (second opening) of the second introduction part d2, numeral m3 is the opening (third opening) of the third introduction part d3, and numeral r1 is the radical direction of the ring.

When the first introduction part d1 is arranged in the second ring 20, as shown in FIG. 5(D), the opening of the first introduction part d1 and the opening of the second introduction part d2 can be arranged in the second processing surface 2 in positions different in the circumferential direction of the second ring 20.

In the apparatus shown in FIG. 6(A), the openings of two introduction parts are arranged in the second processing surface 2 of the second ring 20 in positions different in the circumferential direction r0, but as shown in FIG. 6(B), the openings of three introduction parts can be arranged in positions different in the circumferential direction r0 of the ring, or as shown in FIG. 6(C), the openings of four introduction parts can be arranged in positions different in the circumferential direction r0 of the ring. In FIG. 6(B) and FIG. 6(C), numeral m4 is the opening of the fourth introduction part, and in FIG. 6(C), numeral m5 is the opening of the fifth introduction part. Five or more openings of introduction parts may be arranged in positions different in the circumferential direction r0 of the ring (not shown).

In the apparatuses shown in above, the second to fifth introduction parts can introduce different fluids, that is, the second, third, fourth and fifth fluids. On the other hand, the second to fifth openings m2 to m5 can introduce the same fluid, that is, the second fluid into the space between the processing surfaces. In this case, the second to fifth introduction parts are connected to the inside of the ring and can be connected to one fluid feed part, that is, the second fluid supply part p2 (not shown).

A plurality of openings of introduction parts arranged in positions different in the circumferential direction r0 of the ring can be combined with a plurality of openings of introduction parts arranged in positions different in the radial direction r1 of the ring.

For example, as shown in FIG. 6(D), the openings m2 to m9 of eight introduction parts are arranged in the second processing surface 2, wherein four openings m2 to m5 of them are arranged in positions different in the circumferential direction r0 of the ring and identical in the radial direction r1 of the ring, and the other four openings m6 to m9 are arranged in positions different in the circumferential direction r0 of the ring and identical in the radial direction r1 of the ring. Then, the other openings m6 to m9 are arranged outside the radial direction r1 of the four openings m2 to m5. The outside openings and inside openings may be arranged in positions identical in the circumferential direction r0 of the ring, but in consideration of rotation of the ring, may be arranged in positions different in the circumferential direction r0 of the ring as shown in FIG. 6(D). In this case too, the openings are not limited to arrangement and number shown in FIG. 6(D).

For example, as shown in FIG. 6(E), the outside opening in the radial direction can be arranged in the apex of a polygon, that is, in the apex of a rectangle in this case, and the inside opening in the radial direction can be positioned on one side of the rectangle. As a matter of course, other arrangements can also be used.

When the openings other than the first opening m1 feed the second processed fluid into the space between the processing surfaces, each of the openings may be arranged as continuous openings in the circumferential direction r0 as shown in FIG. 6(F), instead of being arranged discretely in the circumferential direction r0 of the processing surface.

As shown in FIG. 7(A), depending on the object of processing, the second introduction part d2 arranged in the second ring 20 in the apparatus shown in FIG. 7(A) can be, similar to the first introduction part d1, arranged in the central portion 22 of the second holder 21. In this case, the opening of the second introduction part d2 is positioned with a gap outside the opening of the first introduction part d1 positioned in the center of the second ring 20. As shown in FIG. 7(B), in the apparatus shown in FIG. 7(A), the third introduction part d3 can be arranged in the second ring 20. As shown in FIG. 7(C), in the apparatus shown in FIG. 7(A), the first and second processed fluids can be introduced into the space inside the second ring 20 without arranging a gap between the opening of the first introduction part d1 and the opening of the second introduction part d2, so that both the fluids can immediately join together. As shown in FIG. 7(D), depending on the object of processing, in the apparatus shown in FIG. 7(A), the third introduction part d3 can be, similar to the second introduction part d2, arranged in the second holder 21. Four or more introduction parts may be arranged in the second holder 21 (not shown).

As shown in FIG. 8(A), depending on the object of processing, in the apparatus shown in FIG. 7(D), the fourth introduction part d4 can be arranged in the second ring 20, so that the fourth processed fluid may be introduced into the space between the processing surfaces 1 and 2.

As shown in FIG. 8(B), in the apparatus shown in FIG. 4(A), the second introduction part d2 can be arranged in the first ring 10, and the opening of the second introduction part d2 can be arranged in the first processing surface 1.

As shown in FIG. 8(C), in the apparatus shown in FIG. 8(B), the third introduction part d3 can be arranged in the first ring 10, and the opening of the third introduction part d3 and the opening of the second introduction part d2 can be arranged in the first processing surface 1 in positions different in the circumferential direction of the first ring 10.

As shown in FIG. 8(D), in the apparatus shown in FIG. 8(B), the first introduction part d1 can be arranged in the second ring 20 instead of arranging the first introduction part d1 in the second holder 21, and the opening of the first introduction part d1 can be arranged in the second processing surface 2. In this case, the openings of the first and second introduction parts d1 and d2 are arranged in positions identical in the radial direction of the ring.

As shown in FIG. 9(A), in the apparatus shown in FIG. 4(A), the third introduction part d3 can be arranged in the first ring 10, and the opening of the third introduction part d3 can be arranged in the first processing surface 1. In this case, both the openings of the second and third introduction parts d2 and d3 are arranged in positions identical in the radial direction of the ring. However, both the openings may be arranged in positions different in the radial direction of the ring.

In the apparatus shown in FIG. 8(C), both the openings of the second and third introduction parts d2 and d3 are arranged in positions identical in the radial direction of the first ring 10 and simultaneously arranged in positions different in the circumferential direction (that is, rotation direction) of the first ring 10, but in this apparatus, as shown in FIG. 9(B), both the openings of the second and third introduction parts d2 and d3 can be arranged in positions different in the radical direction of the first ring 10. In this case, as shown 9(B), a gap can be arranged between both the openings of the second and third introduction parts d2 and d3 in the radial direction of the first ring 10, or without arranging the gap, the second and third processed fluids may immediately join together (not shown).

As shown in FIG. 9(C), the first introduction part d1 together with the second introduction part d2 can be arranged in the first ring 10 instead of arranging the first introduction part d1 in the second holder 21. In this case, in the first processing surface 1, the opening of the first introduction part d1 is arranged upstream (inside the radial direction of the first ring 10) from the opening of the second introduction part d2. A gap is arranged between the opening of the first introduction part d1 and the opening of the second introduction part d2 in the radial direction of the first ring 10. Alternatively, such gap may not be arranged (not shown).

As shown in FIG. 9(D), both the openings of the first introduction part d1 and the second introduction part d2 can be arranged in positions different in the circumferential direction of the first ring 10 in the first processing surface 1 in the apparatus shown in FIG. 9(C).

In the embodiment shown in FIG. 9(C) and FIG. 9(D), three or more introduction parts may be arranged in the first ring 10, and in the first processing surface 1, so the respective openings may be arranged in positions different in the circumferential direction or in positions different in the radial direction of the ring (not shown). For example, the arrangement of openings in the second processing surface 2, shown in FIG. 6(B) to FIG. 6(F), can also be used in the first processing surface 1.

As shown in FIG. 10(A), in the apparatus shown in FIG. 4(A), the second introduction part d2 can be arranged in the first holder 11 instead of arranging the part d2 in the second ring 20. In this case, the opening of the second introduction part d2 is arranged preferably in the center of the central shaft of rotation of the first ring 10, in the site surrounded with the first ring 10 on the upper surface of the first holder 11.

As shown in FIG. 10(B), in the embodiment shown in FIG. 10(A), the third introduction part d3 can be arranged in the second ring 20, and the opening of the third introduction part d3 can be arranged in the second processing surface 2.

As shown in FIG. 10(C), the first introduction part d1 can be arranged in the first holder 11 instead of arranging the part d1 in the second holder 21. In this case, the opening of the first introduction part d1 is arranged preferably in the central shaft of rotation of the first ring 10, in the site surrounded with the first ring 10 on the upper surface of the first holder 11. In this case, as shown in the figure, the second introduction part d2 can be arranged in the first ring 10, and its opening can be arranged in the first processing surface 1. In this case, the second introduction part d2 can be arranged in the second ring 20, and its opening can be arranged in the second processing surface 2 (not shown).

As shown in FIG. 10(D), the second introduction part d2 shown in FIG. 10(C) together with the first introduction part d1 can be arranged in the first holder 11. In this case, the opening of the second introduction part d2 is arranged in the site surrounded with the first ring 10 on the upper surface of the first holder 11. In this case, the second introduction part d2 arranged in the second ring 20 may serve as the third introduction part d3 in FIG. 10(C).

In the embodiments shown in FIG. 4 to FIG. 10, the first holder 11 and the first ring 10 are rotated relative to the second holder 21 and the second ring 20, respectively. As shown in FIG. 11(A), in the apparatus shown in FIG. 4(A), the second holder 2 may be provided with a rotary shaft 51 rotating with the turning force from the rotation drive member, to rotate the second holder 21 in a direction opposite to the first holder 11. The rotation drive member in the rotary shaft 51 may be arranged separately from the one for rotating the rotary shaft 50 of the first holder 11 or may receive power from the drive part for rotating the rotary shaft 50 of the first holder 11 by a power transmission means such as a gear. In this case, the second holder 21 is formed separately from the case, and shall, like the first holder 11, be rotatably accepted in the case.

As shown in FIG. 11(B), in the apparatus shown in FIG. 11(A), the second introduction part d2 can be, similarly in the apparatus in FIG. 10(B), arranged in the first holder 11 in place of the second ring 20.

In the apparatus shown in FIG. 11(B), the second introduction part d2 can be arranged in the second holder 21 in place of the first holder 11 (not shown). In this case, the second introduction part d2 is the same as one in the apparatus in FIG. 10(A). As shown in FIG. 11(C), in the apparatus shown in FIG. 11(B), the third introduction part d3 can be arranged in the second ring 20, and the opening of the third introduction part d3 can be arranged in the second processing surface 2.

As shown in FIG. 11(D), the second holder 21 only can be rotated without rotating the first holder 11. Even in the apparatuses shown in FIG. 4(B) to FIG. 10, the second holder 21 together with the first holder 11, or the second holder 21 alone, can be rotated (not shown).

As shown in FIG. 12(A), the second processing member 20 is a ring, while the first processing member 10 is not a ring and can be a rotating member provided directly with a rotary shaft 50 similar to that of the first holder 11 in other embodiments. In this case, the upper surface of the first processing member 10 serves as the first processing surface 1, and the processing surface is an evenly flat surface which is not circular (that is, hollow-free). In the apparatus shown in FIG. 12(A), similarly in the apparatus in FIG. 4(A), the second introduction part d2 is arranged in the second ring 20, and its opening is arranged in the second processing surface 2.

As shown in FIG. 12(B), in the apparatus shown in FIG. 12(A), the second holder 21 is independent of the case 3, and a surface-approaching pressure imparting mechanism 4 such as an elastic body for approaching to and separating from the first processing member 10 provided with the second ring 20 can be provided between the case 3 and the second holder 21. In this case, as shown in FIG. 12(C), the second processing member 20 is not a ring, but is a member corresponding to the second holder 21, and the lower surface of the member can serve as the second processing surface 2. As shown in FIG. 13(A), in the apparatus shown in FIG. 12(C), the first processing member 10 is not a ring either, and in other embodiments similarly in the apparatus shown in FIG. 12(A) and FIG. 12(B), the site corresponding to the first holder 11 can serve as the first processing member 10, and its upper surface can serve as the first processing surface 1.

In the embodiments described above, at least the first fluid is supplied from the first processing member 10 and the second processing member 20, that is, from the central part of the first ring 10 and the second ring 20, and after processing (mixing (reaction)) of the other fluids, the processed fluid is discharged to the outside in the radial direction.

Alternatively, as shown in FIG. 13(B), the first fluid can be supplied in the direction from the outside to the inside of the first ring 10 and second ring 20. In this case, the outside of the first holder 11 and the second holder 21 is sealed with the case 3, the first introduction part d1 is arranged directly in the case 3, and the opening of the introduction part is arranged in a site inside the case and corresponding to the abutting position of the rings 10 and 20, as shown in the figure. In the apparatus in FIG. 4(A), a discharge part 36 is arranged in the position in which the first introduction part d1 is arranged, that is, in the central position of the ring 1 of the first holder 11. The opening of the second introduction part d2 is arranged in the opposite side of the opening of the case behind the central shaft of rotation of the holder. However, the opening of the second introduction part d2 may be, similar to the opening of the first introduction part d1, arranged in a site inside the case and corresponding to the abutting position of the rings 10 and 20. As described above, the embodiment is not limited to the one where the opening of the second introduction part d2 is formed to the opposite side of the opening of the first introduction part d1.

In this case, the outside of the diameter of both the rings 10 and 20 is on the upstream side, and the inside of both the rings 10 and 20 is on the downstream side.

In the case that the fluid to be processed moves from outside to inside, on contrary to the case that the depression 13 . . . 13 is extended from a center side to outside as mentioned above, an embodiment in which the groove-like depression 13 . . . 13 is formed, as shown in FIG. 19(E), on the first processing surface 1 of the first processing member 10 so as to be extended from outside of the processing member 10 to a center side thereof may also be possible. When the groove-like depressions 13 . . . 13 are formed, the balance ratio K described above is preferably set as 100% or more of unbalance type. As a result, dynamical pressure is generated in the groove-like depressions 13 . . . 13 upon rotating, the first and second processing surfaces 1 and 2 can rotate in a surely non-contact state, so that the risk of abrasion and the like due to contact can be eliminated. In the embodiment shown in FIG. 19(E), the separating force due to the pressure of the processed fluid is generated in an inner end 13a of the depressions 13.

As shown in FIG. 13(C), in the apparatus shown in FIG. 13(B), the second introduction part d2, which is arranged in the side of the case 3, can be arranged in the first ring 10 in space of the mentioned position, and its opening can be arranged in the first processing surface 1. In this case, as shown in FIG. 13(D), the first processing member 10 is not formed as a ring. Similarly in the apparatuses shown in FIG. 12(B), FIG. 12(C) and FIG. 13(A), in other embodiments, the site corresponding to the first holder 11 is the first processing member 10, its upper surface being the first processing surface 1, the second introduction part d2 being arranged in the first processing member 10, and its opening may be arranged in the first processing surface 1.

As shown in FIG. 14(A), in the apparatus shown in FIG. 13(D), the second processing member 20 is not formed as a ring, and in other embodiments, the member corresponding to the second holder 21 serves as the second processing member 20, and its lower surface serves as the second processing surface 2. Then, the second processing member 20 is a member independent of the case 3, and the same surface-approaching pressure imparting mechanism 4 as one in the apparatuses shown in FIG. 12(C), FIG. 12(D) and FIG. 13(A) can be arranged between the case 3 and the second processing member 20.

As shown in FIG. 14(B), the second introduction part d2 in the apparatus shown in FIG. 14(A) serves as the third introduction part d3, and separately the second introduction part d2 can be arranged. In this case, the opening of the second introduction part d2 is arranged upstream from the opening of the third introduction part d3 in the second processing surface 2.

Figure 7:
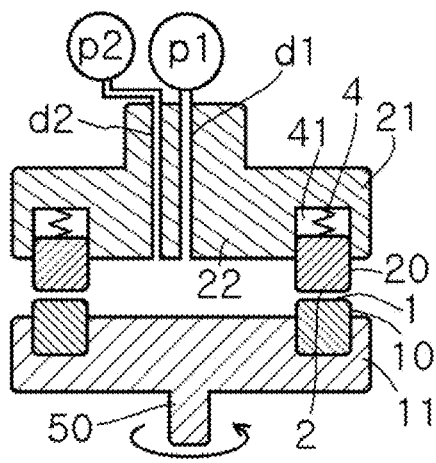
Figure 7:
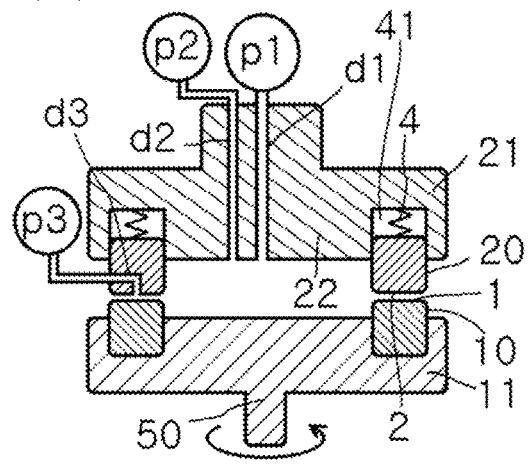
Figure 7:
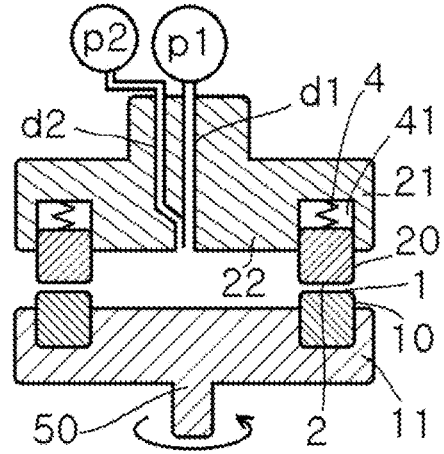
Figure 7:
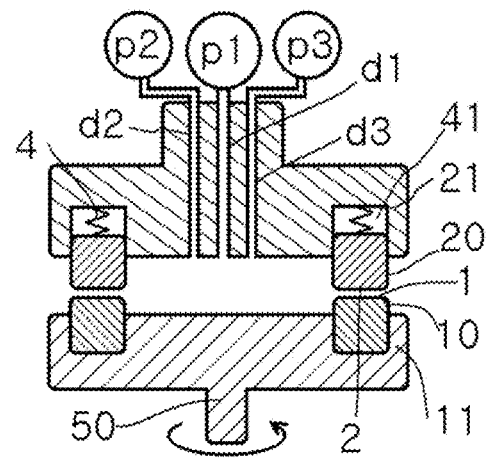
Figure 8:
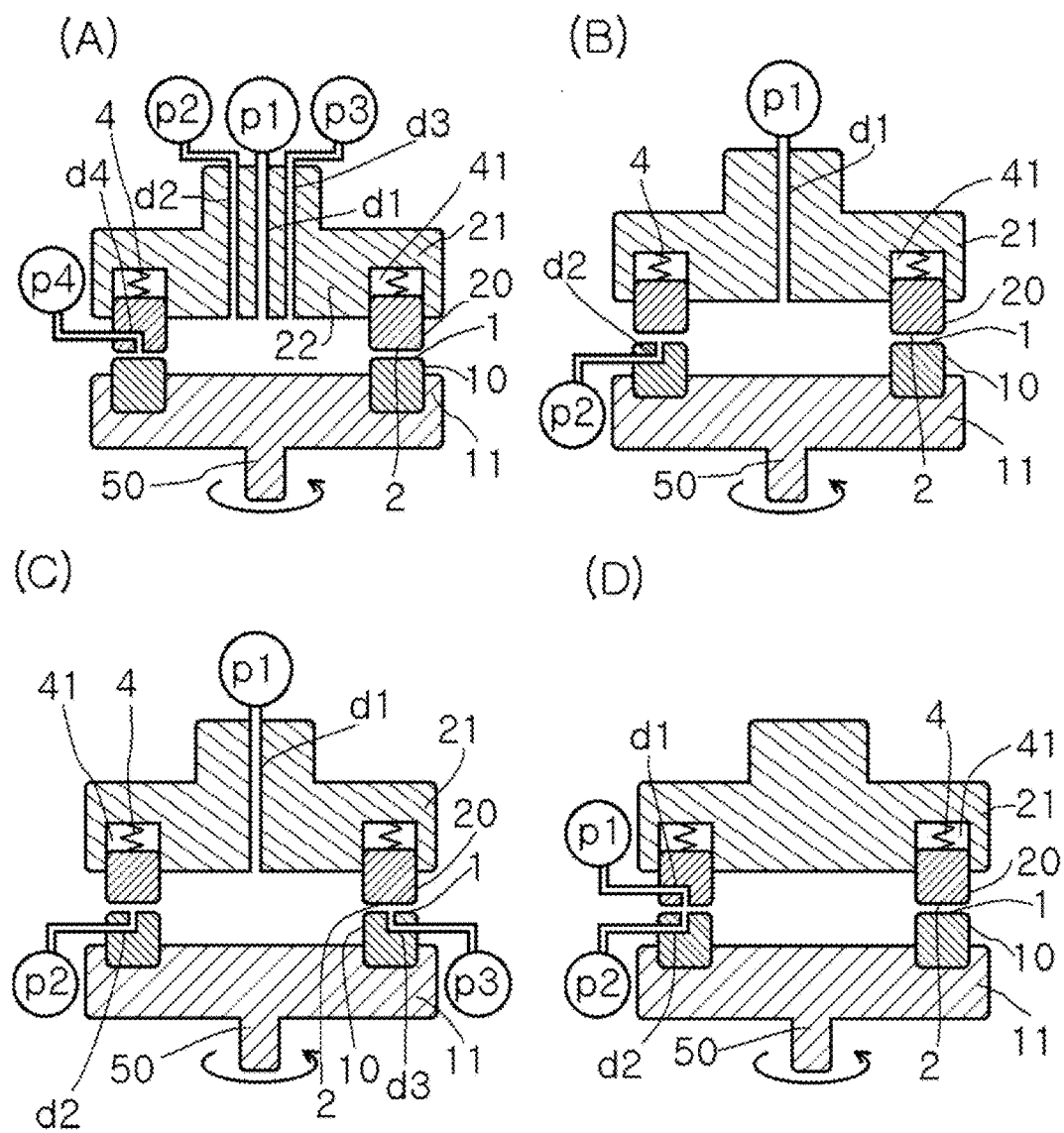
Figure 9:
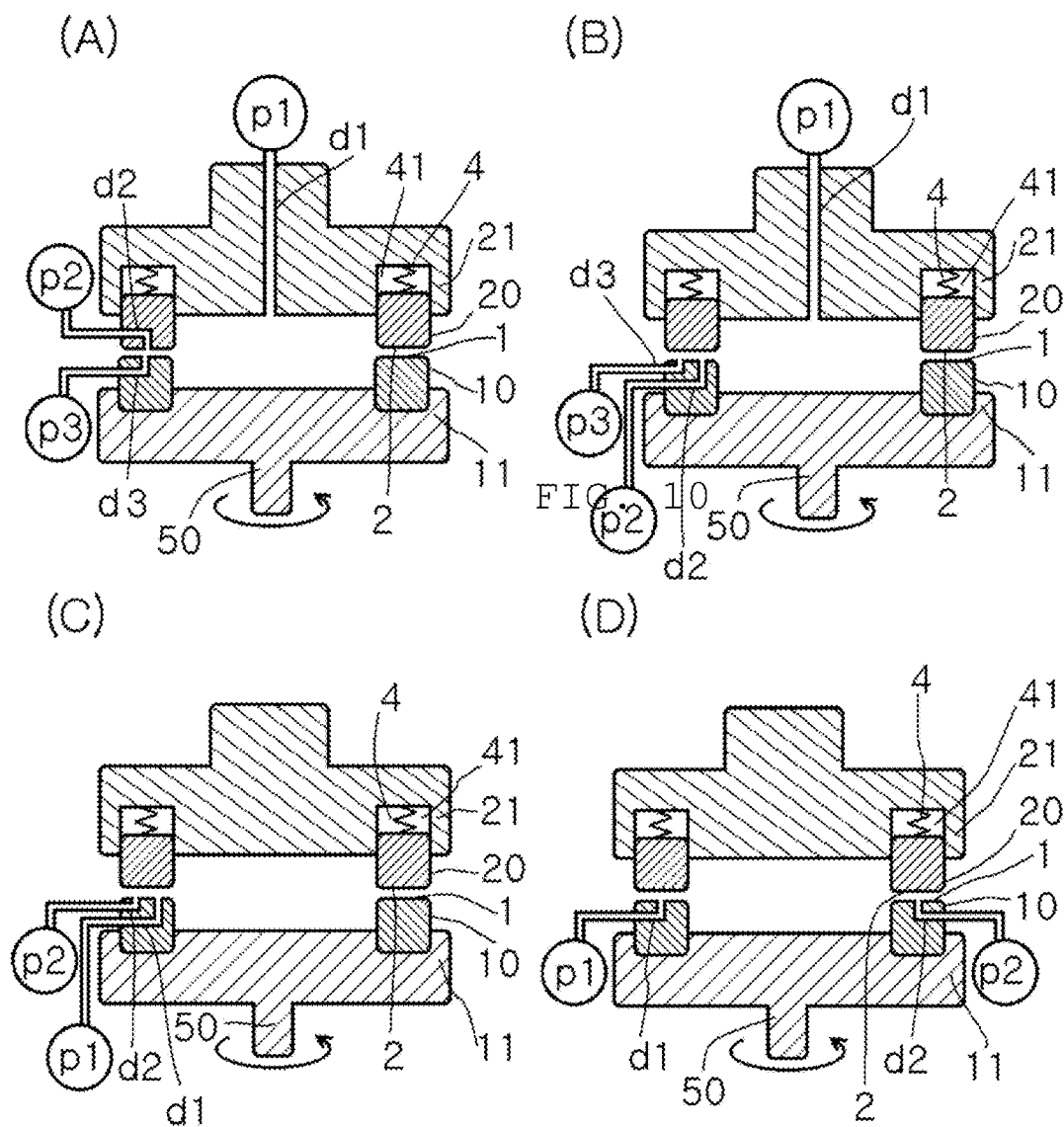
Figure 10:
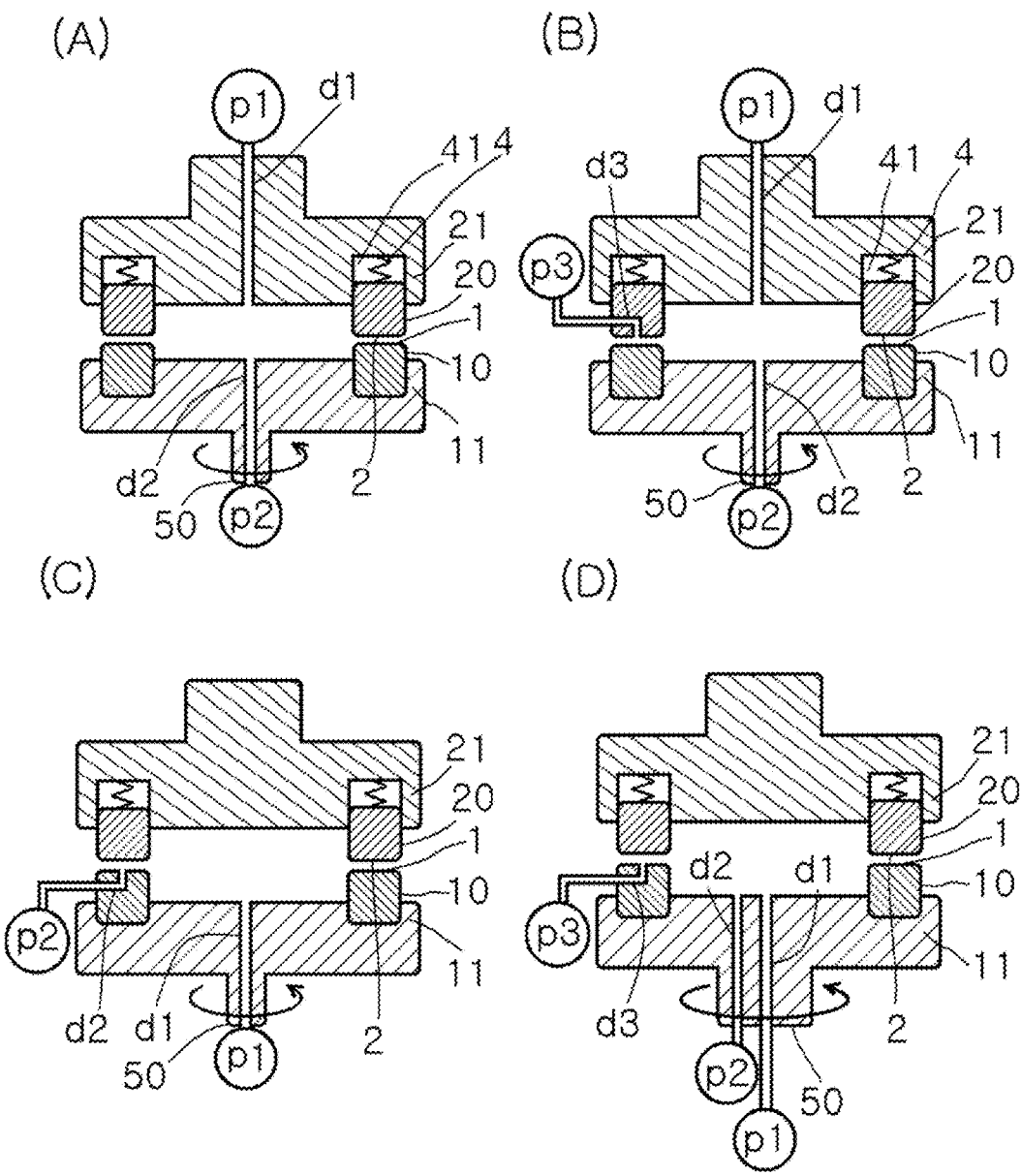
Figure 11:
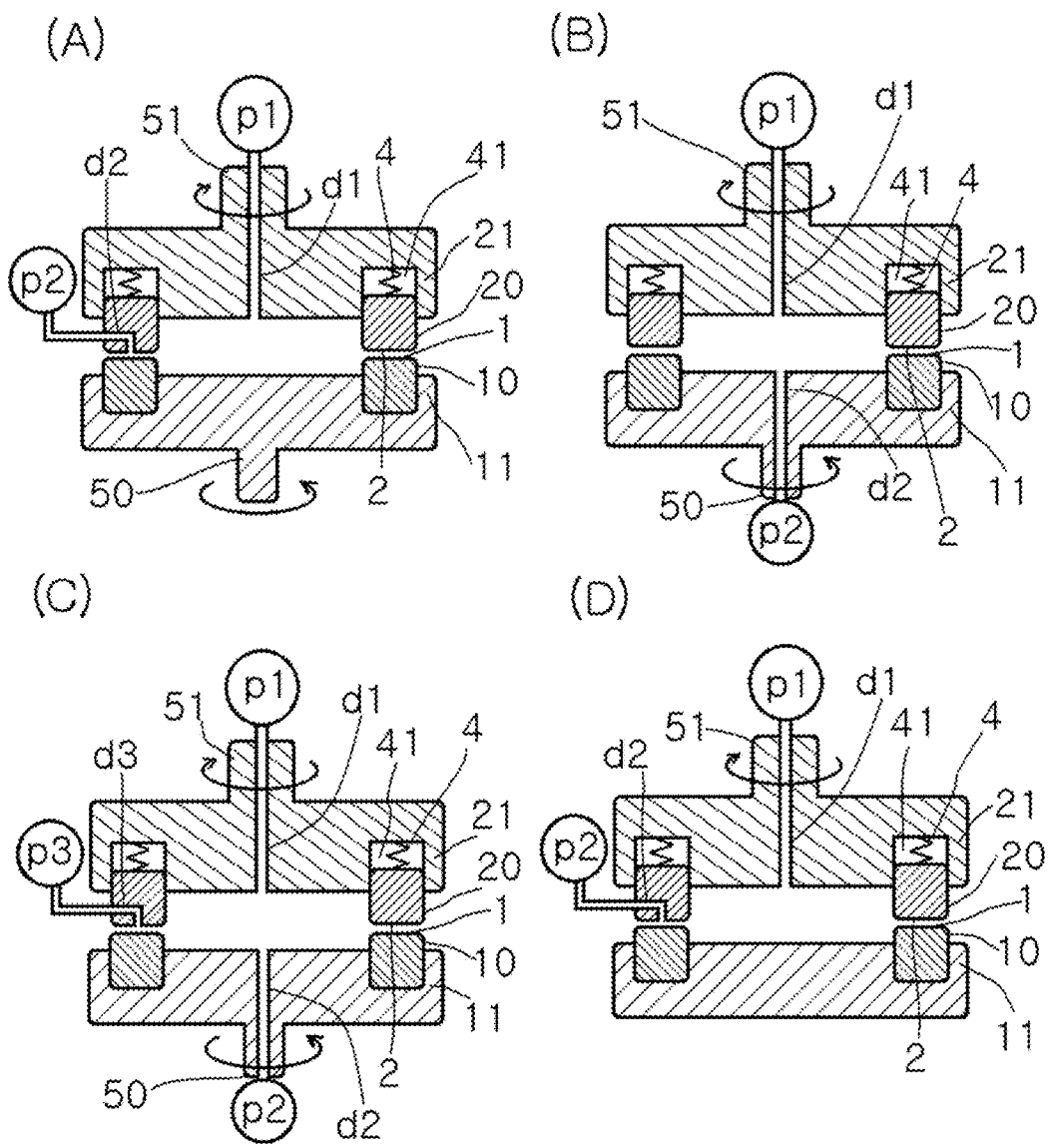

In the apparatuses shown in FIG. 7 and the apparatuses shown in FIG. 8(A), FIG. 10(A), FIG. 10(B), FIG. 10(D), FIG. 11(B) and FIG. 11(C), other processed fluids flow into the first processed fluid before reaching the processing surfaces 1 and 2, and these apparatuses are not suitable for the fluid which is rapidly crystallized or separated. However, these apparatuses can be used for the fluid having a low reaction speed.

The processing apparatus suitable for carrying out the method according to the present invention is summarized as follows.

As described above, the fluid processing apparatus comprises a fluid pressure imparting mechanism that imparts predetermined pressure to a processed fluid, at least two processing members, that is, a first processing member 10 arranged in a sealed fluid flow path through which a processed fluid at the predetermined pressure flows and a second processing member 20 capable of approaching to and separating from the first processing member 10, at least two processing surfaces of a first processing surface 1 and a second processing surface 2 arranged in a position in which they are faced with each other in the processing members 10 and 20, and a rotation drive mechanism that relatively rotates the first processing member 10 and the second processing member 20, wherein at least two processed fluids are mixed (and reacted when the mixing is accompanied by reaction) between the processing surfaces 1 and 2. Of the first processing member 10 and the second processing member 20, at least the second processing member 20 has a pressure-receiving surface, at least a part of the pressure-receiving surface is comprised of the second processing surface 2, and the pressure-receiving surface receives pressure applied by the fluid pressure imparting mechanism to at least one of the fluids to generate a force to move in the direction of separating the second processing surface 2 from the first processing surface 1. In this apparatus, the processed fluid that has received said pressure passes through the space between the first processing surface 1 and the second processing surface 2 capable of approaching to and separating from each other, thereby generating a desired mixing (reaction) between the processed fluids with the processed fluids being passed between the processing surfaces 1 and 2 and forming a film fluid of predetermined thickness.

In this fluid processing apparatus, at least one of the first processing surface 1 and the second processing surface 2 is preferably provided with a buffer mechanism for regulation of micro-vibration and alignment.

In this fluid processing apparatus, one of or both the first processing surface 1 and the second processing surface 2 is preferably provided with a displacement regulating mechanism capable of regulating the displacement in the axial direction caused by abrasion or the like thereby maintaining the thickness of a film fluid between the processing surfaces 1 and 2.

In this fluid processing apparatus, a pressure device such as a compressor for applying predetermined feeding pressure to a fluid can be used as the fluid pressure imparting mechanism.

As the pressure device, a device capable of regulating an increase and decrease in feeding pressure is used. This is because the pressure device should be able to keep established pressure constant and should be able to regulate an increase and decrease in feeding pressure as a parameter to regulate the distance between the processing surfaces.

The fluid processing apparatus can be provided with a separation preventing part for defining the maximum distance between the first processing surface 1 and the second processing surface 2 and preventing the processing surfaces 1 and 2 from separating from each other by the maximum distance or more.

The fluid processing apparatus can be provided with an approach preventing part for defining the minimum distance between the first processing surface 1 and the second processing surface 2 and preventing the processing surfaces 1 and 2 from approaching to each other by the minimum distance or less.

The fluid processing apparatus can be one wherein both the first processing surface 1 and the second processing surface 2 are rotated in opposite directions.

The fluid processing apparatus can be provided with a temperature-regulating jacket for regulating the temperature of either or both of the first processing surface 1 and the second processing surface 2.

The fluid processing apparatus is preferably one wherein at least a part of either or both of the first processing surface 1 and the second processing surface 2 is mirror-polished.

The fluid processing apparatus can be one wherein one of or both the first processing surface 1 and the second processing surface 2 is provided with depressions.

The fluid processing apparatus preferably includes, as a means for feeding one processed fluid to be mixed (reacted) with another processed fluid, a separate introduction path independent of a path for another processed fluid, at least one of the first processing surface and the second processing surface is provided with an opening leading to the separate introduction path, and another processed fluid sent through the separate introduction path is introduced into the processed fluid.

The processing apparatus for carrying out the present invention comprises a fluid pressure imparting mechanism that imparts predetermined pressure to a fluid, at least two processing surfaces of a first processing surface 1 and a second processing surface 2 capable of approaching to and separating from each other which are connected to a sealed fluid flow path through which the processed fluid at the predetermined pressure is passed, a surface-approaching pressure imparting mechanism that imparts surface-approaching pressure to the space between the processing surfaces 1 and 2, and a rotation drive mechanism that relatively rotates the first processing surface 1 and the second processing surface 2, whereby at least two processed fluids are mixed (reacted) between the processing surfaces 1 and 2, at least one processed fluid pressurized with the fluid pressure imparting mechanism is passed through the space between the first processing surface 1 and the second processing surface 2 rotating to each other and supplied with surface-approaching pressure, and another processed fluid is passed, so that the processed fluid pressurized with the fluid pressure imparting mechanism, while being passed between the processing surfaces and forming a film fluid of predetermined thickness, is mixed with another processed fluid, whereby a desired mixing (reaction) is caused between the processed fluids.

The surface-approaching pressure imparting mechanism can constitute a buffer mechanism of regulating microvibration and alignment and a displacement regulation mechanism in the apparatus described above.

The fluid processing apparatus for carrying out the present invention comprises a first introduction part that introduces, into the apparatus, at least one of two processed fluids to be mixed (reacted), a fluid pressure imparting mechanism p that is connected to the first introduction part and imparts pressure to the processed fluid, a second introduction part that introduces at least the other fluid of the two processed fluids to be mixed (reacted), at least two processing members, that is, a first processing member 10 arranged in a sealed fluid flow path through which the other processed fluid is passed and a second processing member 20 capable of relatively approaching to and separating from the first processing member 10, at least two processing surfaces, that is, a first processing surface 1 and a second processing surface 2 arranged so as to be opposite to each other in the processing members 10 and 20, a holder 21 that accepts the second processing member 20 so as to expose the second processing surface 2, a rotation drive mechanism that relatively rotates the first processing member 10 and the second processing member 20, and a surface-approaching pressure imparting mechanism 4 that presses the second processing member 20 against the first processing surface 1 such that the second processing surface 2 is contacted against or made close to the first processing surface 1, wherein the processed fluids are mixed (reacted) between the processing surfaces 1 and 2, the holder 21 is provided with an opening of the first introduction part and is not movable so as to influence the space between the processing surfaces 1 and 2, at least one of the first processing member 10 and the second processing member 20 is provided with an opening of the second introduction part, the second processing member 20 is circular, the second processing surface 2 slides along the holder 21 and approaches to and separates from the first processing surface 1, the second processing member 20 includes a pressure-receiving surface, the pressure-receiving surface receives pressure applied by the fluid pressure imparting mechanism p to the processed fluid to generate a force to move in the direction of separating the second processing surface 2 from the first processing surface 1, at least a part of the pressure-receiving surface is comprised of the second processing surface 2, one of the processed fluids to which pressure was applied is passed through the space between the first processing surface 1 and the second processing surface 2 rotating to each other and capable of approaching to and separating from each other, and the other processed fluid is supplied to the space between the processing surfaces 1 and 2, whereby both the processed fluids form a film fluid of predetermined thickness and pass through the space between both the processing surfaces 1 and 2, the passing processed fluid are mixed thereby promoting a desired mixing (reaction) between the processed fluids, and the minimum distance for generating the film fluid of predetermined thickness is kept between the processing surfaces 1 and 2 by the balance between the surface-approaching pressure by the surface-approaching pressure imparting mechanism 4 and the force of separating the processing surfaces 1 and 2 from each other by the fluid pressure imparted by the fluid pressure imparting mechanism p.

In this fluid processing apparatus, the second introduction part can be, similarly being connected to the first introduction part, arranged to be connected to a separate fluid pressure imparting mechanism and to be pressurized. The processed fluid introduced from the second introduction part is not pressurized by the separate fluid pressure imparting mechanism, but is sucked and supplied into the space between the processing surfaces 1 and 2 by negative pressure generated in the second introduction part by the fluid pressure of the processed fluid introduced into the first introduction part. Alternatively, the other processed fluid flows downward by its weight in the second introduction part and can be supplied into the space between the processing surfaces 1 and 2.

As described above, the apparatus is not limited to the one wherein the opening of the first introduction part as an inlet for feeding the other processed fluid into the apparatus is arranged in the second holder, and the opening of the first introduction part may be arranged in the first holder. The opening of the first introduction part may be formed with at least one of the processing surfaces. However, when the processed fluid to be previously introduced into the space between the processing surfaces 1 and 2 should, depending on the reaction, be supplied from the first introduction part, the opening of the second introduction part as an inlet for feeding the other processed fluid into the apparatus should be arranged downstream from the opening of the first introduction part in any of the processing surfaces.

As the fluid processing apparatus for carrying out the present invention, the following apparatus can be used.

This fluid processing apparatus comprises a plurality of introduction parts that separately introduce two or more processed fluids to be mixed (reacted), a fluid pressure imparting mechanism p that imparts pressure to at least one of the two or more processed fluids, at least two processing members, that is, a first processing member 10 arranged in a sealed fluid flow path through which the processed fluid is passed and a second processing member 20 capable of approaching to and separating from the first processing member 10, at least two processing surfaces 1 and 2, that is, a first processing surface 1 and a second processing surface 2 arranged in a position in which they are faced with each other in the processing members 10 and 20, and a rotation drive mechanism that relatively rotates the first processing member 10 and the second processing member 20, wherein the processed fluids are mixed (reacted) between the processing surfaces 1 and 2, at least the second processing member 20 of the first processing member 10 and the second processing member 20 includes a pressure-receiving surface, at least a part of the pressure-receiving surface is comprised of the second processing surface 2, the pressure-receiving surface receives pressure applied by the fluid pressure imparting mechanism to the processed fluid to generate a force to move in the direction of separating the second processing surface 2 from the first processing surface 1, the second processing member 20 includes an approach regulating surface 24 that is directed to the opposite side of the second processing surface 2, the approach regulating surface 24 receives predetermined pressure applied to the processed fluid to generate a force to move in the direction of approaching the second processing surface 2 to the first processing surface 1, a force to move in the direction of separating the second processing surface 2 from the first processing surface 1 as a resultant force of total pressure received from the processed fluid is determined by the area ratio of the projected area of the approach regulating surface 24 in the approaching and separating direction to the projected area of the pressure-receiving surface in the approaching and separating direction, the processed fluid to which pressure was applied is passed through the space between the first processing surface 1 and the second processing surface 2 that rotate relative to each other and capable of approaching to and separating from each other, the other processed fluid to be mixed (reacted) with the processed fluid is mixed in the space between the processing surfaces, and the mixed processed fluid forms a film fluid of predetermined thickness and simultaneously passes through the space between the processing surfaces 1 and 2, thereby giving a desired product while passing through the space between the processing surfaces.

The fluid processing method according to the present invention is summarized as follows. In the apparatus according to the present invention, the following fluid processing method can be carried out. The fluid processing method comprises applying predetermined pressure to a first processing fluid, connecting at least two processing surfaces of a first processing surface 1 and a second processing surface 2, which are capable of approaching to and separating from each other, to a sealed fluid flow path in which a processed fluid under this predetermined pressure is flowed, applying contacting pressure for allowing the processing surfaces 1 and 2 to contact with each other, rotating the first processing surface 1 and the second processing surface 2 relatively and introducing the processed fluid into the processing surfaces 1 and 2, introducing a second processed fluid mixing (reacting) with the processed fluid into the processing surfaces 1 and 2 through another fluid path to mix (react) both the processed fluids, allowing the predetermined pressure applied to at least the first processed fluid to act as a separation force of separating both the processed surfaces 1 and 2 from each other, balancing the separation force and the contacting pressure via the processed fluid between the processing surfaces 1 and 2 so that both the processing surfaces 1 and 2 are maintained to be in a predetermined minute distance, allowing the processed fluid to pass through the processed fluids 1 and 2 as a film fluid in a predetermined thickness, and uniformly conducting the mixing (reaction) of both the processing fluids during this passage, and crystallizing or separating the desired reaction product in the case of the reaction accompanied by separation.

Figure 28:
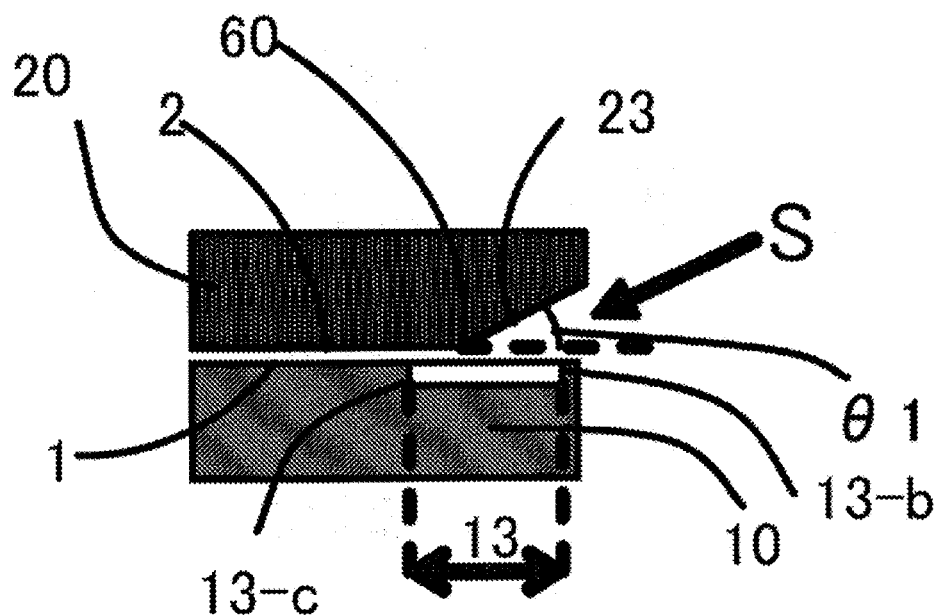
Figure 28:
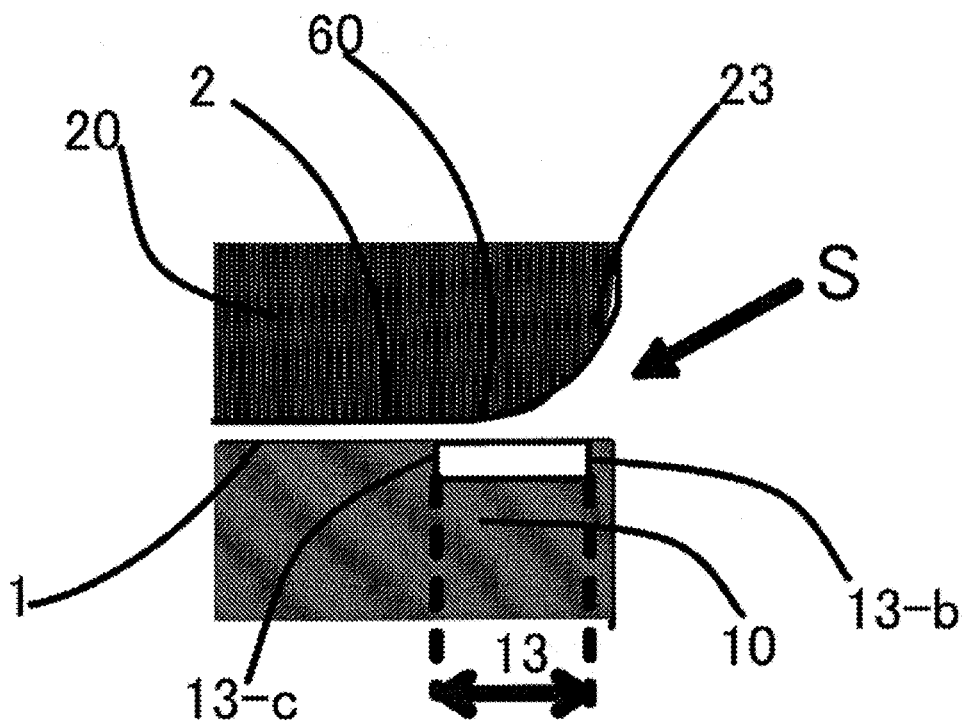

Hereinafter, other embodiments of the present invention will be explained together with FIG. 28, FIG. 29, and so on.

The pressure-receiving surface 23 in this embodiment is inclined.

This inclined surface (pressure-receiving surface 23) is formed such that the distance in the axial direction between the upstream end in the direction of flow of the processed fluid and the processing surface of the processing member provided with the depression 13 is longer than the distance between the downstream end and the aforesaid processing surface. The downstream end of this inclined surface in the direction of flow of the processed fluid is arranged preferably on the projected area in the axial direction of the depression 13.

Specifically, as shown in FIG. 28(A), a downstream end 60 of the inclined surface (pressure-receiving surface 23) is arranged on the projected area in the axial direction of the depression 13. The angle θ1 of the inclined surface to the second processing surface 2 is preferably in the range of 0.1° to 85°, more preferably in the range of 10° to 55°, still more preferably in the range of 15° to 45°. The angle θ1 can vary depending on properties of the processed product before processing. The downstream end 60 of the inclined surface is arranged in the region extending from the position apart downstream by 0.01 mm from an upstream end 13-*b* to the position apart upstream by 0.5 mm from a downstream end 13-*c* in the depression 13 arranged in the first processing surface 1. The downstream end 60 of the inclined surface is arranged more preferably in the region extending from the position apart downstream by 0.05 mm from the upstream end 13-*b* to the position apart upstream by 1.0 mm from the downstream end 13-*c*. Like the angle of the inclined surface, the position of the downstream end 60 can vary depending on properties of a material to be processed. As shown in FIG. 28(B), the inclined surface (pressure-receiving surface 23) can be a curved surface. The material to be processed can thereby be introduced more uniformly.

The depressions 13 may be connected to one another or separated from one another as described above. When the depressions 13 are separated, the upstream end at the innermost peripheral side of the first processing surface 1 is 13-*b*, and the upstream end at the outermost peripheral side of the first processing surface 1 is 13-*c*.

In the foregoing description, the depression 13 was formed on the first processing surface 1 and the pressure-receiving surface 23 was formed on the second processing surface 2. On the contrary, the depression 13 may be formed on the second processing surface 2, and the pressure-receiving surface 23 may be formed on the first processing surface 1.

Alternatively, the depression 13 is formed both on the first processing surface 1 and the second processing surface 2, and the depression 13 and the pressure-receiving surface 23 are alternately arranged in the circumferential direction of each of the respective processing surfaces 1 and 2, whereby the depression 13 formed on the first processing surface 1 and the pressure-receiving surface 23 formed on the second processing surface 2 are faced with each other and simultaneously the pressure-receiving surface 23 formed on the first processing surface 1 and the depression 13 formed on the second processing surface 2 are faced with each other.

A groove different from the depression 13 can be formed on the processing surface. Specifically, as shown in FIG. 19(F) and FIG. 19(G), a radially extending novel depression 14 instead of the depression 13 can be formed outward in the radial direction (FIG. 19(F)) or inward in the radial direction (FIG. 19(G)). This is advantageous for prolongation of retention time between the processing surfaces or for processing a highly viscous fluid.

The groove different from the depression 13 is not particularly limited with respect to the shape, area, number of depressions, and depth. The groove can be formed depending on the object.

The second processing member 20 is provided with the second introduction part d2 arranged with the opening d20 that is leading to between the processing surfaces and is independent of the flow path of the fluid introduced between the processing surfaces.

Specifically, in the second introduction part d2, introduction direction from the opening d20 of the second processing surface 2 is inclined with a prescribed angle of elevation (θ1) to the second processing surface 2, as shown in FIG. 3(A). This angle of elevation (θ1) is set in the range between more than zero degree and less than 90 degrees, or preferably in the range between one or more degree and 45 or less degrees in the case of a reaction with a fast reaction rate.

In addition, as shown in FIG. 3(B), introduction direction from the opening d20 of the second processing surface 2 is directional in the plane along the second processing surface 2. This introduction direction of the second fluid is outward direction from the center in the component of radial direction of the processing surface, and also the direction is forward direction in the component of rotation direction of the fluid between the rotating processing surfaces. In other words, there is a prescribed angle (θ2) to rotation direction R from the standard line g which is the outward line segment in the radial direction running through the opening d20.

The angle (θ2) is set also in the range between more than zero degree and less than 90 degrees, wherein the fluid is discharged from the opening d20 toward the shaded area in the FIG. 3(B). In the case of a reaction with a fast reaction rate, the angle (θ2) may be small, while in the case of a reaction with a slow reaction rate it is preferable that the angle (θ2) be set large. This angle may be appropriately set in accordance with conditions such as kind, reaction rate, and viscosity of the fluid, and rotation speed of the processing surfaces.

The bore diameter of the opening d20 is preferably 0.2 μm to 3000 μm, more preferably 10 μm to 1000 μm. When the diameter of the opening d20 does not substantially influence the flow of a fluid, the diameter of the second introduction part d2 may be established in this range. Depending on whether the fluid is intended to be transferred straight or dispersed, the shape of the opening d20 is preferably changed and can be changed depending on various conditions such as the type of fluid, reaction speed, viscosity, and rotation speed of the processing surface.

The opening d20 in the separate flow path may be arranged at a position nearer to the outer diameter than a position where the direction of flow upon introduction by the micro-pump effect from the depression arranged in the first processing surface 1 is converted into the direction of flow of a spiral laminar flow formed between the processing surfaces. That is, in FIG. 2(B), the distance n from the outermost side in the radial direction of the processing surface of the depression 13 arranged in the first processing surface 1 to the outside in the radial direction is preferably 0.5 mm or more. When a plurality of openings are arranged for the same fluid, the openings are arranged preferably concentrically. When a plurality of openings are arranged for different fluids, the openings are arranged preferably concentrically in positions different in radius. This is effective for the reactions such as cases (1) A+B→C and (2) C+D→E should occur in due order, but other case, i.e., A+B+C→F should not occur, or for circumventing a problem that an intended reaction does not occur due to insufficient contact among reactants.

The processing members are dipped in a fluid, and a fluid obtained by mixing (reaction) between the processing surfaces can be directly introduced into a liquid outside the processing members or into a gas other than air.

Further, ultrasonic energy can be applied to the processed material just after being discharged from the space between the processing surfaces or from the processing surface.

Next, the case where temperature-regulating mechanisms J1 and J2 are arranged in at least one of the first processing member 10 and the second processing member 20 for generating a temperature difference between the first processing surface 1 and the second processing surface 2 is described.

The temperature regulating mechanism is not particularly limited. A cooling part is arranged in the processing members 10 and 20 when cooling is intended. Specifically, a piping for passing ice water and various cooling media or a cooling element such as a Peltier device capable of electric or chemical cooling is attached to the processing members 10 and 20.

When heating is intended, a heating part is arranged in the processing members 10 and 20. Specifically, steam as a temperature regulating medium, a piping for passing various hot media, and a heating element such as an electric heater capable of electric or chemical heating is attached to the processing members 10 and 20.

An accepting part for a new temperature regulating medium capable of directly contacting with the processing members may be arranged in the ring-accepting part. The temperature of the processing surfaces can be regulated by heat conduction of the processing members. Alternatively, a cooling or heating element may be embedded in the processing members 10 and 20 and electrified, or a path for passing a cooling medium may be embedded, and a temperature regulating medium (cooling medium) is passed through the path, whereby the temperature of the processing surfaces can be regulated from the inside. By way of example, the temperature regulating mechanisms J1 and J2 which are pipes (jackets) arranged inside the processing members 10 and 20 are shown in FIG. 25.

By utilizing the temperature regulating mechanisms J1 and J2, the temperature of one of the processing surfaces is made higher than that of the other, to generate a temperature difference between the processing surfaces. For example, the first processing member 10 is heated to 60° C. by any of the methods, and the second processing member 20 is set at 15° C. by any of the methods. In this case, the temperature of the fluid introduced between the processing surfaces is changed from 60° C. to 15° C. in the direction from the first processing surface 1 to the second processing surface 2. That is, the fluid between the processing surfaces has a temperature gradient. The fluid between the processing surfaces initiates convection due to the temperature gradient, and a flow in a direction perpendicular to the processing surface is generated. The "flow in a direction perpendicular to the processing surface" refers to a flow in which components flowing in a direction perpendicular to at least the processing surface are contained in flowing components.

Even when the first processing surface 1 or the second processing surface 2 rotates, the flow in a direction perpendicular to the processing surface is continued, and thus the flow in a direction perpendicular to the processing surface can be added to a spiral laminar flow between the processing surfaces caused by rotation of the processing surfaces. The temperature difference between the processing surfaces is 1° C. to 400° C., preferably 5° C. to 100° C.

The rotary shaft 50 in this apparatus is not limited to a vertically arranged shaft. For example, the rotary shaft may be arranged at a slant. This is because the influence of gravity can be substantially eliminated by a thin film fluid formed between the processing surfaces 1 and 2 during processing. As shown in FIG. 1, the first introduction part d1 coincides with the shaft center of the second ring 20 in the second holder 21 and extends vertically. However, the first introduction part d1 is not limited to the one coinciding with the shaft center of the second ring 20, and as far as it can supply the first processing fluid to the space surrounded with the rings 10 and 20, the part d1 may be arranged at a position outside the shaft center in the central part 22 of the second holder 21 and may extend obliquely as well as vertically. Regardless of the angle at which the part d1 is arranged, a flow perpendicular to the processing surface can be generated by the temperature gradient between the processing surfaces.

When the temperature gradient of the fluid between the processing surfaces is low, heat conduction merely occurs in the fluid, but when the temperature gradient exceeds a certain border value, a phenomenon called Benard convection is generated in the fluid. This phenomenon is governed by Rayleigh number Ra, a dimensionless number, defined by the following equation:

$$Ra = L^3 \cdot g \cdot \beta \cdot \Delta T / (\alpha \cdot \nu)$$

wherein L is the distance between processing surfaces; g is gravitational acceleration; β is coefficient of volumetric thermal expansion of fluid; ν is dynamic viscosity of fluid; α is heat diffusivity of fluid; and ΔT is temperature difference between processing surfaces. The critical Rayleigh number at which Benard convection is initiated to occur, although varying depending on the properties of a boundary phase between the processing surface and the processed fluid, is regarded as about 1700. At a value higher than this value, Benard convection occurs. Under the condition where the Rayleigh number Ra is a large value of about $10^{10}$ or more, the fluid becomes a turbulent flow. That is, the temperature difference $\Delta T$ between the processing surfaces or the distance L between the processing surfaces in this apparatus are regulated such that the Rayleigh number Ra becomes 1700 or more, whereby a flow perpendicular to the processing surface can be generated between the processing surfaces, and the mixing (reaction) procedures described above can be carried out.

However, the Benard convection hardly occurs when the distance between the processing surfaces is about 1 μm to 10 μm. Strictly, when the Rayleigh number is applied to a fluid between the processing surfaces having a distance of 10 μM or less therebetween to examine the conditions under which Benard convection is generated, the temperature difference should be several thousands of degrees or more in the case of water, which is practically difficult. Benard convection is one related to density difference in temperature gradient of a fluid, that is, to gravity. When the distance between the processing surfaces is 10 μm or less, there is high possibility of minute gravity field, and in such a place, buoyancy convection is suppressed. That is, it is the case where the distance between the processing surfaces is 10 μm or more that Benard convection actually occurs.

When the distance between the processing surfaces is about 1 μm to 10 μm, convection is generated not due to density difference but due to surface tension difference of a fluid resulting from temperature gradient. Such convection is Marangoni convection. This phenomenon is governed by Marangoni number Ma, a dimensionless number, defined by the following equation:

$$Ma = \sigma \cdot \Delta T \cdot L / (\rho \cdot \nu \cdot \alpha)$$

wherein L is the distance between processing surfaces; ν is dynamic viscosity of fluid; α is heat diffusivity of fluid; ΔT is temperature difference between processing surfaces; ρ is density of fluid; and σ is temperature coefficient of surface tension (temperature gradient of surface tension). The critical Marangoni number at which Marangoni convection is initiated to occur is about 80, and under the conditions where the Marangoni number is higher than this value, Marangoni convection occurs. That is, the temperature difference ΔT between the processing surfaces or the distance L between the processing surfaces in this apparatus is regulated such that the Marangoni number Ma becomes 80 or more, whereby a flow perpendicular to the processing surface can be generated between the processing surfaces even if the distance therebetween is as small as 10 μm or less, and the reaction procedures described above can be carried out.

For calculation of Rayleigh number, the following equations were used.

$$Ra = \frac{L^3 \cdot \beta \cdot g}{\nu \cdot \alpha} \Delta T \qquad \text{[Equation 1]}$$

$$\Delta T = (T_1 - T_0)$$

$$\alpha = \frac{k}{\rho \cdot C_p}$$

L is the distance (m) between processing surfaces; β is coefficient of volumetric thermal expansion (1/K); g is gravitational acceleration (m/s$^2$); ν is dynamic viscosity (m$^2$/s); α is heat diffusivity (m$^2$/s); ΔT is temperature difference (K) between processing surfaces; ρ is density (kg/m$^3$); Cp is isobaric specific heat (J/kg·K); k is heat conductivity (W/m·K); $T_1$ is temperature (K) at high temperature side in processing surface; and $T_0$ is temperature (K) at low temperature side in processing surface.

When the Rayleigh number at which Benard convection is initiated to occur is the critical Rayleigh number $Ra_C$, the temperature difference $\Delta T_{C1}$ is determined as follows:

$$\Delta T_{C1} = \frac{Ra_C \cdot \nu \cdot \alpha}{L^3 \cdot \beta \cdot g} \qquad \text{[Equation 2]}$$

For calculation of Marangoni number, the following equations were used.

$$Ma = \frac{\sigma_t \cdot L}{\rho \cdot \nu \cdot \alpha} \Delta T \qquad \text{[Equation 3]}$$

$$\Delta T = (T_1 - T_0)$$

$$\alpha = \frac{k}{\rho \cdot C_p}$$

L is the distance (m) between processing surfaces; ν is dynamic viscosity (m$^2$/s); α is heat diffusivity (m$^2$/s); ΔT is temperature difference (K) between processing surfaces; ρ is density (kg/m$^3$); Cp is isobaric specific heat (J/kg·K); k is heat conductivity (W/m·K); $\sigma_t$ is surface tension temperature coefficient (N/m·k); $T_1$ is temperature (K) of a high-temperature surface out of processing surface; and $T_0$ is temperature (K) of a low-temperature surface out of processing surface.

When the Marangoni number at which Marangoni convection is initiated to occur is the critical Marangoni number $Ma_C$, the temperature difference $\Delta T_{C2}$ is determined as follows:

$$\Delta T_{C2} = \frac{Ma_C \cdot \rho \cdot \nu \cdot \alpha}{\sigma_t \cdot L} \qquad \text{[Equation 4]}$$

Then, the process capable of carrying out using the fluid processing apparatus according the present invention will be described below. The fluid processing apparatus according to the present invention is not limited to the following examples, and may be used not only for reactions in conventional micro-reactors and micro-mixers but also for processes such as other various reactions, mixing and dispersing.

A reaction wherein at least one pigment is dissolved in a strong acid such as sulfuric acid, nitric acid or hydrochloric acid to prepare a pigment acidic solution, which is then mixed with a solution containing water, to prepare pigment particles (acid pasting method).

A reaction wherein at least one pigment is dissolved in an organic solvent to prepare a pigment solution, and then the pigment solution is charged into a solvent which is a poor solvent for the pigment and which is a poor solvent compatible with the organic solvent used in preparation of the solution to precipitate pigment particles (re-precipitation method).

A reaction wherein either of an acidic or alkaline pH adjusting solution or a mixed solution of the pH adjusting solution and an organic solvent is mixed with a pigment solution in which at least one pigment is dissolved and with a pigment-separating solution that changes the pH of the pigment solution which does not show solubility for the pigment contained in the pigment solution or shows less solubility for the pigment contained in the pigment solvent than in the solvent contained in the pigment solution, to obtain pigment particles.

A reaction of supporting metal microparticles on the surface of carbon black by a liquid-phase reduction method (the metal can be exemplified by at least one metal selected from the group consisting of platinum, palladium, gold, silver, rhodium, iridium, ruthenium, osmium, cobalt, manganese, nickel, iron, chromium, molybdenum, and titanium).

A reaction of producing crystals comprised of fullerene molecules and fullerene nanowhiskers/nanofiber nanotubes, by mixing a solution containing a first solvent in which fullerene is dissolved with a second solvent having a lower solubility for fullerene than the first solvent.

A reaction of reducing a metal compound (the metal can be exemplified by a noble metal such as gold, silver, ruthenium, rhodium, palladium, osmium, iridium or platinum, or copper, or an alloy of two or more metals described above).

A reaction of hydrolyzing a ceramic material (the ceramic material can be exemplified by at least one kind selected from Al, Ba, Mg, Ca, La, Fe, Si, Ti, Zr, Pb, Sn, Zn, Cd, As, Ga, Sr, Bi, Ta, Se, Te, Hf, Mg, Ni, Mn, Co, S, Ge, Li, B, and Ce).

A reaction of separating titanium dioxide superfine particles by hydrolyzing a titanium compound (the titanium compound can be exemplified by at least one kind selected from tetraalkoxy titanium such as tetramethoxy titanium, tetraethoxy titanium, tetra-n-propoxy titanium, tetraisopropoxy titanium, tetra-n-butoxy titanium, tetraisobutoxy titanium, tetra-t-butoxy titanium and derivatives thereof, and titanium tetrachloride, titanyl sulfate, titanium citrate and titanium tetranitrate).

A reaction of forming compound semiconductor microparticles through co-precipitation/separation by joining fluids that are semiconductor materials and contain ions having different elements (the compound semiconductor can be exemplified by group II-VI compound semiconductors, group III-V compound semiconductors, group IV compound semiconductors and group I-III-VI compound semiconductors).

A reaction of forming semiconductor microparticles by reducing a semiconductor element (the semiconductor element can be exemplified by an element selected from the group consisting of silicon (Si), germanium (Ge), carbon (C), and tin (Sn)).

A reaction of forming magnetic microparticles by reducing a magnetic material (the magnetic material can be exemplified by at least one kind selected from nickel, cobalt, iridium, iron, platinum, gold, silver, manganese, chromium, palladium, yttrium, and lanthanides (neodymium, samarium, gadolinium and terbium)).

A reaction wherein a fluid having at least one biologically ingestible microparticle raw material dissolved in a first solvent is mixed with a solvent capable of serving as a second solvent having a lower solubility than the first solvent, to separate biologically ingestible microparticles.

Alternatively, a reaction wherein a fluid containing at least one acidic substance or cationic substance is mixed with a fluid containing at least one basic substance or anionic substance, and biologically ingestible microparticles are separated by neutralization reaction.

A process wherein a fluid to be processed including an oil phase component containing lipid-soluble pharmacologically active substance is mixed with a fluid to be processed comprised of at least a liquid dispersing solvent, or a fluid to be processed including a water phase component containing a water-soluble pharmacologically active substance is mixed with a fluid to be processed comprised of at least an oil-based dispersing solvent, to obtain microemulsion particles.

Alternatively, a process wherein one or more kinds of phospholipid is contained in at least either a dispersed phase or a continuous phase, wherein the dispersed phase contains a pharmacologically active substance, while the continuous phase is comprised of a liquid dispersing solvent, and the fluid of the dispersed phase and the fluid of the continuous phase are mixed to obtain liposomes.

A process wherein a fluid having a resin dissolved in a solvent having a solubility and compatibity for resins is mixed with an aqueous solvent to obtain resin microparticles by separation or emulsification.

Alternatively, a process wherein a heated and molten resin is mixed with an aqueous solvent to obtain fine resin particles by emulsification/dispersion.

Reactions of obtaining microparticles by organic reaction of an organic compound as a starting material with various organic reacting agents, such as Friedel-Crafts reaction, nitration reaction, addition reaction, elimination reaction, transfer reaction, polymerization reaction, condensation reaction, coupling reaction, acylation, carbonylation, aldehyde synthesis, peptide synthesis, aldol reaction, indole reaction, electrophilic substitution reaction, nucleophilic substitution reaction, Wittig reaction, Michael addition reaction, enamine synthesis, ester synthesis, enzyme reaction, diazo coupling reaction, oxidation reaction, reduction reaction, multistep reaction, selective addition reaction, Suzuki-Miyaura coupling reaction, Kumada-Corriu reaction, metathesis reaction, isomerization, radical polymerization reaction, anionic polymerization reaction, cationic polymerization reaction, metallic catalytic polymerization reaction, consecutive reaction, macromolecule synthesis, acetylene coupling reaction, episulfide synthesis, episulfide synthesis, Bamberger rearrangement, Chapman rearrangement, Claisen condensation, quinoline synthesis, Paal-Knorr furan synthesis, Paal-Knorr pyrrole synthesis, Passerini reaction, Paterno-Buchi reaction, carbonyl-ene reaction (Prins reaction), Jacobsen rearrangement, Koenigs-Knorr glycosidation reaction, Leuckart-Wallach reaction, Horner-Wadsworth-Emmons reaction, Gassman reaction, Noyori asymmetric hydrogenation reaction, Perkin reaction, Petasis reaction, Tishchenko reaction, Tishchenko reaction, Ullmann coupling, Nazarov cyclization, Tiffeneau-Demjanov rearrangement, template synthesis, oxidation with selenium dioxide, Reimer-Tiemann reaction, Grob fragmentation, haloform reaction, Malaprade glycol oxidation cleavage, Hofmann elimination, thiocarbonylation by Lawesson's reagent, Lossen rearrangement, cyclic ketone synthesis using FAMSO, Favorskii rearrangement, Feist-Benary furan synthesis, Gabriel amine synthesis, Glaser reaction, Grignard reaction, Cope elimination, Cope rearrangement, diimide reduction of alkynes, Eschenmoser aminomethylation reaction, [2+2] photocyclization, Appel reaction, aza-Wittig reaction, Bartoli indole synthesis, Carroll rearrangement, Chichibabin reaction, Clemmensen reduction, Combes quinoline synthesis, Tsuji-Trost reaction, TEMPO oxidation, dihydroxylatioin with osmium tetroxide, Fries rearrangement, Neber rearrangement, Barton-McCombie deoxygenation, Barton decarboxylation, Seyferth-Gilbert alkyne synthesis, Pinnick (Kraus) oxidation, Ito-Saegusa oxidation, Eschenmoser fragmentation, Eschenmoser-Claisen rearrangement, Doering-LaFlamme allene synthesis, Corey-Chaykovsky reaction, acyloin condensation, Wolff-Kishner reduction, IBX oxidation, Parikh-Doering oxidation, Reissert reaction, Jacobsen hydrolytic kinetic optical resolution, benzilic acid rearrangement, Hiyama cross coupling, Luche reduction, oxymercuration, Vilsmeier-Haak reaction, Wolff rearrangement, Kolbe-Schmitt reaction, Corey-Kim oxidation, Cannizzaro reaction, Henry reaction, transformation of alcohol into alkane, Arndt-Eistert synthesis, hydroformylation, Peterson olefination, decarbonylation, Curtius rearrangement, Wohl-Zieglar bromination, Pfitzner-Moffatt oxidation, McMurry coupling, Barton reaction, Balz-Schiemann reaction, Masamune-Bergman reaction, Dieckmann condensation, pinacol coupling, Williamson ether synthesis, iodolactonization, Harries ozonolysis, oxidation with active manganese dioxide, alkyne cyclotrimerization, Kumada-Tamao-Corriu cross coupling, sulfoxide and selenoxide syn-β elimination, Fischer indole synthesis, Oppenauer oxidation, Darzens condensation, Alder Ene reaction, Sarett-Collins oxidation, Nozaki-Hiyama-Kishi coupling reaction, Weinreb ketone synthesis, DAST fluorination, Corey-Winter olefin synthesis, Hosomi-Sakurai reaction, alcohol oxidation using PCC (PDC), Jones oxidation (Jones Oxidation), Keck allylation, cyanide addition using Nagata reagent, Negishi coupling, Ireland-Claisen rearrangement, Baeyer-Villiger oxidation, p-methoxybenzyl (PMB or MPM), dimethoxybenzyl (DMB) protection, deprotection, Wacker oxidation, Myers asymmetric alkylation, Yamaguchi macrolactonization, Mukaiyama-Corey macrolactonization, Bode peptide synthesis, Lindlar reduction, homogeneous hydrogenation, ortho metalation, Wagnar-Meerwein rearrangement, Wurtz reaction, ketone synthesis using 1,3-dithiane, Michael addition, Stork enamine synthesis of ketone, Pauson-Khand cyclopentene synthesis, and Tebbe reaction.

1 first processing surface
2 second processing surface
10 first processing member
11 first holder
13 depression
20 second processing member
21 second holder
d1 first introduction part
d2 second introduction part
d20 opening
α separate depression

The invention claimed is:
1. A fluid processing apparatus, comprising:
at least two processing members arranged opposite to each other and operable to approach to and separate from each other, at least one of the at least two processing members rotating relative to the other, the at least two processing members providing two processing surfaces facing each other with a space formed therebetween;
a first flow path formed in a center of the at least two processing members leading to the space between the two processing surfaces;
a second flow path, independent of the first flow path and radially outward of the first flow path, the second flow path being formed inside at least one of the at least two processing members, leading to the space between the two processing surfaces and forming an opening on the at least one of the two processing surfaces;
a plurality of depressions are arranged in a circumferential direction of at least one of the two processing surfaces, each of the plurality of depressions extending in a radial direction from inside to outside of the at least one of the two processing surfaces; and
a separate depression, different from the plurality of depressions, arranged on at least one of the two processing surfaces in a position between the plurality of depressions and the opening in the radial direction,
wherein the opening is the nearest opening formed on the at least one of the two processing surfaces in the radial direction from the center of the at least two processing members except for the plurality of depressions, the separate depression and the first flow path,
wherein the plurality of depressions are configured to produce a micro-pump effect for introduced a fluid to be processed into the space between the two processing surfaces, said micro-pump effect generating a force to move the two processing surfaces in a direction of separation therebetween by rotation of the at least one of the at least two processing members and the plurality of depressions, and generating an introduction effect of the fluid to be processed into the space between the two processing surfaces,
wherein the separate depression is configured to function as a pulsation-reducing depression to reduce pulsation caused by the micro-pump effect and to reduce an effect of a pressure change of the fluid to be processed between the two processing surfaces caused by the plurality of depressions, and
wherein a depth of each of the plurality of depressions is between 3 μm to 20 μm, and a depth of the separate depression is between 100 μm to 250 μm.

2. The fluid processing apparatus according to claim 1, wherein the separate depression overlaps with the plurality of depressions.

3. The fluid processing apparatus according to claim 1, wherein the separate depression has a form of a circular ring.

4. The fluid processing apparatus according to claim 1, wherein a width of the separate depression is between 0.5 mm to 5 mm.

5. A fluid processing method, comprising the steps of:
providing the fluid processing apparatus according to claim 1;
introducing a first fluid to be processed, via the first flow path, into the space between the at least two processing surfaces by using the micro-pump effect due to the plurality of depressions, the micro-pump effect generating a force to move the two processing surfaces in a separation direction therebetween by rotation of the at least one of the at least two processing members and the plurality of depressions, and further generating an introduction effect of the first fluid;
introducing a second fluid to be processed, via the second flow path, into the space between the at least two processing surfaces; and
mixing the first and second fluids in the space between the two processing surfaces, thereby forming a thin film fluid between the two processing surfaces.

6. The fluid processing apparatus according to claim 1, wherein the depth of the separate depression is between 200 μm to 250 μm.

7. The fluid processing apparatus according to claim 1, wherein the separate depression, in its entirety, is positioned radially outward of the plurality of depressions, and radially inward of the opening.

\* \* \* \* \*